US012753247B2

(12) United States Patent
Amicucci et al.

(10) Patent No.: US 12,753,247 B2
(45) Date of Patent: Oct. 6, 2026

(54) HIGH-YIELD PEROXIDE QUENCH-CONTROLLED POLYSACCHARIDE DEPOLYMERIZATION AND COMPOSITIONS THEREOF

(71) Applicant: ONE BIO INC, Sacramento, CA (US)

(72) Inventors: Matthew Joseph Amicucci, Sacramento, CA (US); Cory Glen Vierra, Sacramento, CA (US); Riley Anne Drexler, Sacramento, CA (US); Kevin Patrick Worrell, Sacramento, CA (US); Yiyun Liu, Sacramento, CA (US)

(73) Assignee: ONE BIO INC, Sacramento, CA (US)

( * ) Notice: Subject to any disclaimer, the term of this patent is extended or adjusted under 35 U.S.C. 154(b) by 981 days.

(21) Appl. No.: 17/771,177

(22) PCT Filed: Nov. 12, 2020

(86) PCT No.: PCT/US2020/060297
§ 371 (c)(1),
(2) Date: Apr. 22, 2022

(87) PCT Pub. No.: WO2021/097138
PCT Pub. Date: May 20, 2021

(65) Prior Publication Data

US 2022/0372175 A1 Nov. 24, 2022

Related U.S. Application Data

(60) Provisional application No. 62/935,583, filed on Nov. 14, 2019.

(51) Int. Cl.
*C08B 30/20* (2006.01)
*C08B 37/00* (2006.01)

(52) U.S. Cl.
CPC .......... *C08B 30/20* (2013.01); *C08B 37/0057* (2013.01)

(58) Field of Classification Search
CPC ............................ C08B 30/20; C08B 37/0057
See application file for complete search history.

(56) References Cited

U.S. PATENT DOCUMENTS 4,629,699 A 12/1986 Bianchini
4,933,326 A 6/1990 Bianchini
4,973,580 A 11/1990 Mascellani et al.
5,253,711 A 10/1993 Mondshine
5,635,598 A 6/1997 Lebl et al.
5,824,659 A 10/1998 Strickland et al.
5,902,617 A 5/1999 Pabst
8,927,038 B2 1/2015 Salzman
8,946,404 B2 2/2015 Cook et al.
9,453,230 B2 9/2016 Merighi et al.
9,492,473 B2 11/2016 von Maltzahn et al.
9,512,562 B2 12/2016 Nonni et al.
9,846,626 B2 12/2017 Shen et al.
11,066,684 B2 7/2021 Amicucci et al.
2002/0016453 A1 2/2002 Marritt
2003/0162300 A1 8/2003 Kunz et al.
2005/0272088 A1 12/2005 Cook et al.
2012/0015902 A1 1/2012 Broekaert et al.
2013/0167836 A1 7/2013 Floyd et al.
2013/0167837 A1 7/2013 Floyd et al.
2013/0172546 A1 7/2013 Floyd et al.
2013/0172547 A1 7/2013 Floyd et al.
2013/0210086 A1 8/2013 Vaaje-Kolstad et al.
2014/0378412 A1 12/2014 Lowe et al.
2015/0184212 A1 7/2015 Bule et al.
2016/0366909 A1 12/2016 Geremia et al.
2017/0275385 A1 9/2017 Capanema et al.
2018/0235258 A1 8/2018 Falck
2018/0363016 A1 12/2018 Amicucci et al.
2019/0290675 A1 9/2019 Gibson et al.
2020/0216508 A1 7/2020 Marcobal-Barranco et al.
2022/0042057 A1 2/2022 Amicucci et al.
2022/0235084 A1 7/2022 Lebrilla et al.
2025/0179545 A1 6/2025 Amicucci et al.
2026/0055129 A1 2/2026 Amicucci et al.

FOREIGN PATENT DOCUMENTS

CN 1544444 11/2004
CN 1219784 C 9/2005
CN 102443659 5/2012
CN 103314111 9/2013
(Continued)

OTHER PUBLICATIONS

Borisov et al., Russian Chemical Bulletin, International Edition, 2004, 53(2), pp. 318-324. (Year: 2004).*
Matulova et al., Carbohydrate Research, 2011, 346, p. 1029-1036. (Year: 2011).*
Agus et al. (2018) "Gut Microbiota Regulation of Tryptophan metabolism in Health and Disease," Cell Host and Microbes, 23, 716.
Amicucci et al. (Apr. 2019). "A rapid-throughput adaptable method for determining the monosaccharide composition of polysaccharides." International Journal of Mass Spectrometry 438: 22-28.
Amicucci et al. (Aug. 2020) "A nonenzymatic method for cleaving polysaccharides to yield oligosaccharides for structural analysis," Nat Commun 11, 3963. https://doi.org/10.1038/s41467-020-17778-1.
(Continued)

*Primary Examiner* — Jonathan S Lau
(74) *Attorney, Agent, or Firm* — Leydig, Voit & Mayer Ltd.; Sally A Sullivan

(57) ABSTRACT

Provided are methods for cleaving polysaccharides, comprising reacting polysaccharides with a Fenton's reagent, and cleaving the treated polysaccharides with a nitrogen-based cleavage reagent, which preferably is also a peroxide-quenching agent. Synthetic oligosaccharide compositions produced by such polysaccharide cleaving methods are further disclosed. Such oligosaccharide compositions are shown to provide utility in various aspects including modulating microbial growth and/or microbial or host metabolism.

20 Claims, 27 Drawing Sheets

(56) References Cited

FOREIGN PATENT DOCUMENTS

| | | | |
|---|---|---|---|
| CN | 107466212 | | 12/2017 |
| CN | 105838755 | A | 2/2019 |
| CN | 109811022 | A | 5/2019 |
| WO | WO 86/06729 | | 11/1986 |
| WO | WO 2016/084029 | | 6/2016 |
| WO | WO 2016/132130 | | 8/2016 |
| WO | WO 2016/172657 | | 10/2016 |
| WO | WO 2018/106845 | | 6/2018 |
| WO | WO 2018/236917 | | 12/2018 |
| WO | WO 2019/101648 | | 5/2019 |
| WO | WO 2020/247389 | | 12/2020 |
| WO | WO 2021/097138 | | 5/2021 |
| WO | WO 2022/241163 | | 11/2022 |
| WO | WO 2023/220318 | | 11/2023 |
| WO | WO 2024/102938 | | 5/2024 |
| WO | WO 2024/182396 | | 9/2024 |
| WO | WO 2025/188604 | A8 | 9/2025 |
| WO | WO 2025/188607 | A8 | 9/2025 |

OTHER PUBLICATIONS

Amicucci et al. (Mar. 2019). "Function without Structures: The Need for In-Depth Analysis of Dietary Carbohydrates." Journal of Agricultural and Food Chemistry 67(16): 4418-4424.
Aouf et al. (2010) "Low Catalyst Loadings for the Production of Carboxylic Acids from Polysaccharides and Hydrogen Peroxide," ChemSusChem 3, 1200-1203.
Bar-On et al. (Jun. 2018). "The biomass distribution on Earth." Proceedings of the National Academy of Sciences 115(25): 6506-6511.
Barrett et al. (2012) "Gamma-aminobutyric acid production by culturable bacteria from the human intestine." J. Appl. Microbio. 113:411-417.
Barroso et al. (2021) "The aryl hydrocarbon receptor and the gut-brain axis." Cellular and Molecular Immunology 18:259.
Bauer et al. (2006). "Development and application of a suite of polysaccharide-degrading enzymes for analyzing plant cell walls." Proceedings of the National Academy of Sciences 103(30): 11417-11422.
Beckmann et al. (2006). "Isolation and identification of mixed linked β-glucan degrading bacteria in the intestine of broiler chickens and partial characterization of respective 1, 3-1, 4-β-glucanase activities." Journal of Basic Microbiology 46(3): 175-185.
Bhattarai et al. (2018) "Gut microbiota produced tryptamine activates an epithelial G-Protein coupled receptor to increase colonic secretion," *Cell host microbes*23:775.
Bio-Rad Laboratories, Inc. (Jul. 26, 2017) Bio-Gel P-10 Gel, GlobalSpec, datasheets.globalspec.com/ps/2450/BioRadLaboratories/DFAE6F0E-AE97-4A77-B4FD-4F9E3A65ABF1.
Bosi et al. (2020) "Tryptophan Metabolites Along the Microbiota-Gut-Brain Axis: An Interkingdom Communication System Influencing the Gut in Health and Disease," International Journal of Tryptophan Research, vol. 13: 1-25.
Byun et al. (2004) "Quantitative Analysis of Diverse *Latobacillus* Species Present in Advanced Dental Caries." Journal of Clinical Microbiology: 3128-3136.
Cancilla et al. (1998). "Alkaline degradation of oligosaccharides coupled with matrix-assisted laser desorption/ionization Fourier transform mass spectrometry: a method for sequencing oligosaccharides." Analytical Chemistry 70(4): 663-672.
Cani et al. (2008). "Changes in gut microbiota control metabolic endotoxemia-induced inflammation in high-fat diet-induced obesity and diabetes in mice." Gut. 57:1470-81.
Cani et al. (2009). "Changes in gut microbiota control inflammation in obese mice through a mechanism involving GLP-1-driven improvement of gut permeability." Gut. 58:1091-103.
Cavaglieri et al. (2003) "Differential effects of short-chain fatty acids on proliferation and production of pro- and anti-inflammatory cytokines by cultured lymphocytes," Life Sci. 73: 1683-90.
Chakaroun et al. (2020) "Gut Microbiome, intestinal permeability, and tissue bacteria in metabolic disease: Perpetrators or bystanders?" Nutrients 12: 1082.
Chambers et al. (2008) "Role of gut microbiota-generated short-chain fatty acids in metabolic and cardiovascular health." Curr Nutr Rep. 7:198-206.
Chambers et al. (2018) "Role of Gut Microbiota-Generated Short-Chain Fatty Acids in Metabolic and Cardiovascular Health," Current Nutrition Reports, 7:198-206.
Chang et al. (2001) "Kinetics and Products of the Degradation of Chitosan by Hydrogen Peroxide," J. Agric. Food Chem. 49, 10, 4845-4851.
Chang et al. (2014) "The microbial metabolite butyrate regulates intestinal macrophage function via histone deacetylase inhibition" *PNAS* (2014), 11: 2247.
Chriett et al. (2019) "Prominent action of butyrate over beta-hydroxybutyrate as histone deacetylase inhibitor, transcriptional modulator and anti-inflammatory molecule" Scientific Reports 9:742.
Collins et al. (2018). "Promising Prebiotic Candidate Established by Evaluation of Lactitol, Lactulose, Raffinose, and Oligofructose for Maintenance of a Lactobacillus-Dominated Vaginal Microbiota." Appl. Environ. Microbiol. doi: 10.1128/AEM.02200-17.
Cossio et al. (2017) Impact of prebiotics on metabolic and behavioral alterations in a mouse model of metabolic syndrome. Brain Behav Inmun (2017) 64:33.
Daujat-Chavanieu et al. (2020) "Regulation of CAR and PXR expression in health and disease" Cells 9:2395.
Desai et al. (2016). "A dietary fiber-deprived gut microbiota degrades the colonic mucus barrier and enhances pathogen susceptibility." Cell 167(5): 1339-1353.
Doggrell (2003) "The role of 5-HT on the cardiovascular and renal systems and the clinical potential of 5-HT modulation" Expert Op Investig Drugs 12:805.
Dominguez et al. (2014) "An overview of the recent developments on fructooligosaccharide production and applications." Food and Bioprocess Technology 7(2): 324-337.
Drovak et al. (2020) "Targeting the pregnane X receptor using microbial metabolite mimicry" EMBO Molecular Medicine 12.
Duboc et al. (2014) "The bile acid TGR5 membrane receptor: From basic research to clinic development" Digestive and Liver Disease 46: 302.
Eguchi et al. (2002) "Oxidative Damage Due to Copper Ion and Hydrogen Peroxide Induces GlcNAc-Specific Cleavage of an Asn-Linked Oligosaccharide," J. Biochem. 131, 477-484.
Everard et al. (2014) "Gut microbiota and GLP-1" Rev Endocr Metab Disord 15:189.
Extended European Search Report dated Aug. 10, 2023 in corresponding EP application 20888057.5, 11 pp.
Frei et al. (2012). "Microbiota and dietary interactions: an update to the hygiene hypothesis?" Allergy. 67:451-61.
Froslie et al. (2007) "Mucosal healing in inflammatory bowel disease: results from a Norwegian population-based cohort" Gastroenterology 133:412-22.
Galermo et al. (Oct. 2018). "Liquid chromatography—tandem mass spectrometry approach for determining glycosidic linkages." Analytical Chemistry 90(21): 13073-13080.
Galermo et al. (Sep. 2019). "Development of an extensive linkage library for characterization of carbohydrates." Analytical Chemistry 91(20): 13022-13031.
Gosling et al. (2010). "Recent advances refining galactooligosaccharide production from lactose." Food Chemistry 121(2): 307-318.
Greiner et al. (2016) "Microbial regulation of GLP-1 and L-cell biology" Molecular metabolism 5:753.
Guarner et al. (2003). "Gut flora in health and disease." The Lancet 361(9356): 512-519.
Guilloux et al. (2009) "Production of Arabinoxylan-oligosaccarides from Flaxseed (*Linum usitatissimum*)"; J. Agric. Food Chem. 57, 23, 11308-11313.
Hamaker et al. (2014). "A perspective on the complexity of dietary fiber structures and their potential effect on the gut microbiota." Journal of Molecular Biology 426(23): 3838-3850.

(56) References Cited

OTHER PUBLICATIONS

Hinz et al. (2005). "*Bifidobacterium longum* endogalactanase liberates galactotriose from Type I galactans." Applied and Environmental Microbiology 71(9): 5501-5510.
Hjerde et al. (1994) "Conformation dependent depolymerisation kinetics of polysaccharides studied by viscosity measurements," Carbohydrate Polymers 24, 265-275.
Hobby et al. (2019) "Chronic kidney disease and the gut microbiome," Am J. Physiol. Renal Physiol. 316: F1211-17.
Hoffman et al. (2005) "Structural analysis of xyloglucans in the primary cell walls of plants in the subclass *Asteridae*," Carbohydrate Research 340, 11, 1826-1840.
International Search Report and Written Opinion dated Mar. 18, 2021 in International Application No. PCT/US2020/060297, from which the present application claims priority, 15 pp.
Jaušovec et al. (2015). "Introduction of aldehyde vs. carboxylic groups to cellulose nanofibers using laccase/TEMPO mediated oxidation." Carbohydrate Polymers 116: 74-85.
Jiang et al. (2015) Intestine-selective farnesoid X receptor inhibition improves obesity-related metabolic dysfunction. Nature Communications 6.
Kanbay et al. (2018) "The crosstalk of gut microbiota and chronic kidney disease: role of inflammation, proteinuria, hypertension, and diabetes mellitus," International Urology and Nephrology.
Kanoi et al. (2015) "A breakthrough in probiotics: Clostridium butyricum regulates gut homeostasis and anti-inflammatory response in inflammatory bowel disease," J Gastroenterol 50:928-39.
Kawaguchi et al. (2014). "The mannobiose-forming exo-mannanase involved in a new mannan catabolic pathway in *Bacteroides fragilis*." Archives of Microbiology 196(1): 17-23.
Kim et al. (2018) "The microbiota-gut-brain axis in neuropsychiatric disorders: Pathophysiological mechanisms and novel treatments," Curr Neuropharmacol 16:559-573.
Klindworth et al. (2013) "Evaluation of general 16S ribosomal RNA gene PCR primers for classical and next-generation sequencing-based diversity studies," Nucleic Acids Res. 41, e1.
Koester et al. (Dec. 2021) "Marker-based assay for studying gut transit in gnotobiotic and conventional mouse models," STAR Protocols 2.
Kriaa et al. (2019). "Microbial impact on cholesterol and bile acid metabolism: current status and future prospects." J.Lipid Res. 60:323-332.
Kuhn et al. (1993) "Interleukin-10-Deficient Mice Develop Chronic Enterocolitis," Cell, vol. 75, 263-274.
Kulcinskaja et al. (2013). "Expression and characterization of a *Bifidobacterium adolescentis* beta-mannanase carrying mannan-binding and cell association motifs." Applied and Environmental Microbiology 79(1): 133-140.
Lamas et al. (2020) "Aryl hydrocarbon receptor ligand production by the gut microbiota is decreased in celiac disease leading to intestinal inflammation," Sci Transl Med 12:566.
Lammerts Van Bueren et al. (2017). "Prebiotic galactoligosaccharides activate mucin and pectin galactan utilization pathways in the human gut symbiont *Bacteroides thetaiotaomicron*." Scientific Reports 7(1):40478. 13 pp.
Larsbrink et al. (2014). "A discrete genetic locus confers xyloglucan metabolism in select human gut Bacteroidetes." Nature 506(7489): 498-502.
Lavelle et al. (2020) "Gut microbiota-derived metabolites as key actors in inflammatory bowel disease," Nature Reviews Gastroenterology & Hepatology 17:223.
Leanti La Rosa et al. (Feb. 2019). "The human gut Firmicute Roseburia intestinalis is a primary degrader of dietary β-mannans." Nature Communication 10(1):905, 14 pp.
Li et al. (2015) "Profiling pneumococcal type 3-derived oligosaccharides by highresolution liquid chromatography-tandem mass spectrometry," Journal of Chromatography A, 1397 (2015) 43-51.
Li et al. (2017) "Niacin amerliorates ulcerative colitis via prostaglandin D-mediated D protanoid receptor 1 activation," EMBO Mol Med. 9:571-88.
Li et al. (Dec. 2021) "New insights into gut-bacteria derived indole and its derivatives in intestinal and liver diseases," Front Pharmacol 13.
LoCascio et al. (2007). "Glycoprofiling of bifidobacterial consumption of human milk oligosaccharides demonstrates strain specific, preferential consumption of small chain glycans secreted in early human lactation." Journal of Agricultural and Food Chemistry 55(22): 8914-8919.
Luis et al. (Feb. 2018). "Dietary pectin glycans are degraded by coordinated enzyme pathways in human colonic *Bacteroides*." Nature Microbiology 3(2): 210-219.
Luu et al. (2020). "Exploring the molecular mechanisms underlying the protective effects of microbial SCFAs on intestinal tolerance and food allergy." Front Immunol. 11:1225.
Lynch (2016). "Gut microbiota and allergic disease. New insights," Ann Am thorac Soc. 13:S51-S54.
Ma et al. (2018) Activation of GABA receptors in colon epithelium exacerbates acute colitis. *Front Immunol.* 9:987.
Macfarlane et al. (1992) "Comparison of fermentation reactions in different regions of the human colon," Journal of Applied Bacteriology, 72, 57-64.
Margolles et al. (2003). "Purification and functional characterization of a novel alpha-L-arabinofuranosidase from *Bifidobacterium longum* B667." Applied and Environmental Microbiology 69(9): 5096-5103.
Marsland (2016) "Regulating inflammation with microbial metabolites," Nature Medicine 22.
Martens et al. (2011). "Recognition and Degradation of Plant Cell Wall Polysaccharides by Two Human Gut Symbionts." PLoS Biology 9(12), p. e1001221.
Matsumoto et al. (2012) "Experimental colitis alters expression of 5-HT receptors and transient receptor potential vanilloid 1 leading to visceral hypersensitivity in mice," Lab Invest 92:769.
Mi et al. (2003) "Structural basis for bile acid binding and activation of the nuclear receptor FXR," Molecular Cell 11.
Mirjam et al. (2009) "Prebiotics in Chronic Intestinal Inflammation," Inflamm Bowel Dis. 15: 454-63.
Miyata et al. (2021) "Discovery, optimization and evaluation of non-bile acid FXR/TGR5 dual agonists," Sci Rep 11: 9196.
Morrow et al. (2004). "Human milk oligosaccharides are associated with protection against diarrhea in breast-fed infants." The Journal of Pediatrics 145(3): 297-303.
Mukhopadhya et al. (2012) "IBD-what role do Proteobacteria play?" Nature Reviews Gastroenterology & Hepatology 9: 219-230.
Mullish et al. (2019) Microbial bile salt hydrolases mediate the efficacy of faecal microbiota transplant in the treatment of recurrent Clostridioides difficile infection. Gut. 68:1791-800. https://doi.org/10.1136/gutjnl-2018-317842.
Neavin et al. (2018) "The role of the Aryl Hydrocarbon Receptor (AhR) in immune and inflammatory diseases," Int J Mol Sci 19:3851.
Needham et al. (2020) "Gut microbial molecules in behavioral and neurogenerative conditions," Nature Reviews Neuroscience. 21.
Neira et al. (Jun. 2019) "Oxidative Cleavage of Cellobiose by Lytic Polysaccharide Monooxygenase (LPMO)-Inspired Copper Complexes," ACS Omega, 4, 6, 10729-10740.
Neurath et al. (2012) "Mucosal healing in inflammatory bowel diseases: a systematic review," Gut. 61: 1619-35.
Neyrinck et al. (2012). "Wheat-derived arabinoxylan oligosaccharides with prebiotic effect increase satietogenic gut peptides and reduce metabolic endotoxemia in diet-induced obese mice." Nutrition & Diabetes 2(1): e28.
Obrenovich et al. (2016) "The co-metabolism within the gut-brain metabolic interaction: Potential targets for drug treatment and design," CNS Neurol Disord Drug Targets 15:127.
Panagos et al. (2011) "Structural characterization of oligosaccharides obtained by Fenton-type radical depolymerisation of dermatan sulfate"; Carbohydrate Polymers, 87, 3, 2086-2092.
Park et al. (2019) "Bidirectional regulatory potentials of short-chain fatty acids and their G-protein-coupled receptors in autoimmune neuroinflammation," Scientific Reports 9: 8837.

(56) References Cited

OTHER PUBLICATIONS

Pauly et al. (1999). "A xyloglucan-specific endo-β-1, 4-glucanase from *Aspergillus aculeatus*: expression cloning in yeast, purification and characterization of the recombinant enzyme." Glycobiology 9(1): 93-100.
Qin et al. (2012) "A metagenome-wide association study of gut microbiota in type 2 diabetes," Nature 490, 55.
Quigley (2011) "Microflora Modulation of Motility," J. Neurogastroenterol Motil 17:140.
Raimondi et al. (2008) "Bile acids modulate tight junction structure and barrier function of Caco-2 monolayers via EGFR activation," Am J Physiol Gastrointest Liver Physiol 294: G906.
Reddy et al. (2016). "A β-mannan utilization locus in *Bacteroides ovatus* involves a GH36 a-galactosidase active on galactomannans." FEBS Lett 590(14): 2106-2118.
Ren et al. (2020) Alterations of the human gut microbiome in Chronic Kidney Disease. Advanced Science. 7:2001936.
Rousseau et al. (2005). "Prebiotic effects of oligosaccharides on selected vaginal lactobacilli and pathogenic microorganisms." Anaerobe, 11: 145-153.
Ruiz-Moyano et al. (2013). "Variation in consumption of human milk oligosaccharides by infant gut-associated strains of *Bifidobacterium breve*." Applied and Environmental Microbiology 79(19): 6040-6049.
Sakai et al. (2013) "5-Fluorouracil Induces Diarrhea with Changes in the Expression of Inflammatory Cytokines and Aquaporins in Mouse Intestines," Plos One, 8(1), e54788.
Salyers et al. (1977). "Fermentation of mucin and plant polysaccharides by strains of Bacteroides from the human colon." Applied and Environmental Microbiology 33(2): 319-322.
Sartor (2004) "Therapeutic manipulation of the enteric microflora in inflammatory bowel diseases: antibiotics, probiotics, and prebiotics," Gastroenterology. 126:1620-33.
Sgambato et al. (2016) "Gut-brain axis in Gastric Mucosal Damage and protection," Curr Neuropharmacol 14:959.
Sheridan et al. (2016). "Polysaccharide utilization loci and nutrition specialization in a dominant group of butyrate-producing human colonic *Firmicutes*." Microbial Genomics 2(2).
Sikalidis et al. (2020). "The gut microbiome and type 2 diabetes mellitus: discussing a complex relationship." Biomedicines. 8:8.
Simoes et al. (2016) "Oxidation of amylase and amylopectin by hydroxyl radicals assessed by electrospray ionisation mass spectrometry," Carbohydrate Polymers 148 (2016) 290-299.
Smilowitz et al. (2014). "Breast milk oligosaccharides: structure-function relationships in the neonate." Annual Review of Nutrition 34: 143-169.
Soltes et al. (2006) "Degradation of High-Molecular-Weight Hyaluronan by Hydrogen Peroxide in the Presence of Cupric Ions," Carbohydrate Research, 341, 5, 639-644.
Sommer et al. (Mar. 2021) "Intestinal Mucosal Wound healing and barrier integrity in IBD-crosstalk and trafficking of cellular players," Front Med 8.
Stadtman (1991) "Fenton chemistry. Amino acid oxidation." Journal of Biological Chemistry 266(26): 17201-17211.
Stilling et al. (2016) "The neuropharmacology of butyrate: The bread and butter of the microbiota-gut-brain axis," Neurochemistry International 99:1.
Strandwitz (2018) "Neurotransmitter modulation by the gut microbiota," Brain Res. 1693(Pt B): 128-133.
Sun et al. (2000) "Comparative study of hemicelluloses from rice straw by alkali and hydrogen peroxide treatments"; Carbohydrate Polymers 42, 2, 111-122.
Sun et al. (2015) "Sodium periodate oxidation of cellulose nanocrystal and its application as a paper wet strength additive." Cellulose 22(2): 1135-1146.
Tamura et al. (2017) "Molecular Mechanism by which Prominent Human Gut Bacteroidetes Utilize Mixed-Linkage β-Glucans, Major Health-Promoting Cereal Polysaccharides." Cell Reports 21(2): 417-430.
Tsukahara et al. (2017)"G protein-coupled receptor 35 contributes to mucosal repair in mice via migration of colonic epithelial cells," Pharmacol. Res. 123, 27-39.
Turnbaugh et al. (2006) "An obesity-associated gut microbiome with increased capacity for energy harvest." Nature. 444:1027-31.
Usuda et al. (Jul. 2021) "Leaky gut: Effect of Dietary fiber and fats on microbiome and intestinal barrier," Int J Mol Sci 22:7613.
Van Laere et al. (1999) "Transglycosidase activity of *Bifidobacterium adolescentis* DSM 20083 alpha-galactosidase." Applied Microbiology and Biotechnology 52(5): 681-688.
Venkatesh et al. (2014) "Symbiotic bacterial metabolites regulate gastrointestinal barrier function via the xenobiotic sensor PXR and Toll-like Receptor 4," Immunity 41.
Vismara et al. (2010) "Low-Molecular-Weight Heparin From $Cu^{2+}$ and $Fe^{2+}$ Fenton Type Depolymerisation Processes," Thromb Haemost.; Blood Coagulation, Fibrinolysis and Cellular Haemostasis, 103(3) 613-622.
Vitale et al. (2016) "New Insights of the Fenton Reaction Using Glycerol as the Experimental Model. Effect of $O_2$, Inhibition by $Mg^{2+}$, and Oxidation State of Fe," J. Phys. Chem. A, 120, 28, 5435-5445.
Wang et al. (2011) "Gut flora metabolism of phosphatidylcholine promotes cardiovascular disease," Nature 472:57.
Wang et al. (2016) "A review on Fenton-like processes for organic wastewater treatment." Journal of Environmental Chemical Engineering 4(1): 762-787.
Ward et al. (2017) "Ursodeoxycholic acid and lithocholic acid exert anti-inflammatory actions in the colon," Am J Physiol. 312:G550-8 Available from: https://www.physiology.org/doi/10.1152/ajpgi.00256.2016. Accessed Nov. 23, 2020.
Wardman et al. (1996) "Fenton chemistry: an introduction." Radiation Research 145(5): 523-531.
Witkowski et al. (Jul. 2020) "Gut microbiota and cardiovascular disease," Circulation research 127 :553.
Wong et al. (2014) "Expansion of urease- and uricase-containing, indole- and p-cresol forming and contraction of short chain fatty acid producing intestinal microbiota in ESRD," Am J Nephrol 39: 230-237.
Wu et al. (2010) "Free-radical depolymerization of glycosaminoglycan from sea cucumber *Thelenata ananas* by hydrogen peroxide and copper ions," Carbohydrate Polymers 80, 4, 1116-1124.
Xie et al. (2001) "An essential role for nuclear receptors SXR/PXR in detoxification of cholestatic bile acids," PNAS 89.
Xu et al. (Jun. 2021) "Microbial Oligosaccharides with Biomedical Applications," Mar. Drugs, 29, 350.
Yoon et al. (2016) "HDAC and HDAC inhibitor: From Cancer to Cardiovascular Diseases," Chonnam Med J 52:1.
Yu et al. (Jun. 2018) "Production of a human milk oligosaccharide 2'-fucosyllactose by metabolically engineered *Saccharomyces cerevisiae*." Microbial Cell Factories 17(1): 101.
Yullie et al. (2018) "Human gut bacteria as potent class I histone deacetylase inhibitors in vitro through production of butyric acid and valeric acid," PLOS One.
Zhang et al. (2011) "The role of endogenous aryl hydrocarbon receptor signaling in cardiovascular physiology," J. Cardiovasc Dis Res 2:91.
Zhang et al. (Jan. 2021) "Inhibition of microbiota-dependent TMAO production attenuates chronic kidney disease in mice," Scientific Reports 11:518.
Zhong et al. (2016) "Type 2 diabetes mellitus is associated with more serious small intestinal mucosal injuries," PLOs One.
Zietec et al. (2016) "Inflammation meets metabolic diseases: Gut feeling mediated by GLP-1," Front Immunol 7:154.
Yang et al. (2011) "Study on the preparation of series oligomannuronic acids using Fenton reagent" Chinese Journal of Marine Drugs 30(3): 43-46 DOI:10.13400/j.Cnki.cjmd.2011.03.002.
Boulos & Nysträ(2016) "UPLC-MS/MS investigation of beta-glucan oligosaccharide oxidation." Analyst 141.24 (2016): 6533-6548.
Edney et al. (1991). "Structure of Total Barley Beta-Glucan 1", Journal of the Institute of Brewing, 97(1), 39-44.
Faijes et al. (2001) " Oligosaccharide Synthesis by Coupled endo-Glycosynthases of V Different Specificity: A Straightforward Prepa-

(56) References Cited

OTHER PUBLICATIONS ration of Two Mixed-Linkage Hexasaccharide Substrates of 1, 3/1, 4-β-Glucanases" Chemistry—A European Journal, 7(21), 4651-4655.

Gidenne (1995) "Effect of fibre level reduction and gluco-oligosaccharide addition on the growth performance and caecal fermentation in the growing rabbit", Animal feed science and technology, 56(3-4), 253-263.

Gu et al., "Polysaccharides from Polygonatum kingianum improve glucose and lipid metabolism in rats fed a high fat diet," Biomedicine & Pharmacotherapy, 2020, 125: 109910.

Hrmova et al. (1988) "Chemoenzymic synthesis of (1→3, 1→4)-β-D-glucooligosaccharides for subsite mapping of (1→3, 1→4)-β-D-glucan endohydrolases." Journal of the Chemical Society, Perkin Transactions 1 21 (1998): 3571-3576.

Juvonen et al. (Mar. 2019) "Identification and structural analysis of cereal arabinoxylan-derived oligosaccharides by negative ionization HILIC-MS/MS", Food chemistry. 275:176-85.

Khasnobis et al. (Jul. 2006) "Characterization of a Specific Arabinosyltransferase Activity Involved in Biosynthesis", Chemistry & Biology, Current Biology, London GB, vol. 13, No. 7, 28 pp. 787-795, XP027991089, ISSN: 1074-5521 retrieved on Jul. 1, 2006.

Lazaridou, Athina, Costas G. Biliaderis, and Marta S. Izydorczyk. "Functional food carbohydrates." (2007): 1-72.

Palma et al. (2015) "Unravelling Glucan Recognition Systems by Glycome Microarrays Using the Designer Approach and Mass Spectrometry* [S]." Molecular & Cellular Proteomics 14.4 pp. 974-988.

Parrish et al. (1960) "Selective enzymolysis of poly-13-β-D-glucans, and the structure of the polymers" Canadian Journal of Chemistry, 38(11), 2094-2104.

Xiong et al. "HPAEC-PAD and Q-TOF-MS/MS analysis reveal a novel mode of action of endo-β-1, 3 (4)-D-glucanase Eng16A from *Coprinopsis cinerea* on barley β-glucan." Food Chemistry 287 (2019): 160-166.

Bartezko et al. (Aug. 2015) "Automated Glycan Assembly of Oligosaccharides Related to Arabinogalactan Proteins" Org. Letter. 17:4344-4347 doi.org/10.1021/acs.orglett.5b02185.

* cited by examiner

HIGH-YIELD PEROXIDE QUENCH-CONTROLLED POLYSACCHARIDE DEPOLYMERIZATION AND COMPOSITIONS THEREOF

CROSS-REFERENCE TO RELATED APPLICATIONS

This application is a U.S. National Stage Application filed under 35 U.S.C. § 371 of International Application No. PCT/US2020/060297, filed Nov. 12, 2020 titled "HIGH-YIELD PEROXIDE QUENCH-CONTROLLED POLYSACCHARIDE DEPOLYMERIZATION AND COMPOSITIONS THEREOF, which claims the benefit of and priority to U.S. Provisional Patent Application No. 62/935,583, filed Nov. 14, 2019, each of which is hereby incorporated by reference in its entirety.

FIELD OF THE INVENTION

Aspects of the invention relate generally to polysaccharide depolymerization, particularly to polysaccharide depolymerization for producing oligosaccharides, more particularly to polysaccharide depolymerization using chemical oxidation and cleavage, even more particularly to Controlled Oligosaccharide Generation ("COG") methods for polysaccharide depolymerization and producing oligosaccharides by oxidizing polysaccharide material with a Fenton's reagent to provide hydroperoxyl radical-treated polysaccharide, followed by peroxide elimination (peroxide-quenching) and controlled cleavage of the treated polysaccharide using a compatible peroxide-quenching/cleavage reagent (PQC-reagent) to eliminate residual hydrogen peroxide and initiate high-yield polysaccharide cleavage, while minimizing or eliminating unwanted side reactions.

BACKGROUND

Oligosaccharides are short chains of carbohydrates that generally range from 3-20 monomers in length. Oligosaccharides have been shown to have a variety of functions (e.g., bioactive functions, etc.) that are influenced by a number of structural attributes such as stereochemistry, branching, degree of polymerization, monosaccharide composition, and glycosidic bond positions (Amicucci, Nandita et al. 2019). Oligosaccharides from human milk (HMOs), for example, promote the growth of certain microbes that are nascent to the infant gut, while also modulating the immune system, reducing instances of diarrhea, and protecting the host from pathogen adhesion (Morrow, Ruiz-Palacios et al. 2004, LoCascio, Ninonuevo et al. 2007, Smilowitz, Lebrilla et al. 2014).

Biological synthesis is currently the primary tool for producing human milk oligosaccharides at scale (Merighi et al. 2016, Yu et al. 2018). Moreover, little work has been done to expand the field of creating oligosaccharides beyond HMOs, and two other common oligosaccharides, galactooligosaccharides (GOS), and fructooligosaccharides (FOS) (Gosling et al. 2010, Dominguez et al. 2014). Polysaccharides (e.g., homopolymer or heteropolymer polysaccharides) can contain, e.g., up to 100,000 monomeric building blocks and are found ubiquitously in all organisms including, e.g., plants, mammals, fungi, bacteria, diatoms, and algae (Bar-On et al. 2018). Polysaccharides are generally used for their rheological properties but more recently have been explored for their prebiotic and immunomodulating potential, however, these properties are limited by their low solubility and intercellular transport (Hamaker and Tuncil 2014). Thus, soluble and easily transportable oligosaccharides with epitopes that resemble their parent polysaccharide may provide a more effective path towards microbiome and immune modulation.

The depolymerization of large polysaccharides into oligosaccharides may present an opportunity to produce large amounts of structurally diverse oligosaccharides from natural starting material. Enzymatic methods have been used to produce oligosaccharides from polysaccharides, however, their inherent specificity limits each enzyme to only being able to depolymerize a single type of glycosidic bond and, in turn, a highly limited number of polysaccharides (Pauly et al. 1999, Bauer et al. 2006). Chemical methods for the depolymerization of polysaccharides, while known in the art, are not routinely employed but may offer a more robust and broader path to polysaccharide depolymerization.

Oxidative chemistry, for example, is routinely used to modify both carbohydrate molecular weight and functional groups (Jaušovec et al. 2015, Sun et al. 2015). Fenton and Fenton-like chemistry relies on transition metals and hydrogen peroxide to produce hydroperoxyl radicals that can drive many oxidative reactions (Wardman and Candeias 1996). Fenton chemistry is currently used at scale in waste-water treatment (Wang et al. 2016). A method for polysaccharide depolymerization using Fenton's chemistry followed by cleavage using a strong-Arrhenius base ($Na^+OH^-$, $K^+OH^-$, or $Ca^{2+}(OH^-)_2$) has recently been described (Amicucci, Park et al. 2018). Polysaccharide depolymerization using such strong Arrhenius bases as cleavage agents, however, not only requires the use of large-scale dialysis to remove residual post-reaction salt (after neutralization of the strong-Arrhenius base), but is also subject to 'peeling' (Cancilla et al. 1998) and off-target side reactions (e.g., C-6 oxidation creating-uronic acid containing oligosaccharides and other potential unwanted species) occurring during the strong-Arrhenius base cleavage and post-cleavage (e.g., dialysis) steps. This is because while the strong-Arrhenius base cleavage agent "quenched" the Fenton's reaction (i.e., by flocculating the metal ion reactant), such bases do not (as disclosed herein below) quench/eliminate residual peroxide or peroxide radicals per se. Moreover, such peeling and off-target reactions can be problematic at optimal peroxide and pH concentrations/conditions used for both the peroxidation and cleavage steps, and oligosaccharide yields may suffer if lower concentrations or suboptimal conditions are used.

SUMMARY OF THE INVENTION

Aspects of the disclosure can be described in view of the following aspects:

1. A method for cleaving polysaccharides, comprising:

reacting polysaccharides in a reaction mixture with a Fenton's reagent, having a peroxide agent and metal ions, to provide treated polysaccharides; and cleaving the treated polysaccharides with a nitrogen-based cleavage reagent to generate at least one polysaccharide cleavage product and/or oligosaccharide, characteristic of the polysaccharides.

2. The method of aspect 1, wherein cleaving generates a mixture of polysaccharide cleavage products and/or of oligosaccharides characteristic of the polysaccharides.

3. The method of aspects 1 or 2, wherein the Fenton's reagent comprises hydrogen peroxide, and one or more metals selected from the group consisting of transition metals Fe(II), Fe(III), Cu(I), Cu(II), Mn(II), Zn(II), Ni(II), and Co(II), alkaline earth metals Ca(II) and Mg(II), and the lanthanide Ce(IV).

4. The method of any one of aspects 1-3, wherein the nitrogen-based cleavage reagent is one or more selected from the group consisting of ammonium hydroxide, ammonium bicarbonate, ammonia, urea, sodium amide, dimethyl amine, trimethylamine, pyridine, and N,N-diisopropylethylamine.

5. The method of aspect 4, wherein the nitrogen-based cleavage reagent is one or more selected from the group consisting of ammonium hydroxide, ammonium bicarbonate, and ammonia.

6. The method of any one of aspects 1-5, wherein the nitrogen-based cleavage reagent is also a peroxide-quenching agent, and initiation of polysaccharide cleavage is commensurate, or substantially commensurate with initiation of peroxide-quenching.

7. The method of any one of aspects 1-6, wherein the nitrogen-based cleavage agent is not a peroxide-quenching agent, and the method further comprises initiation of peroxide quenching with an additional agent that is a peroxide-quenching agent.

8. The method of aspect 7, wherein the additional peroxide-quenching agent comprises one or more peroxide-quenching agents listed in Table 1, or a peroxide quenching enzyme.

9. The method of any one of aspects 6-8, wherein the additional peroxide-quenching agent is also an additional polysaccharide cleavage reagent that cleaves the treated polysaccharide.

10. The method of any one of aspects 1-5 and 7-9, wherein the additional peroxide-quenching agent is introduced prior to, commensurate with, or subsequent to initiation of polysaccharide cleavage with the nitrogen-based cleavage reagent.

11. The method of any one of aspects 1-10, further comprising removing the nitrogen-based cleavage reagent, and/or quenching agent, or one or more reaction components thereof, by vaporization.

12. The method of any of aspects 1-11, wherein the oligosaccharide yield is enhanced and/or wherein off-target side reactions and/or peeling are reduced, relative to cleaving the treated polysaccharide with a strong Arrhenius base.

13. The method of any one of aspects 1-12, wherein the polysaccharides are derived from, or are in the form of at least one material selected from the group consisting of plants, bacteria, yeast, algae, animals, fungi, and waste product stream material.

14. The method of aspect 13, wherein the polysaccharides comprise one or more selected from the group consisting of amylose, amylopectin, betaglucan, pullulan, xyloglucan, arabinogalactan I and arbinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, lichenan, and inulin.

15. The method of any one of aspects 1-14, wherein the reacting and the cleaving alter at least one structural and/or chemical property of a material comprising the polysaccharides, wherein the property is selected from the group consisting of solubility, texture, porosity, permeability, resiliency, rheological properties, and chemical reactivity.

16. A composition comprising one or more polysaccharide cleavage products, oligosaccharides, or mixtures of polysaccharide cleavage products and/or oligosaccharides generated by the method of any one of aspects 1-15.

17. A method of modulating microbial growth and/or microbial or host metabolism, comprising contacting, in vitro or in vivo, microbes with a composition according to aspect 16.

18. A method for cleaving polysaccharides, comprising:
- reacting polysaccharides in a reaction mixture with a Fenton's reagent, having a peroxide agent and metal ions, to provide treated polysaccharides; and
- cleaving the treated polysaccharides with a polysaccharide-cleavage agent in the presence of a peroxide-quenching agent to generate at least one polysaccharide cleavage product and/or oligosaccharide characteristic of the polysaccharides.

19. The method of aspect 18, wherein cleaving generates a mixture of polysaccharide cleavage products and/or of oligosaccharides characteristic of the polysaccharides.

20. The method of aspects 18 or 19, wherein the Fenton's reagent comprises one or more metals selected from the group consisting of transition metals Fe(II), Fe(III), Cu(I), Cu(II), Mn(II), Zn(II), Ni(II), and Co(II), alkaline earth metals Ca(II) and Mg(II), and the lanthanide Ce(IV).

21. The method of any one of aspects 18-20, wherein the polysaccharide-cleavage agent comprises one or more strong Arrhenius bases, weak Arrhenius bases, or non-Arrhenius bases.

22. The method of any one of aspects 18-21, wherein the polysaccharide-cleavage agent comprises one or more nitrogen-based cleavage reagents selected from the group consisting of ammonium hydroxide, ammonium bicarbonate, ammonia, urea, sodium amide, dimethyl amine, trimethylamine, pyridine, and N,N-diisopropylethylamine.

23. The method of aspect 22, wherein the nitrogen-based cleavage reagent is one or more selected from the group consisting of ammonium hydroxide, ammonium bicarbonate, and ammonia.

24. The method of any one of aspects 18-23, wherein the polysaccharide-cleavage agent is also the peroxide-quenching agent, and initiation of polysaccharide cleavage is commensurate, or substantially commensurate with initiation of peroxide-quenching.

25. The method of any one of aspects 18-23, wherein the polysaccharide-cleavage agent is not the peroxide-quenching agent.

26. The method of aspect 24 or 25, wherein the peroxide-quenching agent comprises one or more peroxide-quenching agents listed in Table 1, or a peroxide quenching enzyme.

27. The method of aspect 26, wherein the peroxide-quenching agent is also an additional polysaccharide cleavage reagent that cleaves the treated polysaccharide.

28. The method of any one of aspects 18-23 and 25-27, wherein the peroxide-quenching agent is introduced prior to, commensurate with, or subsequent to initiation of polysaccharide cleavage with the polysaccharide cleavage reagent.

29. The method of any one of aspects 18-28, further comprising removing the polysaccharide-cleavage agent, and/or quenching agent, or one or more reaction components thereof, by vaporization (e.g., as a gas).

30. The method of any one of aspects 18-29, wherein the oligosaccharide yield is enhanced and/or wherein off-target side reactions and/or peeling are reduced, relative to cleaving the treated polysaccharide with a strong Arrhenius base.

31. The method of any one of aspects 18-30, wherein the polysaccharides are derived from, or are in the form of at least one material selected from the group consisting of plants, bacteria, yeast, algae, animals, fungi, and waste product stream material.

32. The method of aspect 30, wherein the polysaccharides comprise one or more selected from the group consisting of amylose, amylopectin, betaglucan, pullulan, xyloglucan, arabinogalactan I and arbinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, galactan, lichenan, and inulin.

33. The method of any one of aspects 18-32, wherein the reacting and the cleaving alter at least one structural and/or chemical property of a material comprising the polysaccharides, wherein the property is selected from the group consisting of solubility, texture, porosity, permeability, resiliency, rheological properties, and chemical reactivity.

34. A composition comprising one or more polysaccharide cleavage products, oligosaccharides, or mixtures of polysaccharide cleavage products and/or oligosaccharides, generated by the method of any one of aspects 18-33.

35. A method of modulating microbial growth and/or microbial or host metabolism, comprising contacting, in vitro or in vivo, microbes with a composition according to aspect 34.

36. A mixture of oligosaccharides produced by a method comprising:

a) contacting one or more polysaccharide with a Fenton's reagent, comprising a peroxide agent and metal ions to form a mixture;

b) allowing the Fenton's reagent to react with the polysaccharide for a specified reaction time; and c) after passage of the specified reaction time of step b, adding a cleavage agent which may also be a peroxide quenching reagent to the mixture, wherein the mixture of oligosaccharides is produced.

37. The oligosaccharide mixture of aspect 36, wherein the Fenton's reagent comprises hydrogen peroxide, and one or more metals selected from the group consisting of transition metals Fe(II), Fe(III), Cu(I), Cu(II), Mn(II), Zn(II), Ni(II), and Co(II), alkaline earth metals Ca(II) and Mg(II), and the lanthanide Ce(IV).

38. The oligosaccharide mixture of aspect 36 or 37, wherein the cleavage agent which may also be a peroxide quenching reagent is a nitrogen based cleavage agent.

39. The oligosaccharide mixture of aspect 38, wherein the nitrogen-based cleavage reagent is one or more selected from the group consisting of ammonium hydroxide, ammonium bicarbonate, ammonia, urea, sodium amide, dimethyl amine, trimethylamine, pyridine, and N,N-diisopropylethylamine.

40. The oligosaccharide mixture of aspect 38 or 39, wherein the nitrogen-based cleavage reagent is one or more selected from the group consisting of ammonium hydroxide, ammonium bicarbonate, and ammonia.

41. The oligosaccharide mixture of any one of aspect 36 to 40, wherein the cleavage agent which may also be a peroxide quenching reagent is both a cleavage reagent and a peroxide-quenching agent, and initiation of polysaccharide cleavage is commensurate, or substantially commensurate with initiation of peroxide-quenching.

42. The oligosaccharide mixture of any one of aspect 36 to 41, wherein the cleavage agent which may also be a peroxide quenching reagent is not a peroxide-quenching agent, and the method further comprises initiation of peroxide quenching with an additional agent that is a peroxide-quenching agent.

43. The oligosaccharide mixture of aspect 42, wherein the additional peroxide-quenching agent comprises one or more peroxide-quenching agents listed in Table 1, or a peroxide quenching enzyme.

44. The oligosaccharide mixture of aspect 42 or 43, wherein the additional peroxide-quenching agent is also an additional polysaccharide cleavage reagent that cleaves the treated polysaccharide.

45. The oligosaccharide mixture of any one of aspects 42 to 44, wherein the additional peroxide-quenching agent is introduced prior to, commensurate with, or subsequent to initiation of polysaccharide cleavage with the cleavage agent which may also be a peroxide quenching reagent.

46. The oligosaccharide mixture of any one of aspects 36 to 45, wherein after step (c) the cleavage agent which may also be a peroxide quenching reagent and any additional polysaccharide cleavage reagent, or one or more reaction components thereof, are removed by vaporization.

47. The oligosaccharide mixture of any one of aspects 36 to 46, wherein the oligosaccharide mixture is comprised of a different combination of oligosaccharides than if a strong Arrhenius base was used as the cleavage reagent in step (c).

48. The oligosaccharide mixture of any one of aspects 36 to 47, wherein the one or more polysaccharide of step (a) is derived from, or is in the form of at least one material selected from the group consisting of plants, bacteria, yeast, algae, animals, fungi, and waste product stream material.

49. The oligosaccharide mixture of any one of aspects 36 to 48, wherein the one or more polysaccharide of step (a) comprise one or more polysaccharide selected from the group consisting of amylose, amylopectin, betaglucan, pullulan, xyloglucan, arabinogalactan I and arbinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, lichenan, and inulin.

50. A method for cleaving polysaccharides, comprising:

a) contacting one or more polysaccharide with a Fenton's reagent, comprising a peroxide agent and metal ions to form a mixture;

b) allowing the Fenton's reagent to react with the polysaccharide for a specified reaction time; and c) after passage of the specified reaction time of step b, adding a cleavage agent which may also be a peroxide quenching reagent to the mixture.

51. The method of aspect 50, wherein steps (a) and (b) are performed at a pH between pH 4 and pH 7.

52. The method of aspect 50 or 51, wherein steps (a) and (b) are performed at a pH between pH 4.5 and pH 6.5.

53. The method of any one of aspects 50 to 52, wherein steps (a) and (b) are performed at a pH between pH 5 and pH 6.

54. The method of any one of aspects 50 to 53, wherein the step (c) is performed at a pH between 6 and 11.

55. The method of any one of aspects 50 to 54, wherein the step (c) is performed at a pH between 6.5 and 9.5.

56. The method of any one of aspects 50 to 55, wherein the step (c) is performed at a pH between 7 and 9.

57. The method of any one of aspects 50 to 56, wherein the step (c) is performed at a pH between 7 and 8.

58. The method of any one of aspects 50 to 57, wherein steps (a) and (b) are performed at a temperature between 10 and 70 degrees Celsius.

59. The method of any one of aspects 50 to 58, wherein steps (a) and (b) are performed at a temperature between 20 and 60 degrees Celsius.

60. The method of any one of aspects 50 to 59, wherein steps (a) and (b) are performed at a temperature between 25 and 55 degrees Celsius.

61. The method of any one of aspects 50 to 60, wherein the step (c) is performed at a temperature between 10 and 70 degrees Celsius.

62. The method of any one of aspects 50 to 61, wherein the step (c) is performed at a temperature between 20 and 60 degrees Celsius.

63. The method of any one of aspects 50 to 62, wherein the step (c) is performed at a temperature between 25 and 55 degrees Celsius.

64. The method of any one of aspects 50 to 63, wherein the Fenton's reagent comprises hydrogen peroxide, and one or more metals selected from the group consisting of transition metals Fe(II), Fe(III), Cu(I), Cu(II), Mn(II), Zn(II), Ni(II), and Co(II), alkaline earth metals Ca(II) and Mg(II), and the lanthanide Ce(IV).

65. The method of aspect 64, wherein the Fenton's reagent comprises hydrogen peroxide and one or more metals selected from Fe(II), Fe(III), Cu(I), and Cu(II).

66. The method of aspect 65, wherein the Fenton's reagent comprises hydrogen peroxide and Fe(III).

67. The method of any one of aspects 50 to 66, wherein the cleavage agent which may also be a peroxide quenching reagent is both a peroxide quenching and cleavage agent.

68. The method of any one of aspects 50 to 67, wherein the cleavage agent which may also be a peroxide quenching reagent is one or more selected from the group consisting of ammonium hydroxide, ammonium bicarbonate, ammonia, urea, sodium amide, dimethyl amine, trimethylamine, pyridine, and N,N-diisopropylethylamine.

69. The method of aspect 68, wherein the cleavage agent which may also be a peroxide quenching reagent is one or more selected from the group consisting of ammonium hydroxide, ammonium bicarbonate, and ammonia.

70. The method of any one of aspects 50 to 69, wherein the cleavage agent which may also be a peroxide quenching reagent is a cleavage agent and not a peroxide quenching agent, and the method further comprises initiation of peroxide quenching with an additional agent that is a peroxide-quenching agent.

71. The method of aspect 70, wherein the additional peroxide-quenching agent comprises one or more peroxide-quenching agents listed in Table 1, or a peroxide quenching enzyme.

72. The method of aspect 70 or 71, wherein the additional peroxide-quenching agent is also an additional polysaccharide cleavage reagent that cleaves the treated polysaccharide.

73. The method of any one of aspects 70 to 72, wherein the additional peroxide-quenching agent is introduced prior to, commensurate with, or subsequent to initiation of polysaccharide cleavage with the cleavage agent which may also be a peroxide quenching reagent.

74. The method of any one of aspects 50 to 73, further comprising removing the cleavage agent which may also be a peroxide quenching reagent, and/or quenching agent, or one or more reaction components thereof, by vaporization.

75. The method of any one of aspects 50 to 74, wherein the oligosaccharide yield is enhanced and/or wherein off-target side reactions and/or peeling are reduced, relative to cleaving the treated polysaccharide with a strong Arrhenius base in step (c).

76. The method of any one of aspects 50 to 75, wherein the one or more polysaccharide is derived from, or are in the form of at least one material selected from the group consisting of plants, bacteria, yeast, algae, animals, fungi, and waste product stream material.

77. The method of any one of aspects 50 to 76, wherein the one or more polysaccharide comprises one or more selected from the group consisting of amylose, amylopectin, betaglucan, pullulan, xyloglucan, arabinogalactan I and arabinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, lichenan, and inulin.

78. The method of any one of aspects 50 to 77, wherein the reacting and the cleaving alter at least one structural and/or chemical property of a material comprising the one or more polysaccharide, wherein the property is selected from the group consisting of solubility, texture, porosity, permeability, resiliency, rheological properties, and chemical reactivity.

79. The method of any one of aspects 50 to 78, wherein the specified reaction time of step (b) is performed for 1 to 3 hours.

80. The method of any one of aspects 50 to 79, wherein the specified reaction time of step (b) is performed for 1.5 to 2.5 hours.

81. The method of any one of aspects 50 to 80, wherein step (c) is performed such that it is concluded by evaporation of the cleavage agent which may also be a peroxide quenching reagent.

82. A composition comprising one or more polysaccharide cleavage products, oligosaccharides, or mixtures of polysaccharide cleavage products and/or oligosaccharides generated by the method of any one of aspects 50-81.

83. A method of modulating microbial growth and/or microbial or host metabolism, comprising contacting, in vitro or in vivo, microbes with a composition according to aspect 82.

84. A synthetic oligosaccharide comprising an α-1,4 glucose backbone wherein the total number of monomers in the synthetic oligosaccharide ranges from 3 to 30.

85. The synthetic oligosaccharide of aspect 84, wherein the synthetic oligosaccharide may comprise α-1,4,6 glucose branches, which may terminate or extend in an α-1,4 fashion.

86. The synthetic oligosaccharide of aspect 84 or 85, wherein the oligosaccharide is described by the mass and retention time identifiers in Table 6.

87. The synthetic oligosaccharide of aspect 86, wherein the sum of compounds 1, 7, 10, 12, 14, 16, 17, 18, 22, 24, 26, 28 make up at least 94% of the peak volume found in Table 6.

88. The synthetic oligosaccharide of aspect 86, wherein the sum of compounds 1, 7, 10, 12, 14, 16, 17, 18, 22, 24, 26, 28 make up 80-95% of the peak volume found in Table 6.

89. The synthetic oligosaccharide of any one of aspects 84 to 88, wherein the synthetic oligosaccharide comprises 1H-13C 2D-NMR (HSQC) peaks within 10% of those described in Table 5 as amylopectin.

90. The synthetic oligosaccharide of any one of aspects 84 to 89, wherein the synthetic oligosaccharide comprises 20-40% terminal, α-1,4, and α-1,4,6 glycosidic bonds.

91. The synthetic oligosaccharide of any one of aspects 84 to 89, wherein the synthetic oligosaccharide comprises 40-60% terminal, α-1,4, and α-1,4,6 glycosidic bonds.

92. The synthetic oligosaccharide of any one of aspects 84 to 89, wherein the synthetic oligosaccharide comprises 60-80% terminal, α-1,4, and α-1,4,6 glycosidic bonds.

93. The synthetic oligosaccharide of any one of aspects 84 to 89, wherein the oligosaccharides comprise at least 80% terminal, α-1,4, and α-1,4,6 glycosidic bonds.

94. A synthetic oligosaccharide comprising a β-1,4 xylose backbone wherein the total number of monomers in the synthetic oligosaccharide ranges from 3 to 30.

95. The synthetic oligosaccharide of aspect 94, wherein the synthetic oligosaccharide may comprise α-1,3 and/or α-1,2 arabinose branches.

96. The synthetic oligosaccharide of aspect 94 or 95, wherein the synthetic oligosaccharide is described by the mass and retention time identifiers in Table 7.

97. The synthetic oligosaccharide of aspect 96, where the sum of compounds 3, 4, 5, 7, 11, 12, 13, 20, 22 make up at least 55% of the peak volume found in Table 7.

98. The synthetic oligosaccharide of aspect 96, where the sum of compounds 3, 4, 5, 7, 11, 12, 13, 20, 22 make up 40-60% of the peak volume found in Table 7.

99. The synthetic oligosaccharide of aspect 96, where the sum of compounds 7, 12, 13, 20, 22 make up at least 35% of the peak volume found in Table 7.

100. The synthetic oligosaccharide of aspect 96, where the sum of compounds 7, 12, 13, 20, 22 make up 20-40% of the peak volume found in Table 7.

101. The synthetic oligosaccharide of any one of aspects 94 to 100, wherein the synthetic oligosaccharide comprises 1H-13C 2D-NMR (HSQC) peaks within 10% of those described in Table 5 as arabinoxylan.

102. The synthetic oligosaccharide of any one of aspect 94 to 101, wherein the synthetic oligosaccharide comprises 20-40% terminal xylose, terminal arabinose, β-1,4 xylose, α-1,3 xylose, α-1,2 xylose and trisecting α-1,2,3 xylose.

103. The synthetic oligosaccharide of any one of aspect 94 to 101, wherein the synthetic oligosaccharide comprises 40-60% terminal xylose, terminal arabinose, β-1,4 xylose, α-1,3 xylose, α-1,2 xylose and trisecting α-1,2,3 xylose.

104. The synthetic oligosaccharide of any one of aspect 94 to 101, wherein the synthetic oligosaccharide comprises 60-80% terminal xylose, terminal arabinose, β-1,4 xylose, α-1,3 xylose, α-1,2 xylose and trisecting α-1,2,3 xylose.

105. The synthetic oligosaccharide of any one of aspect 94 to 101, wherein the synthetic oligosaccharide comprises at least 80% terminal xylose, terminal arabinose, β-1,4 xylose, α-1,3 xylose, α-1,2 xylose and trisecting α-1,2,3 xylose.

106. A synthetic oligosaccharide comprising a β-1,4 glucose backbone wherein the total number of monomers in the synthetic oligosaccharide ranges from 3 to 30.

107. The synthetic oligosaccharide of aspect 106, wherein the synthetic oligosaccharide comprises α-1,6 xylose branches, which can be extended by β-2,1 galactose.

108. The synthetic oligosaccharide of aspect 106 or 107, wherein the oligosaccharide is described by the mass and retention time identifiers in Table 8.

109. The synthetic oligosaccharide of aspect 108, wherein the sum of compounds 1, 3, 6, 7, 9, 16, 18, 20, 21, 22, 24, 26 make up at least 58% of the peak volume found in Table 8.

110. The synthetic oligosaccharide of aspect 108, where the sum of compounds 1, 3, 6, 7, 9, 16, 18, 20, 21, 22, 24, 26 make up 45-65% of the peak volume found in Table 8.

111. The synthetic oligosaccharide of aspect 108, where the sum of compounds 1, 3, 7, 9, 18 make up at least 36% of the peak volume found in Table 8.

112. The synthetic oligosaccharide of aspect 108, where the sum of compounds 1, 3, 7, 9, 18 make up 30-45% of the peak volume found in Table 8.

113. The synthetic oligosaccharide of any one of aspects 106 to 112, wherein the synthetic oligosaccharide comprises 1H-13C 2D-NMR (HSQC) peaks within 10% of those described in Table 5 as xyloglucan.

114. The synthetic oligosaccharide of any one of aspects 106 to 112, wherein the synthetic oligosaccharide comprises 20-40% terminal xylose, terminal glucose, (β-1,4, β-1,4,6, and β-1,6) glucose, β-2,1 xylose linkages, and terminal galactose linkages.

115. The synthetic oligosaccharide of any one of aspects 106 to 112, wherein the synthetic oligosaccharide comprises 40-60% terminal xylose, terminal glucose, (β-1,4, β-1,4,6, and β-1,6) glucose, β-2,1 xylose linkages, and terminal galactose linkages.

116. The synthetic oligosaccharide of any one of aspects 106 to 112, wherein the synthetic oligosaccharide comprises 60-80% terminal xylose, terminal glucose, (β-1,4, β-1,4,6, and β-1,6) glucose, β-2,1 xylose linkages, and terminal galactose linkages.

117. The synthetic oligosaccharide of any one of aspects 106 to 112, wherein the synthetic oligosaccharide comprises at least 80% terminal xylose, terminal glucose, (β-1,4, β-1,4,6, and β-1,6) glucose, β-2,1 xylose linkages, and terminal galactose linkages.

118. A synthetic oligosaccharide comprising a combination of β-1,4 and β-1,3 glucose backbone wherein the total number of monomers in the synthetic oligosaccharide ranges from 3 to 30.

119. The synthetic oligosaccharide of aspect 118, wherein the synthetic oligosaccharide comprises β-1,4 glucose and β-1,3 glucose alternating in a repeating manner.

120. The synthetic oligosaccharide of aspect 118 or 119, wherein the synthetic oligosaccharide is described by the mass and retention time identifiers in Table 9 and Table 13.

121. The synthetic oligosaccharide of aspect 120, wherein the sum of compounds 2, 4, 12, 14 make up at least 42% of the peak volume found in Table 13.

122. The synthetic oligosaccharide of aspect 120, wherein the sum of compounds 2, 4, 12, 14 make up 35-50% of the peak volume found in Table 13.

123. The synthetic oligosaccharide of aspect 120, wherein the sum of compounds 1, 2, 4, 6, 7, 12 make up at least 62% of the peak volume found in Table 13.

124. The synthetic oligosaccharide of aspect 120, wherein the sum of compounds 1, 2, 4, 6, 7, 12 make up 55-75% of the peak volume found in Table 13.

125. The synthetic oligosaccharide of aspect 120, wherein the sum of compounds 5, 11, 14, 16, 20, 22, 27, 31, 32, 33 make up at least 73% of the peak volume found in Table 9.

126. The synthetic oligosaccharide of aspect 120, wherein the sum of compounds 5, 11, 14, 16, 20, 22, 27, 31, 32, 33 make up 65-85% of the peak volume found in Table 9.

127. The synthetic oligosaccharide of aspect 120, wherein the sum of compounds 1, 5, 6, 14, 16, 21, 27, 33, 38, 40 make up at least 51% of the peak volume found in Table 9.

128. The synthetic oligosaccharide of aspect 120, wherein the sum of compounds 1, 5, 6, 14, 16, 21, 27, 33, 38, 40 make up 40-60% of the peak volume found in Table 9.

129. The synthetic oligosaccharide of any of aspects 120 to 128, wherein the synthetic oligosaccharide comprises 1H-13C 2D-NMR (HSQC) peaks within 10% of those described in Table 5 as lichenan or beta glucan.

130. The synthetic oligosaccharide of any of aspects 120 to 129, wherein the synthetic oligosaccharide comprises 20-40% terminal glucose, β-1,4 glucose, and β-1,3 glucose linkages.

131. The synthetic oligosaccharide of any of aspects 120 to 129, wherein the synthetic oligosaccharide comprises 40-60% terminal glucose, β-1,4 glucose, and β-1,3 glucose linkages.

132. The synthetic oligosaccharide of any of aspects 120 to 129, wherein the synthetic oligosaccharide comprises 60-80% terminal glucose, β-1,4 glucose, and β-1,3 glucose linkages.

133. The synthetic oligosaccharide of any of aspects 120 to 129, wherein the synthetic oligosaccharide comprises at least 80% terminal glucose, β-1,4 glucose, and β-1,3 glucose linkages.

134. A synthetic oligosaccharide comprising a β-1,4 galactose backbone wherein the total number of monomers in the synthetic oligosaccharide ranges from 3 to 30.

135. The synthetic oligosaccharide of aspect 134, wherein the synthetic oligosaccharide comprises α-1,6 mannose branches from 22-4-% of the time.

136. The synthetic oligosaccharide of aspect 134 or 135, wherein the synthetic oligosaccharide is described by the mass and retention time identifiers in Table 10 and Table 18.

137. The synthetic oligosaccharide of aspect 136, where the sum of compounds 4, 7, 11, 20, 26, 38, 41, 44 make up at least 38% of the peak volume found in Table 10.

138. The synthetic oligosaccharide of aspect 136, where the sum of compounds 4, 7, 11, 20, 26, 38, 41, 44 make up at least 30-50% of the peak volume found in Table 10.

139. The synthetic oligosaccharide of aspect 136, where the sum of compounds 4, 5, 6, 7, 10, 11, 12, 20, 26, 37 make up at least 55% of the peak volume found in Table 10.

140. The synthetic oligosaccharide of aspect 136, where the sum of compounds 4, 5, 6, 7, 10, 11, 12, 20, 26, 37 make up 45-65% of the peak volume found in Table 10.

141. The synthetic oligosaccharide of aspect 136, where the sum of compounds 4, 5, 8, 9, 10, 13, 18, 20, 24, 31 make up at least 51% of the peak volume found in Table 18.

142. The synthetic oligosaccharide of aspect 136, where the sum of compounds 4, 5, 8, 9, 10, 13, 18, 20, 24, 31 make up 40-60% of the peak volume found in Table 18.

143. The synthetic oligosaccharide of aspect 136, where the sum of compounds 5, 8, 13, 18, 20, 24, 31, 35, 39 make up at least 33% of the peak volume found in Table 18.

144. The synthetic oligosaccharide of aspect 136, where the sum of compounds 5, 8, 13, 18, 20, 24, 31, 35, 39 make up 25-40% of the peak volume found in Table 18.

145. The synthetic oligosaccharide of any one of aspects 136 to 144, wherein the synthetic oligosaccharide comprises 1H-13C 2D-NMR (HSQC) peaks within 10% of those described in Table 5 as galactomannan and locust bean gum.

146. The synthetic oligosaccharide of any one of aspects 136 to 145, wherein the synthetic oligosaccharides comprises 20-40% terminal galactose, terminal mannose, β-1,4 and β-1,4,6 mannose linkages.

147. The synthetic oligosaccharide of any one of aspects 136 to 145, wherein the synthetic oligosaccharides comprises 40-60% terminal galactose, terminal mannose, β-1,4 and β-1,4,6 mannose linkages.

148. The synthetic oligosaccharide of any one of aspects 136 to 145, wherein the synthetic oligosaccharides comprises 60-80% terminal galactose, terminal mannose, β-1,4 and β-1,4,6 mannose linkages.

149. The synthetic oligosaccharide of any one of aspects 136 to 145, wherein the synthetic oligosaccharides comprises at least 80% terminal galactose, terminal mannose, β-1,4 and β-1,4,6 mannose linkages.

150. A synthetic oligosaccharide comprising a β-1,3 galactose backbone wherein the total number of monomers in the synthetic oligosaccharide ranges from 3 to 30.

151. The synthetic oligosaccharide of aspect 150, wherein the synthetic oligosaccharide comprises β-1,6 galactose, β-1,3 galactose and β-1,3,6 galactose branches of lengths from 1-4 and terminal arabinose caps.

152. The synthetic oligosaccharide of aspect 150 or 151, wherein the synthetic oligosaccharide is described by the mass and retention time identifiers in Table 11.

153. The synthetic oligosaccharide of aspect 152, where the sum of compounds 7, 9, 11, 19, 25, 27, 30, 32, 36, 37, 41, 44, 47, 54, 59 make up at least 35% of the peak volume found in Table 11.

154. The synthetic oligosaccharide of aspect 152, where the sum of compounds 7, 9, 11, 19, 25, 27, 30, 32, 36, 37, 41, 44, 47, 54, 59 make up 28-42% of the peak volume found in Table 11.

155. The synthetic oligosaccharide of aspect 152, where the sum of compounds 5, 9, 10, 12, 14, 18, 25, 32, 37, 53 make up at least 50% of the peak volume found in Table 11.

156. The synthetic oligosaccharide of aspect 152, where the sum of compounds 5, 9, 10, 12, 14, 18, 25, 32, 37, 53 make up 40-60% of the peak volume found in Table 11.

157. The synthetic oligosaccharide of any one of aspects 152 to 156, wherein the synthetic oligosaccharide comprises 1H-13C 2D-NMR (HSQC) peaks within 10% of those described in Table 5 as arabinogalactan.

158. The synthetic oligosaccharide of any one of aspects 152 to 157, wherein the oligosaccharides comprise 20-40% terminal galactose, terminal arabinose, β-1,3 galactose, β-1,3,6 galactose.

159. The synthetic oligosaccharide of any one of aspects 152 to 157, wherein the oligosaccharides comprise 40-60% terminal galactose, terminal arabinose, β-1,3 galactose, β-1,3,6 galactose.

160. The synthetic oligosaccharide of any one of aspects 152 to 157, wherein the oligosaccharides comprise 60-80% terminal galactose, terminal arabinose, β-1,3 galactose, β-1,3,6 galactose.

161. The synthetic oligosaccharide of any one of aspects 152 to 157, wherein the oligosaccharides comprise at least 80% terminal galactose, terminal arabinose, β-1,3 galactose, β-1,3,6 galactose.

162. A synthetic oligosaccharide comprising a β-1,3 glucose backbone wherein the total number of monomers in the synthetic oligosaccharide ranges from 3 to 30.

163. The synthetic oligosaccharide of aspect 162, wherein the synthetic oligosaccharide is described by the mass and retention time identifiers in Table 12.

164. The synthetic oligosaccharide of aspect 162 or 163, where the sum of compounds 1, 4, 7, 9, 10 make up at least 91% of the peak volume found in Table 12.

165. The synthetic oligosaccharide of aspect 162 or 163, where the sum of compounds 1, 4, 7, 9, 10 make up at least 80-98% of the peak volume found in Table 12.

166. The synthetic oligosaccharide of aspect 162 or 163, where the sum of compounds 2, 3, 5, 6, 8 make up at least 8% of the peak volume found in Table 12.

167. The synthetic oligosaccharide of aspect 162 or 163, where the sum of compounds 2, 3, 5, 6, 8 make up at least 1-15% of the peak volume found in Table 12.

168. The synthetic oligosaccharide of any one of aspects 162 to 167, wherein the synthetic oligosaccharide comprises 1H-13C 2D-NMR (HSQC) peaks within 10% of those described in Table 5 as curdlan.

169. The synthetic oligosaccharide of any one of aspects 162 to 168, wherein the oligosaccharides comprise 20-40% terminal glucose, and β-1,3 glucose linkages.

170. The synthetic oligosaccharide of any one of aspects 162 to 168, wherein the oligosaccharides comprise 40-60% terminal glucose, and β-1,3 glucose linkages.

171. The synthetic oligosaccharide of any one of aspects 162 to 168, wherein the oligosaccharides comprise 60-80% terminal glucose, and β-1,3 glucose linkages.

172. The synthetic oligosaccharide of any one of aspects 162 to 168, wherein the oligosaccharides comprise at least 80% terminal glucose, and β-1,3 glucose.

173. A synthetic oligosaccharide comprising a backbone of repeating linear β-1,4 mannose wherein the total number of monomers in the synthetic oligosaccharide ranges from 3 to 30.

174. The synthetic oligosaccharide of aspect 173, wherein the oligosaccharide is described by the mass and retention time identifiers in Table 14.

175. The synthetic oligosaccharide of aspect 173 or 174, where the sum of compounds 2, 6, 10, 11, 14, 19, 20, 21, 25, 27 make up at least 58% of the peak volume found in Table 14.

176. The synthetic oligosaccharide of aspect 173 or 174, where the sum of compounds 2, 6, 10, 11, 14, 19, 20, 21, 25, 27 make up 50-70% of the peak volume found in Table 14.

177. The synthetic oligosaccharide of any one of aspects 173 to 176, wherein the synthetic oligosaccharides comprise 1H-13C 2D-NMR (HSQC) peaks within 10% of those described in Table 5 as mannan.

178. The synthetic oligosaccharide of any one of aspects 173 to 177, wherein the synthetic oligosaccharides comprise 20-40% terminal mannose, and β-1,4 mannose linkages.

179. The synthetic oligosaccharide of any one of aspects 173 to 177, wherein the synthetic oligosaccharides comprise 40-60% terminal mannose, and β-1,4 mannose linkages.

180. The synthetic oligosaccharide of any one of aspects 173 to 177 wherein the synthetic oligosaccharides comprise 60-80% terminal mannose, and β-1,4 mannose linkages.

181. The synthetic oligosaccharide of any one of aspects 173 to 177, wherein the synthetic oligosaccharides comprise at least 80% terminal mannose, and β-1,4 mannose linkages.

182. A synthetic oligosaccharide comprising a β-1,4 xylose backbone wherein the total number of monomers in the synthetic oligosaccharide ranges from 3 to 30.

183. The synthetic oligosaccharide of aspect 182, wherein the synthetic oligosaccharide comprises α-1,2 Glucuronic acid-4-OMe branch on approximately 13% of the backbone units.

184. The synthetic oligosaccharide of aspect 182 or 183, wherein the oligosaccharide is described by the mass and retention time identifiers in Table 15.

185. The synthetic oligosaccharide of any one of aspects 182 to 184, wherein the sum of compounds 3, 4, 10, 14, 15 make up at least 66% of the peak volume found in Table 15.

186. The synthetic oligosaccharide of any one of aspects 182 to 184, wherein the sum of compounds 3, 4, 10, 14, 15 make up 55-75% of the peak volume found in Table 15.

187. The synthetic oligosaccharide of any one of aspects 182 to 184, wherein the sum of compounds 2, 6, 7, 8, 9, 11, 12, 13 make up at least 31% of the peak volume found in Table 15.

188. The synthetic oligosaccharide of any one of aspects 182 to 184, where the sum of compounds 2, 6, 7, 8, 9, 11, 12, 13 make up 20-40% of the peak volume found in Table 15.

189. The synthetic oligosaccharide of any one of aspects 182 to 188, wherein the synthetic oligosaccharide comprises 1H-13C 2D-NMR (HSQC) peaks within 10% of those described in Table 5 as xylan.

190. The synthetic oligosaccharide of any one of aspects 182 to 189, wherein the synthetic oligosaccharide comprises 20-40% terminal xylose, and β-1,4 xylose linkages, and terminal glucuronic acid-4-OMe.

191. The synthetic oligosaccharide of any one of aspects 182 to 189, wherein the synthetic oligosaccharide comprises 40-60% terminal xylose, and β-1,4 xylose linkages, and terminal glucuronic acid-4-OMe.

192. The synthetic oligosaccharide of any one of aspects 182 to 189, wherein the synthetic oligosaccharide comprises 60-80% terminal xylose, and β-1,4 xylose linkages, and terminal glucuronic acid-4-OMe.

193. The synthetic oligosaccharide of any one of aspects 182 to 189, wherein the synthetic oligosaccharide comprises at least 80% terminal xylose, and β-1,4 xylose linkages, and terminal glucuronic acid-4-OMe.

194. A synthetic oligosaccharide comprising a β-1,4 galactose backbone wherein the total number of monomers in the synthetic oligosaccharide ranges from 3 to 30.

195. The synthetic oligosaccharide of aspect 195, wherein the synthetic oligosaccharide comprises β-1,4 linked galactose in linear repeating chain.

196. The synthetic oligosaccharide of aspect 194 or 195, wherein the synthetic oligosaccharide is described by the mass and retention time identifiers in Table 16.

197. The synthetic oligosaccharide of aspect 196, where the sum of compounds 2, 5, 9, 11, 13 make up at least 37% of the peak volume found in Table 16.

198. The synthetic oligosaccharide of aspect 196, where the sum of compounds 2, 5, 9, 11, 13 make up 30-45% of the peak volume found in Table 16.

199. The synthetic oligosaccharide of aspect 196, where the sum of compounds 2, 5, 6, 7, 9, 10, 12, 15 make up at least 77% of the peak volume found in Table 16.

200. The synthetic oligosaccharide of aspect 196, where the sum of compounds 2, 5, 6, 7, 9, 10, 12, 15 make up 65-85% of the peak volume found in Table 16.

201. The synthetic oligosaccharide of any one of aspects 194 to 200, wherein the synthetic oligosaccharide comprises 20-40% terminal galactose, and β-1,4 galactose linkages.

202. The synthetic oligosaccharide of any one of aspects 194 to 200, wherein the synthetic oligosaccharide comprises 40-60% terminal galactose, and β-1,4 galactose linkages.

203. The synthetic oligosaccharide of any one of aspects 194 to 200, wherein the synthetic oligosaccharide comprises 60-80% terminal xylose, and β-1,4 xylose linkages.

204. The synthetic oligosaccharide of any one of aspects 194 to 200, wherein the synthetic oligosaccharide comprises at least 80% terminal xylose, and β-1,4 xylose linkages.

205. A synthetic oligosaccharide comprising a backbone with both β-1,4 mannose and β-1,4 glucose wherein the total number of monomers in the synthetic oligosaccharide ranges from 3 to 30.

206. The synthetic oligosaccharide of aspect 205, wherein the synthetic oligosaccharide comprises β-1,4 linked mannose in linear repeating chain wherein approximately every 3rd unit is a β-1,4 glucose.

207. The synthetic oligosaccharide of aspect 205 or 206, wherein the synthetic oligosaccharide is described by the mass and retention time identifiers in Table 17.

208. The synthetic oligosaccharide of aspect 207, wherein the sum of compounds 7, 8, 13, 15, 18, 33, 36, 39, 64, 68, 71, 72, 73, 74 make up at least 39% of the peak volume found in Table 17.

209. The synthetic oligosaccharide of aspect 207, wherein the sum of compounds 7, 8, 13, 15, 18, 33, 36, 39, 64, 68, 71, 72, 73, 74 make up 30-50% of the peak volume found in Table 17.

210. The synthetic oligosaccharide of aspect 207, wherein the sum of compounds 4, 7, 8, 13, 16, 18, 33, 36, 39, 74 make up at least 37% of the peak volume found in Table 17.

211. The synthetic oligosaccharide of aspect 207, wherein the sum of compounds 4, 7, 8, 13, 16, 18, 33, 36, 39, 74 make up at least 30-50% of the peak volume found in Table 17.

212. The synthetic oligosaccharide of any one of aspects 205 to 211, wherein the synthetic oligosaccharide comprises 1H-13C 2D-NMR (HSQC) peaks within 10% of those described in Table 5 as glucomannan.

213. The synthetic oligosaccharide of any one of aspects 205 to 212, wherein the synthetic oligosaccharide comprises 20-40% terminal mannose, terminal glucose, β-1,4 mannose and β-1,4 glucose linkages.

214. The synthetic oligosaccharide of any one of aspects 205 to 212, wherein the oligosaccharide comprises 40-60% terminal mannose, terminal glucose, β-1,4 mannose and β-1,4 glucose linkages.

215. The synthetic oligosaccharide of any one of aspects 205 to 212, wherein the oligosaccharide comprises 60-80% terminal mannose, terminal glucose, β-1,4 mannose and β-1,4 glucose linkages.

216. The synthetic oligosaccharide of any one of aspects 205 to 212, wherein the oligosaccharide comprises at least 80% terminal mannose, terminal glucose, β-1,4 mannose and β-1,4 glucose linkages.

217. A synthetic oligosaccharide generated from corn fiber.

218. The synthetic oligosaccharide of aspect 217, wherein the synthetic oligosaccharide comprises a β-1,4 xylose backbone wherein the total number of monomers in the synthetic oligosaccharide ranges from 3 to 30.

219. The synthetic oligosaccharide of aspect 218, wherein the synthetic oligosaccharide further comprises α-1,3 and/or α-1,2 arabinose branches.

220. The synthetic oligosaccharide of any one of aspects 217 to 219, wherein the synthetic oligosaccharide is described by the mass and retention time identifiers in Table 19.

221. The synthetic oligosaccharide of aspect 220, where the sum of compounds 1, 4, 8, 9, 10, 16 make up at least 44% of the peak volume found in Table 19.

222. The synthetic oligosaccharide of aspect 220, where the sum of compounds 1, 4, 8, 9, 10, 16, make up 35-55% of the peak volume found in Table 19.

223. The synthetic oligosaccharide of aspect 220, where the sum of compounds 9, 10, 11, 13, 14, 15, 17 make up at least 54% of the peak volume found in Table 19.

224. The synthetic oligosaccharide of aspect 220, where the sum of compounds 9, 10, 11, 13, 14, 15, 17 make up 45-65% of the peak volume found in Table 19.

225. The synthetic oligosaccharide of aspect 220, where the sum of compounds 1, 2, 3, 4, 5, 7 make up at least 23% of the peak volume found in Table 19.

226. The synthetic oligosaccharide of aspect 220, where the sum of compounds 1, 2, 3, 4, 5, 7 make up 15-35% of the peak volume found in Table 19.

227. The synthetic oligosaccharide of aspect 220, where the sum of compounds 8, 12, 16 make up at least 12% of the peak volume found in Table 19.

228. The synthetic oligosaccharide of aspect 220, where the sum of compounds 8, 12, 16 make up at least 5-20% of the peak volume found in Table 19.

229. The synthetic oligosaccharide of any one of aspects 217 to 228, wherein the synthetic oligosaccharide comprises 1H-13C 2D-NMR (HSQC) peaks within 10% of those described in Table 5 as corn fiber.

230. The synthetic oligosaccharide of any one of aspects 217 to 228, wherein the synthetic oligosaccharide comprises 20-40% terminal xylose, terminal arabinose, β-1,4, and α-1,3 arabinose, and α-1,2 arabinose linkages.

231. The synthetic oligosaccharide of any one of aspects 217 to 228, wherein the synthetic oligosaccharide comprises 40-60% terminal xylose, terminal arabinose, β-1,4, and α-1,3 arabinose, and α-1,2 arabinose linkages.

232. The synthetic oligosaccharide of any one of aspects 217 to 228, wherein the synthetic oligosaccharide comprises 60-80% terminal xylose, terminal arabinose, β-1,4, and α-1,3 arabinose, and α-1,2 arabinose linkages.

233. The synthetic oligosaccharide of any one of aspects 217 to 228, wherein the synthetic oligosaccharide comprises at least 80% terminal xylose, terminal arabinose, β-1,4, and α-1,3 arabinose, and α-1,2 arabinose linkages.

234. A pool of oligosaccharides produced by the method of any one of aspects 1 to 33 or 50 to 81 which does not comprise one or more of the oligosaccharides indicated in Table 20 to be unique to the depolymerization process referred to as FITDOG.

235. The synthetic oligosaccharide of any one of aspects 84 to 233, wherein the synthetic oligosaccharide does not comprise one or more of the oligosaccharides indicated in Table 20 to be unique to the depolymerization process referred to as FITDOG.

DETAILED DESCRIPTION OF ASPECTS OF THE INVENTION

Figure 1:
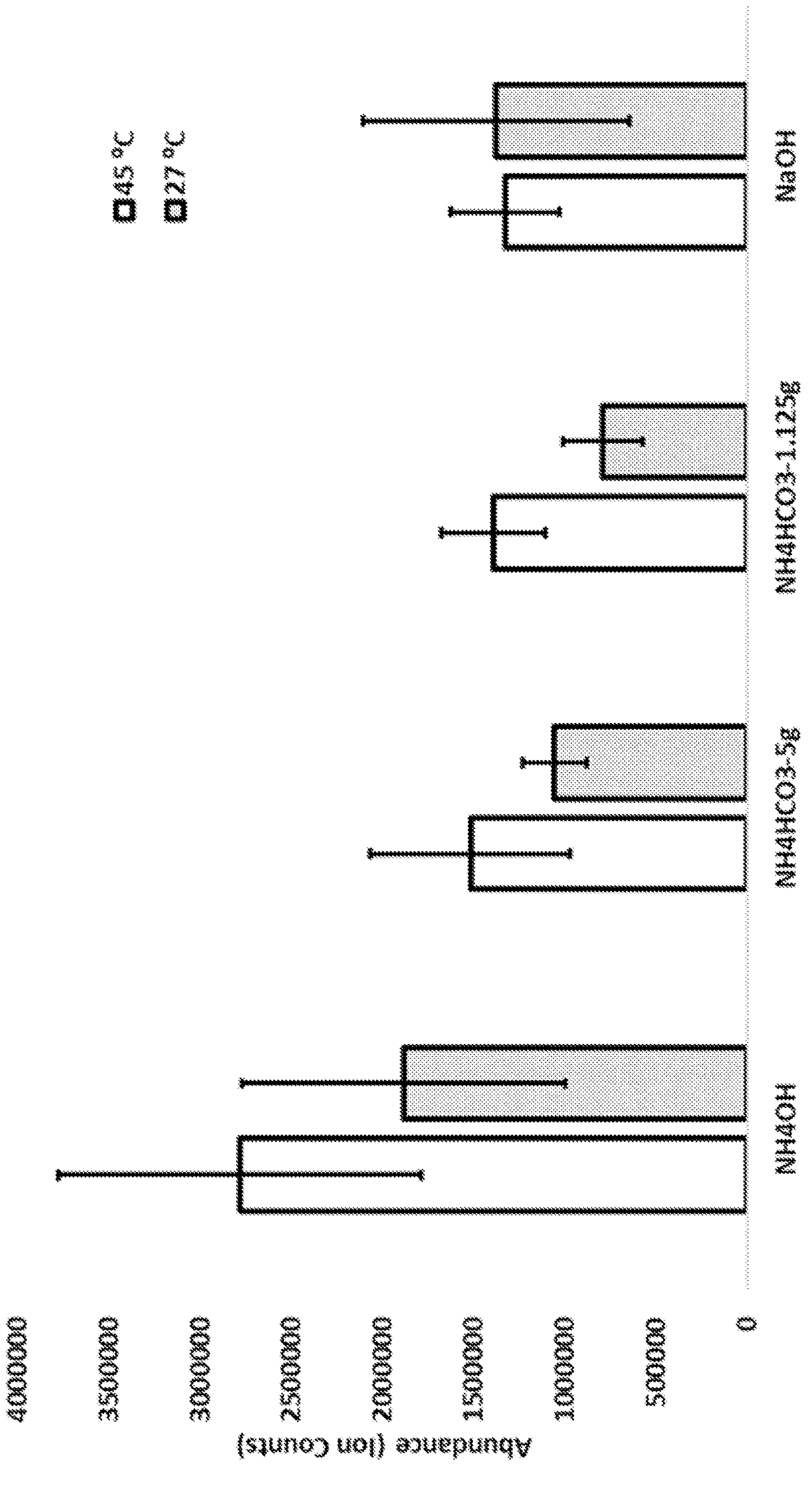
FIG. 1 shows, by way of non-limiting examples of the present invention, comparison of the total production of oligosaccharides from locust bean gum by different cleaving reagents and temperatures.

Provided are high-yield peroxide-quench-controlled methods (Controlled Oligosaccharide Generation ("COG") methods) for producing oligosaccharides from polysaccharides (PS) comprising a multi-step reaction (e.g., two-step, three-step, etc., reaction) that includes an initial oxidative step using a Fenton's system/reagent and a subsequent peroxide-quenching/PS-cleavage step using either: a PS-cleavage agent that also functions as a peroxide-quenching agent; or using a PS-cleavage agent in combination with a compatible peroxide-quenching reagent that does not interfere with the PS-cleavage reaction. In the methods, the PS-cleavage agent may be, for example, a weak-Arrhenius base or non-Arrhenius base. In the methods, the PS-cleavage initiator preferably also functions as a peroxide-quencher to quench (e.g., sufficiently reduce or eliminate) residual hydrogen peroxide and/or radicals thereof to minimize or eliminate off-target side reactions. Methods of the invention, for example, comprise reacting polysaccharides with hydrogen peroxide and a suitable metal or metal ion (e.g., Fe(II), Fe(III), Cu(I), Cu(II), Ca(II), Mg(II), Mn(II), Zn(II), Ni(II), Ce(IV), Co(II) or other metal ions) as discussed herein, followed by cleaving glycosidic linkages in the hydroperoxyl-treated polysaccharides with a high-yield peroxide-quenching/cleavage agent such as ammonium bicarbonate, ammonium hydroxide, ammonia, urea, sodium amide, or other ammonium-based reagent, thereby generating high yields of oligosaccharides, and lower molecular weight polysaccharides (polysaccharide cleavage products that are yet polysaccharides) from the parent (starting material) polysaccharides, while reducing or eliminating peeling and unwanted side-reactions.

In the methods described herein, the cleavage reagent (cleavage initiator) may also be, and preferably is a peroxide-quenching reagent, and in either case may be used in combination with an additional compatible peroxide-quenching agent that may or may not also be a cleavage agent. Exemplary cleavage, and/or peroxide-quenching agents are listed in Table 1.

In the disclosed COG methods, use of a peroxide-quencher to quench (e.g., sufficiently reduce or eliminate) residual hydrogen peroxide and/or radicals thereof per se, minimizes or eliminates off-target side reactions.

In the disclosed COG methods, use of particular weak Arrhenius bases and/or non-Arrhenius bases (e.g., ammonium-based peroxide-quenching/PS-cleavage reagents, etc.; e.g., see Table 1) not only provides for improved high-yield oligosaccharide production (relative to the strong Arrhenius bases used in the art), but also eliminates the need for costly and time-consuming post-reaction concentration, and desalting steps.

TABLE 1

Exemplary polysaccharide (PS)-cleavage, and/or peroxide-quenching agents.

| Compound | Peroxide-quenching | Cleavage |
|---|---|---|
| Exemplary nitrogen-based, peroxide-quenching, PS-cleavage agents | | |
| Ammonium Hydroxide | Yes | Yes |
| Ammonium Bicarbonate | Yes | Yes |
| Ammonia | Yes | Yes |
| Urea | Yes | Yes |
| Sodium Amide | Yes | Yes |
| Trimethyl amine | (Yes) | Yes |
| Diethylamine | (Yes) | Yes |
| Pyridine | (Yes) | Yes |
| N,N-Diisopropyl-ethylamine | (Yes) | Yes |
| Exemplary Lewis base, peroxide-quenching, PS-cleavage agents | | |
| F- | Yes | Yes |
| H- | Yes | Yes |
| Methoxide ($CH_3O^-$) | Yes | Yes |
| Ethoxide ($C_2H_5O^-$) | Yes | Yes |
| Tertbutoxide ($C_4H_9O^-$) | Yes | Yes |
| Exemplary strong Arrhenius base, non-peroxide-quenching, PS-cleavage agents | | |
| Sodium Hydroxide | No | Yes |
| Potassium Hydroxide | No | Yes |
| Calcium Hydroxide | No | Yes |
| Cesium Hydroxide | No | Yes |
| Strontium Hydroxide | No | Yes |
| Lithium Hydroxide | No | Yes |
| Rubidium Hydroxide | No | Yes |
| Exemplary peroxide-quenching, non-PS-cleavage agents | | |
| Methanol | Yes | No |
| Acetonitrile | Yes | No |
| Formaldehyde | Yes | No |
| Chlorine Gas | Yes | No |
| Salts of Sulfite | Yes | No |
| Salts of Thiosulfite | Yes | No |
| Catalase Enzyme | Yes | No |

In the methods, the cleavage initiator may, and preferably does, also function as a peroxide-quencher to quench (sufficiently reduce or eliminate) residual peroxide and/or radicals thereof to reduce or eliminate peeling and unwanted side-reactions. Alternatively, the high-yield cleavage agent can be added to the reaction after, or along with addition of a compatible peroxide-quenching agent (that could also be a cleavage reagent). In the methods, the peroxide-quenching/cleavage agent may be, and preferably is, selected from one or more nitrogen-based agents as described herein (e.g., see Table 1, above), and not only provides high-yield cleavage and residual peroxide-quenching, but also provides for cleavage specificity tailoring (e.g., by replacing nitrogen bound hydrogen with larger moieties to sterically hinder or otherwise modify access by, or activity of the cleavage agent).

The methods, sometimes referred to herein as "COG" methods, are effective for producing bioactive oligosaccharides, and lower molecular weight polysaccharides, by digesting polysaccharides from any source, including but not limited to plants, bacteria, animals, algae, and fungi. In some aspects, the oligosaccharides are produced in the range of degree of polymerization (DP) of 3 to 20. In some aspects, polysaccharides are broken down to smaller polysaccharides. In some aspects, the described method will produce oligosaccharides for analysis and for bioactive foods that are prebiotic, anticancer, antipathogenic, or have other functions (to enhance biofuel production, the extractability of other compounds, etc.). The COG methods can be used to convert polysaccharides (e.g., from plants, bacteria, or yeast, algae, animals, fungi, and waste product streams) into bioactive oligosaccharides or smaller polysaccharides.

In some aspects, the resulting oligosaccharides may be characterized (structure and/or activities/properties. In some aspects, high performance liquid chromatography-mass spectrometry (LC-MS) analysis of the product mixture shows a number of oligosaccharide structures ranging in size from a DP of 3 to as many as 20 (or from 3 to up to 200 for example), depending on the polysaccharide source and reaction conditions. The oligosaccharide structures and compositions will depend on the polysaccharide source(s).

In some aspects, production from natural polysaccharide sources of oligosaccharides consisting of DP from 3 to 20 (or from 3 to up to 200 for example) is provided. The polysaccharides can include, for example, those from plants, algae, bacteria, animals, fungi, and waste product streams. In some aspects, the polysaccharides can come from food, agriculture, or biofuel waste products and from sources not usually considered food. In some aspects, the source of polysaccharide is processed foods, and plant products.

In some aspects, the COG methods provide for the production of oligosaccharides (e.g., having a DP between 3 and 20 (or from 3 to up to 200 for example)) from bacterial cell wall polysaccharides.

In some aspects, the COG methods provide for the production of oligosaccharides (e.g., having a DP between 3 and 20 (or from 3 to up to 200 for example)) from yeast cell wall polysaccharides.

In some aspects, the COG methods provide for the production of oligosaccharides (e.g., having a DP between 3 and 20 (or from 3 to up to 200 for example)) from algae polysaccharides.

In some aspects, the oligosaccharides are bioactive oligosaccharides (e.g., bioactive oligosaccharides consumed by bacteria beneficial to the human gut). In some aspects the oligosaccharides are consumed by bacteria beneficial to the vaginal microbiome, beneficial to the respiratory tract, or beneficial to the skin. In some aspects the oligosaccharides are consumed by bacteria beneficial to the soil microbiome. In some aspects, the bioactive oligosaccharides can modulate the immune system (e.g., to under or overreact to known and unknown stimuli). In some aspects, the bioactive oligosaccharides function as a pathogen block. In some aspects the oligosaccharides are used as starting material for biofuel production. In some aspects the oligosaccharides can be used to modulate microbial metabolite output.

In some aspects, the oligosaccharides are selective carbon substrates to stimulate growth of the microbiota of soils. In some aspects, the oligosaccharides are added to soil following a fumigation or sterilization protocols on the soil. Accessible organic carbon can drive the soil ecology in a pathogenic direction if uncontrolled. By providing specific oligosaccharides that selectively stimulate growth of (or provide a growth advantage to) beneficial soil microbiota, soil pathogen populations in the soil can be reduced. In some aspects, a combination of one or more oligosaccharide prepared as described herein can be added to soil with one or more microbe (e.g., beneficial soil microbes) to achieve a desired microbial complement or balance in the soil, or to reduce or eliminate pathogens or undesirable microbes. In some aspects, the oligosaccharides can selectively promote the growth and colonization of bacteria that can remediate soils by metabolizing contaminants or pollutants (e.g., chemicals, heavy metals, etc.) in soils. In some aspects, bacteria can be designed, through recombinant methods, to consume specific oligosaccharide structures. In some aspects, the oligosaccharides can selectively promote the growth of bacteria that, naturally or recombinantly, can produce insecticidal compounds. In some aspects, the oligosaccharides can selectively promote the growth of bacteria that produce, naturally or recombinantly, herbicidal compounds.

In some aspects, the oligosaccharides can be formulated into products for oral hygiene. In some aspects oral hygiene products can be tooth paste, mouth wash, chewing gum, mints, candies, lozenges, and floss. In some aspects, the oligosaccharides are formulated at approximately 10 mg/application. In some aspects, the oligosaccharides can be formulated at approximately 100 mg/application. In some aspects, the oligosaccharides can be formulated at approximately 200 mg or more/application.

In some aspects, the oligosaccharides may be in the form of an enterally administered composition, a topically administered composition, an intra-vaginally administered composition, or disposable absorbent article such as a diaper, a pant, an adult incontinence product, an absorbent insert for a diaper or pant, a wipe or a feminine hygiene product, such as a sanitary napkin, a tampon and a panty liner.

In some aspects, enterally administered composition contains an amount of 0.5 g to 15 g of the oligosaccharide, more preferably 1 g to 10 g. For example, the enterally administered composition may contain 2 g to 7.5 g of the oligosaccharide. The topically administered composition and the intra-vaginally administered composition preferably contain an amount of 0.1 g to 10 g of the oligosaccharide, more preferably 0.2 g to 7.5 g. For example, the topically or intra-vaginally administered composition may contain 0.5 g to 5 g of the oligosaccharide. When in the form of a disposable absorbent article, at least a portion of the article may be coated or impregnated with the oligosaccharide in an amount of 0.2 g to 200 g per square meter, preferably between 5.0 g and 100 g per square meter, more preferably between 8.0 g and 50 g per square meter. In the case of a female requiring improvement in urogenital health or treatment, the female may be administered a higher dose initially followed by a lower dose. The higher dose is preferably administered for up to 14 days, for example up to 7 days. The lower dose may be administered over an extended period of time. In the case of a female requiring management to reduce the risk of bacterial vaginosis, recurrence of bacterial vaginosis, urinary tract infection or recurrence of urinary tract infection, the female may be administered a lower maintenance dose over an extended period of time.

In some aspects, one or more oligosaccharide prepared as described herein by the COG methods can be used to generate a prebiotic for food supplementation. In some aspects, the oligosaccharides can be used to modulate appetite control and/or control of energy (caloric) intake in subject in need thereof (e.g., children, or other subjects, with excess weight and obesity).

In some aspects, a method is provided for creating soluble fiber from insoluble fiber comprising polysaccharides using the COG reaction conditions described herein. By running the reaction only to a certain extent (e.g., partial depolymerization of the polysaccharide material), compositions having desirable characteristics (e.g., gels or salves) can be generated. The COG methods can be used to soften or alter the texture, porosity, or reaction properties of polysaccharide containing materials that are exposed (e.g., soaked, or permeated to some extent with) to the reaction constituents. In some aspects, the COG methods can be used to soften (e.g., by partial depolymerization) the cell wall of plants and/or plant materials, animals, bacteria, and fungi prior to industrial processing. In some aspects, softening the cell wall of plants may result in greater extractability of valuable components. In some aspects, softening the cell wall of plants or plant materials may result in easier physical removal or separation of wanted and/or unwanted parts (e.g., shells, skins, peels, seeds). In some aspects, the invention may be used to "soften" the cell wall of plants, bacteria, animals, and fungi to create permeable membranes prior to cellular modifications (e.g., nucleic acid (e.g., DNA and/or RNA) transfection and/or modification. In some aspects, the COG methods can be used to alter the rheological properties of gums, gels, and other carbohydrate-derived textural/organoleptic modifiers. In some aspects, the COG methods can be used to produce smaller molecular weight carbohydrates and/or polysaccharides and/or oligosaccharides for the production of bio-ethanol, bio-fuel, or other downstream compounds.

Soluble fiber products can be useful for a number of uses, including but not limited to medical products and devices, food products (i.e. thickeners, nutritional amendments, flavor agents and/or flavor modifiers), soil amendments (to engineer, balance or enrich specific beneficial soil microbiome constituents), and in fiber products (e.g., novel textiles, ropes, biodegradable packaging, etc.). In some aspects, for example, the insoluble fiber is cotton, which may be treated, or partially treated using the COG methods described herein to achieve one or more desired characteristics (e.g., softness, strength, resiliency, absorbency, etc.). In some aspects, COG methods described herein can modify insoluble fiber to make it soluble.

In preferred aspects, the COG methods are used to generate oligosaccharides from polysaccharides. In some aspects, the COG methods comprise, reacting polysaccharides in a reaction mixture with hydrogen peroxide and a suitable transition metal, alkaline earth metal, or lanthanide (e.g., Fe(II), Fe(III), Cu(I), Cu(II), Ca(II), Mg(II), Mn(II), Zn(II), Ni(II), Ce(IV), Co(II)); followed by cleaving glycosidic linkages in the hydroperoxyl-treated polysaccharides with a high-yield peroxide-quenching/cleavage reagent such as one or more of ammonium bicarbonate, ammonium hydroxide, ammonia, urea, sodium amide, or other nitrogen-based reagent, and/or other weak-Arrhenius bases or non-Arrhenius bases (e.g., see Table 1 above), thereby generating high yields of oligosaccharides from the polysaccharides, while reducing or eliminating peeling and unwanted side-reactions. In the methods disclosed herein, the reaction mixture comprise a transition metal or an alkaline earth metal. In some aspects, the transition metal is selected from Fe(II), Fe(III), Cu(I), Cu(II), Mn(II), Zn(II), Ni(II), Co(II). In some aspects, the reaction mixture comprises an alkaline earth metal selected from calcium or magnesium (e.g., Ca(II), Mg(II). In some aspects, the metal can be selected from a lanthanide (e.g., Ce(IV)).

In some aspects, the cleavage reagent may comprise at least one reagent selected from group consisting of ammonium hydroxide, ammonia, ammonium bicarbonate, urea, etc., or a combination thereof (e.g., see Table 1). In some aspects, the cleavage reagent may comprise the conjugate base of an alcohol or amine. In some aspects, the cleavage reagent may comprise sodium methoxide, sodium ethoxide, sodium tertbutoxide, or other deprotonated alcohol. In some aspects, the cleavage reagent may be or comprise one or more relatively "bulky bases" such as tert-butoxide, triethylamine, or other sterically hindered base. In some aspects, the use of such bulky cleavage reagents/bases results in selective cleavage of the accessible glycosidic bonds to provide oligosaccharide profiles unique/specific to the cleavage reagent/base. In some aspects the cleavage reagent is not a base, per se, but consists of, or comprises one or more reactive agent(s) that react to produce basic conditions and/or decomposition products. In all the methods described herein, the cleavage reagent (cleavage initiator) may also be, and preferably is a peroxide-quenching reagent, and in either case may be used in combination with an additional compatible peroxide-quenching agent that may or may not also be a cleavage agent.

In some aspects, the transition metal or alkaline earth metal in the reaction mixture is at a concentration of at least about 0.65 nM (e.g. at least a value in the range of 0.5 to 0.7 nM). In some aspects, the transition metal or alkaline earth metal in the reaction mixture is at a concentration from 0.65 nM to 500 nM. In some aspects, the peroxide agent (e.g., hydrogen peroxide) in the reaction mixture is at a concentration of at least about 0.02 M (e.g. at least a value in the range of 0.015 to 0.025 M). In some aspects, the peroxide agent (e.g., hydrogen peroxide) in the reaction mixture is at a concentration of from 0.02 M to 1 M. In some aspects, the cleavage reagent/base is or comprises ammonium hydroxide, ammonia, ammonium bicarbonate, a weak Arrhenius base, a non-Arrhenius base, a Lewis base, and/or a Bronsted-Lowry base. Moreover, combinations of two or more cleavage reagents/bases (e.g., such as the cleavage reagents/bases discussed herein) may be used. In some aspects, strong-Arrhenius bases (e.g., $Na^+OH^-$, $K^+OH^-$, or $Ca^{+2}(OH^-)_2$) can be used in combination with the cleavage reagents/bases discussed herein. In some aspects, ammonia gas can be in contact with the solution through bubbling or as an atmospheric component to act as a cleavage and/or quenching reagent. In some aspects, the cleavage reagent is at a concentration of at least about 0.1 M (+/−20%). In some aspects, the cleavage reagent is at a concentration of from 0.1 M-5.0 M. In some aspects the cleavage reagent is present as a saturated solution or insoluble material. In some aspects the cleavage reagent brings the solution to pH 7.5, 8, 9, 10, 12, or higher. In all the methods described herein, the cleavage reagent (cleavage initiator) may also be, and preferably is a peroxide-quenching reagent, and in either case may be used in combination with an additional compatible peroxide-quenching agent that may or may not also be a cleavage agent. In some aspects, the polysaccharides include one or more of amylose, amylopectin, betaglucan, pullulan, xyloglucan, arabinogalactan I and arbinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, galactan, lichenan, and inulin. In some aspects, the polysaccharides are from a plant or animal source. In some aspects, the polysaccharides are from a bacterial, yeast, or algal source. In some aspects, the polysaccharides are in the form of (optionally lyophilized) plant material. In some aspects, the plant material is locust bean gum, fenugreek seed, distiller's grain or spent distiller's grain or some fraction or extraction thereof. In some aspects, the method further comprises purifying one or more oligosaccharide from the mixture of oligosaccharides.

In some aspects, prior to the reacting, the method comprises contacting polysaccharides with one or more polysaccharide degrading enzyme(s). In some aspects, the one or more polysaccharide degrading enzyme(s) comprises, for example, an amylase, isoamylase, cellulase, maltase, glucanase, xylanase, lactase, or a combination thereof.

In some aspects, the polysaccharide material may be pre-treated with acids, bases, and/or oxidizing and reducing agents prior to reacting.

Also provided are compositions comprising a mixture of oligosaccharides as generated using the disclosed COG methods above or elsewhere herein, or one or more purified oligosaccharide(s) as generated using the COG methods above or elsewhere herein.

In some aspects, the COG method comprises contacting one or more microbes (e.g., bacteria, fungi, yeast) with a composition comprising one or a mixture of oligosaccharides to selectively stimulate growth of the one or more microbes. In some aspects, the microbes comprise probiotic microbes. In some aspects, the one or more microbes are in the gut of an animal, and the composition is administered to the animal. In some aspects, the one or more microbes (prebiotic microbes) is/are administered to the animal, either separately (e.g., sequentially) from the composition or simultaneously with the composition (e.g., administration of a composition comprising the probiotic microbe and one or a mixture of oligosaccharides. In some aspects the one or more microbes are in, or are introduced into a particular location or lumen (e.g., the vagina) of an animal or human. In some aspects, the probiotic microbe is *Bifidobacterium pseudocatenulatum*. In some aspects, the probiotic microbe is *Lactobacillus crispatus*. In some aspects, the one or more microbes are soil microbes, oral microbes (e.g., bacteria), or skin microbes. In some aspects, the one or more oligosaccharides can be applied along with an antibiotic treatment. In some aspects, the one or more oligosaccharides can be applied along with an antibiotic treatment and one or more probiotic microbes. In some aspects, the one or more oligosaccharides can be applied along with a defined or undefined consortium of bacteria. In some aspects the one or more oligosaccharides can be used as an excipient.

DEFINITIONS

As used herein, the term "polysaccharide" refers to a polysaccharide or a material comprising a polysaccharide, in either case wherein at least the polysaccharide component is cleavable by the COG methods disclosed herein. Additionally, as used herein, the term "polysaccharide" refers to any carbohydrate polymer (e.g., disaccharide, oligosaccharide, polysaccharide) and can also be linked to other non-carbohydrate moieties (e.g., glycoproteins, proteoglycans, glycopeptides, glycolipids, glycoconjugates, glycosides).

As used herein, the term "peroxide agent" refers to compounds that contain oxygen-oxygen bonds that can produce, natively, with light, temperature, or catalyst (e.g., metals and enzymes), $R—O^-$ and/or $R—O—O^-$ species, where "R" refers to a hydrogen or carbon group that is attached to the rest of the molecule. In one aspect, a peroxide agent is hydrogen peroxide.

The "degree of polymerization" or "DP" of an oligosaccharide refers to the total number of sugar monomer units that are part of a particular carbohydrate. For example, a tetra galacto-oligosaccharide has a DP of 4, having 3 galactose moieties and one glucose moiety.

The term "*Bifidobacterium*" and its synonyms refer to a genus of anaerobic bacteria having beneficial properties for humans. *Bifidobacterium* is one of the major strains of bacteria that make up the gut flora, the bacteria that reside in the gastrointestinal tract and have health benefits for their hosts (Guarner and Malagelada 2003).

A "prebiotic" or "prebiotic nutrient" is generally a non-digestible food ingredient that beneficially affects a host when ingested by selectively stimulating the growth and/or the activity of one or a limited number of microbes in the gastrointestinal tract. As used herein, the term "prebiotic" refers to the above described non-digestible food ingredients in their non-naturally occurring states, e.g., after purification, chemical or enzymatic synthesis as opposed to, for instance, in whole human milk.

A "probiotic" refers to live microorganisms that when administered in adequate amounts confer a health benefit on the host.

As used herein, a "peeling reaction" or "peeling" as applied to the disclosed methods refers to the sequential alkaline degradation of carbohydrates through a mechanism that releases monomeric units from the reducing end of the polymer.

As used herein, a "cleavage agent" or "cleavage reagent" as applied to the disclosed methods preferably refers to a single or collection of non-Arrhenius and/or weak-Arrhenius bases used to cleave polysaccharides after hydroperoxyl oxidation thereof. In certain aspects, a cleavage agent or cleavage reagent breaks glycosidic bonds in the polysaccharide, which bonds may be present between any two saccharides of the polysaccharide. In the methods described herein, the cleavage reagent (cleavage initiator) may also be, and preferably is a peroxide-quenching reagent, and in either case may be used in combination with an additional compatible peroxide-quenching agent that may or may not also be a cleavage agent. In some aspects, a cleavage reagent may be an enzyme. In some aspects, the cleavage reagent enzyme may be a glycosyl hydrolase, a lytic polysaccharide monooxygenase, a glycosyl transferase, transglycosidase, polysaccharide lyase, carbohydrate binding module, glycoysl transferase, carbohydrate esterase, a cocktail containing two or more of the forementioned enzymes, or any enzyme that is carbohydrate active. In some aspects, a cleavage reagent may be a solid-phase acid catalyst or a solid-phase base catalyst.

As used herein, a "base" refers to a compound or collection of compounds that can accept hydrogen ions from the peroxyl oxidized carbohydrate, water, or non-aqueous solvent. The term "base" can include Lewis bases, non-Arrhenius bases, weak-Arrhenius bases, other molecules that produce through their decomposition hydroxide ions, Lewis bases, non-Arrhenius bases, or weak-Arrhenius bases, or other compounds that can accept hydrogen ions from the hydroperoxyl oxidized carbohydrate. As used herein, unless otherwise specified, a "base" explicitly does not refer to a strong-Arrhenius base (e.g., $Na^+OH^-$, $K^+OH^-$, or $Ca^{+2}(OH^-)_2$).

As used herein, a "ammonium bicarbonate" as applied to the disclosed methods refers to solid ammonium bicarbonate, and/or an aqueous solution containing: ammonium and bicarbonate; ammonium, $OH^-$, and $CO_2$; ammonia, $H_2O$, and $CO_2$; or any of the preceding and their equilibrium products.

As used herein, "ammonium hydroxide" as applied to the disclosed methods refers to: aqueous ammonium hydroxide, and/or a solution containing: ammonia and $H_2O$; ammonium and $OH^-$; ammonia and $OH^-$; or any of the preceding and their equilibrium products.

As used herein, a "strong-Arrhenius base" as applied to the disclosed methods refers to a compound that completely dissociates in water to release one or more hydroxide ions into solution. As used herein, a "strong-Arrhenius base" as applied to the disclosed methods refers explicitly to KOH, NaOH, $Ba(OH)_2$, CsOH, $Sr(OH)_2$, $Ca(OH)_2$, LiOH, and RbOH.

As used herein, a "weak-Arrhenius base" as applied to the disclosed methods refers to a compound that incompletely dissociates in water to release one or more hydroxide ions into solution, e.g. ammonium hydroxide, $H_2O$, etc. As "weak-Arrhenius base" is used herein, there are no compounds which meet both the definition of strong-Arrhenius base and weak-Arrhenius base.

As used herein, a "non-Arrhenius base" as applied to the disclosed methods refers to a compound or atom that can donate electrons (e.g., Lewis Bases), accept protons (e.g., Bronstead-Lowry Bases), or releases hydroxide ions through its decomposition ($NH_4HCO_3$), but explicitly does not qualify as an Arrhenius base.

As used herein, a "Lewis base" as applied to the disclosed methods refers to a compound or atom that can donate electron pairs (e.g., $F^-$, benzene, $H^-$, pyridine, acetonitrile, acetone, urea, etc.).

As used herein a "Bronsted-Lowry base" as applied to the disclosed methods refers to a compound or atom that can accept or bond to a hydrogen ion (e.g., methanol, formaldehyde, ammonia, etc.).

As used herein a "Peroxide quenching reagent" as applied to the disclosed methods refers to a compound or atom, which is not a strong-Arrhenius base, that can convert hydrogen peroxide, peroxyl radicals, and hydroperoxyl radicals to a less reactive or non-reactive state (e.g., ammonium hydroxide, ammonium bicarbonate, ammonia, etc.). In certain aspects, a peroxide quenching reagent as defined herein converts hydrogen peroxide as well as radicals produced from hydrogen peroxide to less reactive species (e.g. water). In certain aspects, a peroxide quenching reagent may reduce the hydrogen peroxide concentration to zero, below 5 mg/L, below 10 mg/L, below 25 mg/L, or below 50 mg/L. In certain aspects, a peroxide quenching reagent may form water, hydroxide ions, or oxygen gas. In certain aspects, enzymes may be used to quench peroxide species. In certain aspects, those enzymes may include catalases. In certain aspects, those enzymes can be from animal origin. In certain aspects, those enzymes can be from bovine liver. In certain aspects, the enzymes may be from microbial origin. In certain aspects, the enzyme may be recombinant. In certain aspects, different enzymes may be mixed to quench the peroxide species.

As used herein "nitrogen-based" as applied to the disclosed methods refers to a compound that contains at least one nitrogen atom with four substituent groups that can contain any combination of lone pairs of electrons, hydrogens, or carbon atoms (e.g., ammonia, sodium amide, trimethylamine, diethylamine, N,N-Diisopropylethylamine, urea, pyridine, ammonium hydroxide, ammonium bicarbonate, etc.). Exemplary nitrogen-based, peroxide-quenching, PS-cleavage agents are listed in Table 1. A nitrogen-based reagent may have an unsubstituted or substituted ammonium group and can be present in neutral and/or ionic forms.

As used herein "reaction mixture" refers to a mixture comprising reagents which may react chemically to form products which are distinct from the reagents.

As used herein "treated polysaccharide" refers to a polysaccharide which has been contacted with at least one reagent capable of reacting with the polysaccharides (e.g. an enzyme or a Fenton's reagent).

As used herein "polysaccharide cleavage product" is a product formed from the chemical and/or enzymatic cleavage of a polysaccharide.

As used herein "oligosaccharide" refers to a polysaccharide of low molecular weight, being a polymer of between 3 and 30 monosaccharide units. An oligosaccharide can be a linear polymer, branched polymer, primarily linear polymer with pendant saccharide monomers or any combination thereof.

As used herein "polysaccharide" refers to a polymer of monosaccharide units of greater than 30 monosaccharide units. A polysaccharide can be a linear polymer, branched polymer, primarily linear polymer with pendant saccharide monomers or any combination thereof.

As used herein "Fenton's reagent" refers to a reagent comprising a peroxide agent and a metal. In certain aspects, the peroxide agent is hydrogen peroxide. In certain aspects, the metal is Fe(II), Fe(III), Cu(I), Cu(II), Mn(II), Zn(II), Ni(II), and Co(II), alkaline earth metals Ca(II) and Mg(II), the lanthanide Ce(IV) or any combination thereof.

As used herein the phrase "substantially commensurate with initiation of peroxide-quenching" refers to the relationship between the timing of a cleavage reaction and the timing of a peroxide quenching reaction indicating that the initiation of the cleavage reaction and the initiation of the peroxide quenching reaction occur within a short time duration of each other (e.g. on the order of seconds, or on the order of minutes but not more than one day).

As used herein "specified reaction time" or "reaction time" refers to providing time to allow a reaction to proceed toward an equilibrium state between reagents added and products produced by the reaction of the reagents. In certain aspects, specified reaction time allows sufficient time to reach an equilibrium. In certain other aspects, specified reaction time, while allowing time for the reaction to proceed toward equilibrium, does not provide the time needed to reach equilibrium.

As used herein, the term "synthetic oligosaccharide" refers to an oligosaccharide produced by the depolymerization of a polysaccharide. Synthetic oligosaccharides according to the present invention can be obtained by depolymerizing heteropolymer polysaccharides and homopolymer polysaccharides according to the methods described herein. In certain aspects, the term synthetic oligosaccharide refers to pools of oligosaccharides produced by the methods disclosed herein.

As used herein, the term "heteropolymer polysaccharide" refers to a polysaccharide containing two or more kinds of monosaccharide subunits linked together by the same type of glycosidic bond or different types of glycosidic bonds; heteropolymer polysaccharides also include polysaccharides containing repeating monosaccharide subunits of the same kind linked together by different types of glycosidic bonds. The glycosidic bonds in a heteropolymer polysaccharide may be β1-2 bonds, β1-3 bonds, β1-4 bonds, β1-6 bonds, α1-3 bonds, α1-4 bonds, α1-6 bonds, or a combination thereof. Examples of heteropolymer polysaccharides include, but are not limited to, xyloglucan, lichenan, β-glucan, glucomannan, galactomannan, arabinan, xylan, and arabinoxylan.

As used herein, the terms "about" and "approximately," when used to modify an amount specified in a numeric value or range, indicate that the numeric value as well as reasonable deviations from the value known to the skilled person in the art, for example ±20%, ±10%, or ±5%, are within the intended meaning of the recited value.

As disclosed herein, Controlled Oligosaccharide Generation ("COG") is a method for the controlled degradation of polysaccharides into oligosaccharides. In some aspects, the crude polysaccharides first undergo initial oxidative treatment with the hydrogen peroxide and a transition metal, alkaline earth metal, or lanthanide catalyst to render the glycosidic linkages more labile. Ammonium hydroxide, ammonium bicarbonate, ammonia, urea, etc., or other weak Arrhenius or non-Arrhenius base is then used for cleavage, which results in a variety of distinctive oligosaccharides (distinctive oligosaccharide profile), or smaller polysaccharides. In some aspects, peroxide-quenching and/or neutralization takes place immediately to reduce unwanted oxidation, or peeling, respectively. In some aspects the treated sample (e.g., the polysaccharide comprising starting material after treatment with a Fenton's reagent) is allowed to react with the cleavage reagent at reduced, ambient, or room temperature to facilitate the production of oligosaccharides. In some aspects the cleavage reaction takes place at 4-100° C., 20-80° C., 30-60° C. or 40° C. In some aspects, cleavage and peroxide-quenching are immediate. In some aspects the cleavage step is conducted for 10-30 minutes, 20-60 minutes, 30-120 minutes. In some aspects the cleavage step is conducted for 2-6 hours, 3-12 hours, 6-24 hours or longer. In some aspects the cleavage step is conducted overnight. In all the methods described herein, the cleavage reagent (cleavage initiator) may also be, and preferably is a peroxide-quenching reagent, and in either case may be used in combination with an additional compatible peroxide-quenching agent that may or may not also be a cleavage agent. The disclosed COG methods have the ability to generate large amounts of biologically active oligosaccharides from a variety of carbohydrate sources (e.g., polysaccharide-containing starting materials).

In certain aspects, the method of cleaving polysaccharides comprises multiple steps. For instance, the method can comprise: a) contacting one or more polysaccharide with a Fenton's reagent, comprising a peroxide agent and metal ions to form a mixture; b) allowing the Fenton's reagent to react with the polysaccharide for a specified reaction time; and c) after step b, adding a cleavage agent which may also be a peroxide quenching reagent to the mixture. In such aspect, the steps of contacting the polysaccharide with a Fenton's reagent (step a) and allowing a specified reaction time to pass (step b) can be performed at the same or different pH wherein the pH is selected from within a range of pH 3 to 8, pH 4 to 7, pH 4.5 to 6.5, and pH 5 to 6. The pH can be any possible value between the specified ranges of pH values. The step of adding a cleavage agent which may also be a peroxide quenching reagent (step c) can be performed at a pH selected from within a range of pH 6 to 11, pH 6.5 to 9.5, pH 7 to 9, and pH 7 to 8. The pH can be any possible value between the specified ranges of pH values. In such aspect, the step of contacting the polysaccharide with a Fenton's reagent (step a) and passage of the specified reaction time (step b) can be performed at the same or different temperature wherein the temperature is selected from within a range of temperature between 10 and 70 degrees Celsius, between 20 and 60 degrees Celsius, and between 25 and 55 degrees Celsius. The temperature can be any possible value between the specified ranges of temperature values. The step of adding a cleavage agent which may also be a peroxide quenching reagent (step c) can be performed at a temperature selected from within a range of temperature between 10 and 70 degrees Celsius, between 20 and 60 degrees Celsius, and between 25 and 55 degrees Celsius. The temperature can be any possible value between the specified ranges of temperature values.

In some aspects, the oligosaccharide materials may be treated with suitable resin materials. Suitable resin materials may include anion-exchange, cation-exchange, decolorizing, chelation properties. For example, suitable resins may include, but are not limited to, Ionac NM-60, MBD-10 ULTRA, Thermax Tulsion MB, Cole-Parmer RR-1400, Amberlite MB20, DOWEX Monosphere MR-450. Two or more resins may be combined to create mixed-bed resins. The samples may be treated with carbon. The carbon may be activated carbon, charcoal, graphitized carbon, porous graphitized carbon, or any carbon-based material that is added with the goal of purification.

If desired, the polysaccharide can be optionally treated with one or more polysaccharide-degrading enzyme(s) to reduce the average size or complexity of the polysaccharide before the resulting polysaccharides are treated with the COG methods. Non-limiting examples of polysaccharide enzymes include for example, amylase, isoamylase, cellulase, maltase, glucanase, lactase, xylanase, arabinase, pectinase, mannanase, or a combination thereof. In some aspects carbohydrate active enzymes can be used to modify the resulting products by either adding or removing monomeric units to make a new product.

In the COG methods, the initial oxidative treatment may include hydrogen peroxide and a transition metal, alkaline earth metal, or lanthanide where the metals can be used alone or in combination. In the COG methods, different metals can be used to produce oligosaccharides or oligosaccharide profiles with characteristic or preferred degrees of polymerization (DP). In the COG methods, different metals can be used to produce different oligosaccharide profiles from similar starting material. The oxidative treatment of the methods is followed by a peroxide-quenching/cleavage treatment. The COG methods are capable of generating oligosaccharides from polysaccharides having varying degrees of branching, and having a variety of monosaccharide compositions, including natural and modified polysaccharides. The COG methods will work with polysaccharides from any source. Exemplary polysaccharide substrates include, but are not limited to, one or more of amylose, amylopectin, betaglucan, pullulan, xyloglucan, arabinogalactan I and arbinogalactan II, rhamnogalacturonan I, rhamnogalacturonan II, polygalacturonic acid, polydextrose, galactan, arabinan, arabinoxylan, xylan (e.g., beechwood xylan), glycogen, mannan, glucomannan, curdlan, galactomannan, galactan, lichenan, and inulin. Raw or natural sources and forms of polysaccharide-containing materials may be used. The polysaccharide-containing materials may be in a natural form, or may be permeabilized, ground, chopped, cavitated or otherwise divided or altered prior to contact with the reactants.

The resulting one or more (e.g., mixture of) oligosaccharides generated by the COG methods can have an average DP in the range of 2-200, e.g., 2-100 or 3-20 or 5-50, or any DP lower that the native polysaccharide, or any value in any subrange of the preceding exemplary ranges.

The resulting one or more (e.g., mixture of) oligosaccharides generated by the COG methods can have a variety of uses. In some aspects, the one or more oligosaccharides can be used as a prebiotic to selectively stimulate growth of one or more probiotic bacteria. In some aspects, the oligosaccharide compositions can be administered as a prebiotic formulation (i.e., without bacteria) or as a probiotic formulation (i.e., with one or more desirable bacteria such as *bifidobacteria* as described herein). In general, any food or beverage that can be consumed by humans or animals, or otherwise suitably administered, may be used to make formulations containing the prebiotic and probiotic oligosaccharide containing compositions. Exemplary foods include those with a semi-liquid consistency to allow easy and uniform dispersal of the prebiotic and probiotic compositions described herein. However, other consistencies (e.g., powders, liquids, etc.) can also be used without limitation. Accordingly, such food items include, without limitation, dairy-based products such as cheese, cottage cheese, yogurt, and ice cream. Processed fruits and vegetables, including those targeted for infants/toddlers, such as apple sauce or strained peas and carrots, are also suitable for use in combination with the oligosaccharides of the present invention. Both infant cereals such as rice- or oat-based cereals and adult cereals such as Cream of Wheat™, etc., are also suitable for use in combination with the oligosaccharides. The COG products can also be used in medical foods, for example, such as Pedialyte™, Ensure™, etc. In addition to foods targeted for human consumption, animal feeds may also be supplemented with the prebiotic and probiotic oligosaccharide containing compositions.

Alternatively, polysaccharide-containing materials treated by the COG methods, and/or oligosaccharide containing compositions (e.g., prebiotic and probiotic oligosaccharide containing compositions) can be used to supplement a beverage. Examples of such beverages include, without limitation, infant formula, follow-on formula, toddler's beverage, milk, fermented milk, fruit juice, fruit-based drinks, and sports drinks. Many infant and toddler formulas are known in the art and are commercially available, including, for example, Carnation Good Start™ (Nestle Nutrition Division; Glendale, Calif.) and Nutrish AB™ produced by Mayfield Dairy Farms (Athens, Tenn.). Other examples of infant or baby formula include those disclosed in U.S. Pat. No. 5,902,617. Other beneficial formulations of the compositions include the supplementation of animal milks, such as cow's milk.

Alternatively, the prebiotic and probiotic oligosaccharide containing compositions can be formulated into pills or tablets or encapsulated in capsules, such as gelatin capsules. Tablet forms can optionally include, for example, one or more of lactose, sucrose, mannitol, sorbitol, calcium phosphates, corn starch, potato starch, microcrystalline cellulose, gelatin, colloidal silicon dioxide, talc, magnesium stearate, stearic acid, and other excipients, colorants, fillers, binders, diluents, buffering agents, moistening agents, preservatives, flavoring agents, dyes, disintegrating agents, and pharmaceutically compatible carriers. Lozenge or candy forms can comprise the compositions in a flavor, e.g., sucrose, as well as pastilles comprising the compositions in an inert base, such as gelatin and glycerin or sucrose and acacia emulsions, gels, and the like containing, in addition to the active ingredient, carriers known in the art. The prebiotic or probiotic oligosaccharide containing formulations may also contain conventional food supplement fillers and extenders such as, for example, rice flour. The products may also be used to help the absorption of other nutrients and minerals.

In some aspects, the prebiotic or probiotic oligosaccharide containing composition will comprise or further comprise a non-human protein, non-human lipid, non-human carbohydrate, or other non-human component. For example, in some aspects, the compositions may comprise a bovine (or other non-human) milk protein, a soy protein, a rice protein, beta-lactoglobulin, whey, soybean oil or starch. In some aspects, the oligosaccharides are combined with polysaccharides. In some aspects, the oligosaccharides are combined with their parent polysaccharide.

The dosages of the prebiotic and probiotic oligosaccharide containing compositions will vary depending upon the requirements of the individual, and/or will take into account factors such as age (infant versus adult), weight, and reasons for loss of beneficial gut bacteria (e.g., antibiotic therapy, chemotherapy, radiation therapy, disease, or age). The administration regimen, and amount administered to, or consumed by an individual, in the context of the present disclosure should preferably be sufficient to establish colonization of the gut with beneficial bacteria over time. The administration regimen and/or the size of the dose also will be determined by the existence, nature, and extent of any adverse side-effects that may accompany the administration of the provided prebiotic or probiotic oligosaccharide containing compositions. In some administration aspects, the dosage range will be effective as a food supplement and for reestablishing beneficial bacteria in the intestinal tract. In some administration aspects, the dosage of an oligosaccharide composition of the present invention ranges from about 1 micrograms/L to about 25 grams/L of oligosaccharides. In some aspects, the dosage of an oligosaccharide composition is about 100 micrograms/L to about 15 grams/L of oligosaccharides. In some aspects, the dosage of an oligosaccharide composition is about 1-10 g/L, 5-15 g/L, 10-50 g/L, or as high as 200 g/L. In some aspects, the dosage is 50-70 g/day. In some aspects, the dosage is 10 g/day. In some aspects, the dosage is between 1 and 10 g/day. In some aspects, the dosage is over 100 g/day. In some aspects, the dosage is 0.25-3 g/day. Exemplary *Bifidobacterium* dosages include, but are not limited to, about $10^4$ to about $10^{12}$ colony forming units (CFU) per dose. A further advantageous range is about $10^6$ to about $10^{10}$ CFU. Other bacterium can also be dosed at similar concentrations, but are not limited to, about $10^4$ to about $10^{12}$ colony forming units (CFU) per dose or about $10^6$ to about $10^{10}$ CFU.

The disclosed prebiotic or probiotic oligosaccharide containing formulations can be administered to any subject/individual in need thereof. In some aspects, the individual is an infant or toddler. For example, in some aspects, the individual is less than, e.g., 3 months, 6 months, 9 months, one year, two years or three years old. In some aspects, the individual is between 3-18 years old. In some aspects, the individual is an adult (e.g., 18 years or older). In some aspects, the individual is over 50, 55, 60, 65, 70, or 75 years old. In some aspects, the individual is immuno-deficient (e.g., the individual has AIDS or is taking chemotherapy, immunotherapy, or radiation therapy).

Exemplary *Bifidobacterium* that can be included in the probiotic compositions of the invention include, but are not limited to, *Bifidobacterium longum* subsp. *infantis, B. longum* subsp. *longum, Bifidobacterium breve, Bifidobacterium adolescentis*, and *B. pseudocatenulatum*. The *Bifidobacterium* used will depend in part on the target consumer.

It will be appreciated that it may be advantageous for some applications to include other Bifidogenic factors in the formulations described herein. Such additional components may include, but are not limited to, fructoligosaccharides such as Raffinose (Rhone-Poulenc, Cranbury, New Jersey), inulin (Imperial Holly Corp., Sugar Land, Texas), and Nutraflora (Golden Technologies, Westminister, Colorado), as well as lactose, xylooligosaccharides, soyoligosaccharides, lactulose/lactitol and galactooligosaccharides among others. In some applications, other beneficial bacteria, such as *Lactobacillus, Rumminococcus, Akkermansia, Bacteroides,*

*Faecalibacterium* can be included in the formulations. The COG products described herein, can be used to stimulate yeast.

The oligosaccharides as described herein, can be used to stimulate microbes of any sort. Examples of microbes that can be stimulated by the oligosaccharides include, for example, soil microbes (e.g., mycorrhizal fungi and bacteria and other microbes used as soil inoculants such as *Azospril-lum* sp.), oral bacterial (e.g., *Streptococcus mutans, Streptococcus gordonii, Streptococcus sanguis*, and *S. oralis*) and skin bacteria (e.g., *Propionibacterium acnes*, also ammonia oxidizing bacteria, including but not limited to *Nitrosomonas, Nitrosococcus, Nitrosospira, Nitrosocvstis, Nitrosolobus*, and *Nitrosovibrio*.

In some aspects, the disclosed oligosaccharide compositions are administered to a human or animal in need thereof. For example, in some aspects, the oligosaccharide compositions are administered to a person or animal having at least one condition selected from the group consisting of inflammatory bowel syndrome, constipation, diarrhea, colitis, Crohn's disease, colon cancer, functional bowel disorder (FBD), irritable bowel syndrome (IBS), excess sulfate reducing bacteria, inflammatory bowel disease (IBD), and ulcerative colitis. Irritable bowel syndrome (IBS) is characterized by abdominal pain and discomfort, bloating, and altered bowel function, constipation and/or diarrhea. There are three groups of IBS: Constipation predominant IBS (C-IBS), Alternating IBS (A-IBS) and Diarrhea predominant IBS (D-IBS). The oligosaccharide compositions are useful, e.g., for repressing or prolonging the remission periods on Ulcerative patients. The oligosaccharide compositions can be administered to treat or prevent any form of Functional Bowel Disorder (FBD), and in particular Irritable Bowel Syndrome (MS), such as Constipation predominant IBS (C-IBS), Alternating IBS (A-IBS) and Diarrhea predominant IBS (D-IBS); functional constipation and functional diarrhea. FBD is a general term for a range of gastrointestinal disorders which are chronic or semi-chronic and which are associated with bowel pain, disturbed bowel function and social disruption.

In some aspects, the oligosaccharide compositions can be used as bulking-agents. In some aspects, the oligosaccharide compositions can be used as bulking-agents in reduced sugar food applications. In some aspects these oligosaccharides can be used as bulking-agents that do not affect flavor, odor, rheological, and textural properties.

In another aspect, the oligosaccharide compositions are administered to those in need of stimulation of the immune system and/or for promotion of resistance to bacterial or yeast infections, e.g., *Candidiasis* or diseases induced by sulfate reducing bacteria.

Some aspects of the present disclosure provide synthetic oligosaccharides comprising a backbone containing glucose monomers, wherein each glucose monomer is optionally bonded to a pendant xylose monomer, and wherein the total number of monomers in the synthetic oligosaccharide ranges from 3 to 30. Such synthetic oligosaccharides can be obtained, for example, by depolymerizing xyloglucan according to the methods described herein. Xyloglucan is known to contain a glucose backbone with single-unit xylose branches, where the xylose branches may be modified with a galactose endcap or an arabinose endcap. Tamarind xyloglucan, for example, contains a β1,4-linked glucose backbone with frequent single-unit branches of α1,6-linked xylose that can occasionally be further attached to a single β1,2-linked galactose endcap. In other sources of xyloglucan, arabinose can be α1,2 linked to the xylose residue. Xyloglucan from other sources may contain a single fucose residue α1,2 linked to the galactose.

In some aspects, the oligosaccharides comprise 2, 3, 4, 5, or 6 hexose residues. In some aspects, the oligosaccharides contain 1, 2, 3, or more pentose residues. In some aspects, the oligosaccharides contain an equal number of hexose and pentose residues. In some aspects the oligosaccharides contain fewer pentose residues than hexose residues.

In some aspects, the glucose monomers in the backbone of the synthetic oligosaccharide are β1-4 linked glucose monomers. In some aspects, each pendant xylose monomer is bonded to a glucose monomer in the backbone by an α1-6 linkage.

In some aspects, the synthetic oligosaccharide further includes one galactose monomer bonded to one or more pendant xylose monomers. In some aspects, each galactose monomer is bonded to the pendant xylose monomer via a β1-2 linkage. In some aspects, the synthetic oligosaccharide further includes one fucose monomer bonded to one or more galactose monomers. In some aspects, each fucose monomer is bonded to the galactose monomer via an α1-2 linkage.

In some aspects, the synthetic oligosaccharide further includes one arabinose monomer bonded to one or more pendant xylose monomers. In some aspects, the arabinose monomer is bonded to the pendant xylose monomer via an α1-2 linkage.

In some aspects, the synthetic oligosaccharide contains 2 to 4 glucose monomer in the backbone, 1 to 2 pendant xylose monomers bonded to different glucose monomers in the backbone, and 0 to 2 galactose monomers bonded to different xylose monomers.

Some aspects of the present disclosure provide synthetic oligosaccharides having a backbone containing mannose monomers, wherein each mannose monomer is optionally bonded to a pendant galactose monomer, and wherein the total number of monomers in the synthetic oligosaccharide ranges from 3 to 30. Such synthetic oligosaccharides can be obtained, for example, by depolymerizing galactomannan according to the methods described herein. Galactomannan, produced by sources such as *Aspergillus* molds, contains a β1-4 mannose backbone with frequent α1-6 galactose branches containing a single unit.

Some aspects of the present disclosure provide synthetic oligosaccharides containing mannose monomers and glucose monomers, wherein the total number of monomers in the synthetic oligosaccharide ranges from 3 to 30. Such synthetic oligosaccharides can be obtained, for example, by depolymerizing glucomannan according to the methods described herein. Glucomannan is a polysaccharide largely known to be found in konjac root. The polymer contains β1-4-linked glucose and mannose residues that are thought to be randomly distributed in a non-reoccurring pattern.

Some aspects of the present disclosure provide synthetic oligosaccharides having a backbone containing arabinose monomers, wherein each arabinose monomer is optionally bonded to a pendant arabinose monomer, and wherein the total number of monomers in the synthetic oligosaccharide ranges from 3 to 30. Such synthetic oligosaccharides can be obtained, for example, by depolymerizing arabinan according to the methods described herein. Arabinans exist as sidechains on the pectin polysaccharide rhamnogalacturonan I and also in the cell walls of some mycobacteria. Arabinan contains an α1-5 arabinose backbone with short α1-3 arabinose branches.

In some aspects of the present disclosure provide synthetic oligosaccharides derived from β-Glucans found in cereals (e.g., rice, wheat, oat, bran, barley, and malt), for example, consist of a β1-4 linked glucose backbone with single β1-3 glucose residues dispersed between every 2-3 β1-4 linked glucose residues. In some aspects of the present disclosure provide synthetic oligosaccharides derived from lichenan is a polysaccharide found in lichen, having a structure is similar to β-glucan where the linkages consist of β1-4 and β1-3 glucose residues. However, unlike β-glucan, lichenan has much more frequent β1-3 linkages. In some aspects, β-glucan-resembling oligosaccharides can be derived from spent distillers' grain, or other corn products. In some aspects, β-glucan-resembling oligosaccharides can be derived from oat and oat agricultural waste products. In some aspects, β-glucan-resembling oligosaccharides can be derived from spent brewers' grain, or other malt products.

Some aspects of the present disclosure provide synthetic oligosaccharides having a backbone containing xylose monomers, wherein each xylose monomer is optionally bonded to a pendant arabinose monomer or a pendant gluronic acid (e.g., a 4-O methylated GlcA), and wherein the total number of monomers in the synthetic oligosaccharide ranges from 3 to 30. Such synthetic oligosaccharides can be obtained, for example, by depolymerizing xylan and/or arabinoxylan according to the methods described herein. Xylan is a polysaccharide commonly found in the secondary cell walls of dicots and in the cell walls of most grasses. The structure contains a β1-4 xylose backbone and often times contains α1-2 glucuronic acid branches, which may contain a single methyl group. In some embodiments, beechwood xylan can be used, which is known to contain large amounts of 4-O-methyl-glucuronic acid branches. Arabinoxylan is a polysaccharide commonly found in cereals grains that contains a β1-4 xylose backbone with α1-2 and α1-3 arabinose branches. Some aspects of the present disclosure provide synthetic arabinoxylan-resembling oligosaccharides. Some aspects of the present disclosure provide synthetic arabinoxylan-resembling oligosaccharides from spent distillers' grain, corn fiber, or other corn-based streams. Some aspects of the present disclosure provide synthetic arabinoxylan-resembling oligosaccharides from spent distillers' grain, corn fiber, or other corn-based streams. Some aspects of the present disclosure provide synthetic arabinoxylan-resembling oligosaccharides from spent brewers' grain or other cereal-based streams.

In some aspects, synthetic oligosaccharides can be also be obtained by depolymerizing homopolymer polysaccharides according to the methods described herein. As used herein, the term "homopolymer polysaccharide" refers to a polysaccharide containing repeating monosaccharide subunits of the same kind, linked together by the same type of glycosidic bond including, but not limited to, a combination of β1-3 bonds, β1-4 bonds, β1-6 bonds, α1-3 bonds, α1-4 bonds, and α1-6 bonds. Examples of homo polymers include, but are not limited to, curdlan, galactan, and mannan. Homopolymers include, but are not limited to, curdlan (a linear polymer of β1-3 linked glucose found as an exopolysaccharide of *Agrobacterium*), galactan (a linear polymer of β1-4 linked galactose that has been isolated in the form of arabinogalactan before subsequent arabinofuranosidase treatment to remove the arabinose units), and mannan (a linear polymer of β1-3 linked glucose found as an exopolysaccharide of *Agrobacterium* and also some nuts).

In some aspects, the synthetic oligosaccharides can be prepared by any suitable method including, but not limited to, Controlled Oligosaccharide Generation (COG) which is a method for the controlled degradation of polysaccharides into oligosaccharides. In some aspects, the crude polysaccharides first undergo initial oxidative treatment with the hydrogen peroxide and a transition metal or alkaline earth metal (e.g., iron(III) sulfate) catalyst to render the glycosidic linkages more labile. A weak-Arrhenius base or non-Arrhenius base is then used for base induced cleavage, which results in a variety of oligosaccharides. Immediate neutralization may take place to reduce any peeling reaction. This method has the ability to generate large amounts of biologically active oligosaccharides from a variety of carbohydrate sources.

If desired, the polysaccharide can be optionally treated with one or more polysaccharide-degrading enzyme to reduce the average size or complexity of the polysaccharide before the resulting polysaccharides are treated with the oxidative treatment and metal catalyst. Non-limiting examples of polysaccharide enzymes include for example, amylase, isoamylase, cellulase, maltase, glucanase, or a combination thereof.

The initial oxidative treatment can include hydrogen peroxide and a transition metal or an alkaline earth metal. Metals with different oxidation states, sizes, periodic groups, and coordination numbers have been tested to understand the application with the COG process. Each of the different metals has shown activity in the COG reaction. While these metals work with any polysaccharide, different metals can be used to produce oligosaccharides with preferential degrees of polymerization. The oxidative treatment is followed by a base treatment. The method is capable of generating oligosaccharides from polysaccharides having varying degrees of branching, and having a variety of monosaccharide compositions, including natural and modified polysaccharides.

Also provided are mixtures containing two or more different synthetic oligosaccharides as described herein. Unpurified or semi-purified depolymerization products may be used for preparation of oligosaccharide mixtures or, alternatively, oligosaccharides can be purified to produce specially formulated pools. The synthetic oligosaccharides in the mixtures may be obtained, for example, by depolymerizing a polysaccharide homopolymer, a polysaccharide heteropolymer or a combination thereof. In some aspects, at least one of the synthetic oligosaccharides in the mixture is obtained via depolymerization of xyloglucan, curdlan, galactan, mannan, lichenan, β-glucan, glucomannan, galactomannan, arabinan, xylan, arabinoxylan, other polymers described herein or a combination thereof. In some aspects, the amount of at least one of the synthetic oligosaccharides in the mixture is at least 1%, based on the total amount of oligosaccharides in the mixture. The synthetic oligosaccharide may be present, for example, in an amount ranging from about 1% to about 99%, or from about 5% to about 95%, or from about 10% to about 90%, or from about 20% to about 80%, or from about 30% to about 70%. The synthetic oligosaccharide may be present, for example, in an amount ranging from about 1% to about 10%, or from about 10% to about 20%, or from about 20% to about 30%, or from about 30% to about 40%, or from about 40% to about 50%, or from about 50% to about 60%, or from about 60% to about 70%, or from about 70% to about 80%, or from about 80% to about 90%, or from about 90% to about 99%. The percentage may be a mol %, based on the total number of moles of oligosaccharides in the mixture, or a weight %, based on the total weight of oligosaccharides in the mixture. In some aspects, the amount of at least one of synthetic oligosaccharides is at least 5 mol %.

The synthetic oligosaccharides and compositions described herein are useful as synbiotics, prebiotics, immune modulators, digestion aids, food additives, pharmaceutical excipients, or analytical standards. The synthetic oligosaccharides can be combined with other ingredients to produce foodstuffs and supplements including infant formula, geriatric supplements, baking flours, and snack foods. The synthetic oligosaccharides can be combined with beneficial bacteria to form synbiotics. The synthetic oligosaccharides can also be used as pharmaceutical products.

The synthetic oligosaccharides can be used as for growth or maintenance of specific microorganism in humans, other mammals, or in the rhizosphere of plants. The synthetic oligosaccharides may contain specific glycosidic linkages not able to be digested by the particular host (e.g., a person, livestock animal, or companion animal) but able to be metabolized by specific groups of commensal microorganism or probiotics. As such, the synthetic oligosaccharides can function as a carrier to transport exogenous microorganisms (probiotic or bio therapeutic) to a specific niche, or as a nutritional source for microorganisms already present in the host.

Xyloglucan can be used for the selective growth of specific *Bacteroides* species, like *B. ovatus* (Larsbrink et al. 2014). It has been demonstrated that the xyloglycan utilization loci, with glycoside hydrolase genes, belongs to the families GH5 and GH31 which can be found in *B. ovatus*. The presence of these genes allow the growth of this species when used as a sole carbon source. Other major *Bacteroides* species in the gut like *B. thetaiotaomicron, B. caccae* or *B. fragilis*, lack this loci or part of it in their genomes, and, thusly, are unable to metabolize xyloglucan.

Curdlan can be used for the selective growth of specific *Bacteroides* species, like *B. thetaiotaomicron* or *B. distasonis*, when their genomes encode a specific type of glycoside hydrolase belonging to the family GH16. Orthologs of this gene are absent in the genomes of other *Bacteroides* species like *B. caccae* or *B. ovatus*, and are unable to grow on curdlan (Salyers et al. 1997).

β-glucan or lichenin can be used for the selective growth of specific *Bacteroides* species, like *B. ovatus*. This species encodes in its genome a specific type of GH16, with β1-3,4 glucan activity (Tamura et al. 2017). It has been demonstrated that this polysaccharide enhances the growth of species of Firmicutes like *Enterococcus faecium, Clostridium perfingens, Roseburia inulinivorans*, and *R. faecis* (Beckmann et al. 2006, Sheridan et al. 2016).

Galactan can select for the growth of specific *Bacteroides* species, such as *B. thetaiotaomicron, B. dorei* and *B. ovatus*. Different types of endo-galactanases can be responsible for this selective growth, which belong to the families GH53 and GH147 (Lammerts van Bueren et al. 2017, Luis et al. 2018). The ability to consume galactan has also been described in some *Bifidobacterial* species (*Bif. breve, Bif. longum, Bif long* subsp. *Infantis*) (Hinz et al. 2005).

Mannan can selectively grow specific *Bacteroides* species, like *B. fragilis* or *B. ovatus*, which encode a GH26 endo-β 1-4-mannosidase (Kawaguchi et al. 2014). This gene is absent in the genome of major intestinal species like *B. thetaiotamicron*, which are unable to grow on mannan or glucomannan. *R. intestinalis* and *R. faecis* can deplete mannan linkages (Leanti La Rosa et al. 2019), as well as members of *Clostridium* cluster XIVa (Desai et al. 2016, Sheridan et al. 2016), with GH26 encoded in their genomes. Also, GH26 has been characterized in specific species of *Bifidobacteria*, such as *Bif. adolescentis* (Kulcinskaj a et al. 2013), confirming the ability of this species to grow on mannan. Galactomannan is consumed only by microorganism that encode endo-β 1-4-mannosidase GH26 and alpha-galactosidase GH27 in their genomes, like *B. ovatus, B. xylanisolvens* (Reddy et al. 2016) or *Roseburia intestinalis* (Desai et al. 2016, Leanti La Rosa et al. 2019).

Xylan, arabinan and arabinoxylan can be used to selectively grow specific species of *Bacteroides*. Xylan can be metabolized by *B. ovatus* and *B. uniformis*, while *B. thetaiotaomicron* or *B. caccae* are unable to grow in this substrate. Arabinan promotes the growth of *B. thetaiotaomicron* and *B. ovatus*, while arabinoxylan shows high selection for *B. ovatus* growth (Martens et al. 2011, Desai et al. 2016). It has been shown that strains of *R. intestinalis, E. rectale* and *R. faecis* can consume xylan or arabinoxylan as the sole carbon source (Desai et al. 2016, Sheridan et al. 2016). Certain *bifidobacteria* have the capacity to ferment xylan or arabinofuranosyl-containing oligosaccharides. Selective growth of *B. adolescentis* on xylose and arabinoxylan derived glycans was shown in vitro (Van Laere et al. 1999). Also, additional experiment confirmed that *B. longum* subsp. *longum* was also able to metabolize arabinoxylan (Margolles and De Los Reyes-Gavilán 2003).

Example 1

(Ammonium Hydroxide and Ammonium Bicarbonate were Used as Exemplary Polysaccharide (PS)-Cleavage Reagents)

Locust bean gum is known to be high in galactomannan polysaccharides. Galactomannan is a polysaccharide that contains a β 1-4-linked mannose backbone with α 1-6-linked galactose branches. Galactomannan (or oligosaccharides derivable therefrom using the disclosed methods) may act to selectively promote the growth of bacteria that can depolymerize one or both of these glycosidic bonds.

Production of Oligosaccharides. In a first exemplary aspect, Locust bean gum (500 mg) was dissolved in 20 ml of HPLC grade water in a capped reaction vessel and placed in a shaker-incubator for 10 min at 55° C. and 85 RPM. The pH of the solution was adjusted to 5.2 with ammonium bicarbonate (0.5 M). Hydrogen peroxide (5 ml) and iron (III) sulfate (2.75 mg in 50 μL water) were added to the reaction mixture and mixed thoroughly. The reaction in the capped reaction vessel was allowed to proceed in the shaker-incubator at 55° C. and 75 RPM for two hours. The capped reaction was allowed to cool to 20° C. Four cleavage conditions were conducted: ammonium hydroxide (1 ml of 28% v/v to pH 10), sodium hydroxide (65 μl, 10.45 M NaOH to pH 10), and two concentrations of ammonium bicarbonate (1.125 g and 5 g, both to pH 7.5). All four conditions were reacted at two temperatures, 27° C. and 45° C. in a shaker-incubator for 1 hour at 70 RPM, the cap was left loose to allow oxygen, ammonia, and carbon dioxide gases to be released. Ammonium hydroxide and ammonium bicarbonate were removed, and thus, the solution neutralized by evaporation. Sodium hydroxide was neutralized by the addition of HCl to pH 7. The sample was stored at −20° C. prior to clean-up and subsequent mass spectrometry analysis.

Isolation of Oligosaccharides. Post-cleavage oligosaccharide samples were reconstituted in water and subjected to C18 solid phase extraction. Solid phase cartridges were washed with three volumes acetonitrile and two volumes water before samples were loaded and collected as the immediate flow-through. The C18 cartridge-extracted samples were then subjected to non-porous graphitized carbon (NPGC) solid phase extraction. NPGC cartridges were sequentially pre-washed with two volumes water, two volumes of 80% acetonitrile with 0.01% (v/v) TFA in water, and two more volumes of water. The C18 cartridge-extracted samples were then loaded and washed with five volumes of water before being eluted with 40% acetonitrile with 0.05% (v/v) TFA. Finally, the post-NPGC samples were completely dried by evaporative centrifugation and stored at −20° C. until analysis.

Instrumental Analysis. Dried, post-NPGC samples were reconstituted in nano-pure water before UHPLC-QqQ analysis. Analytical separation was performed using an Agilent 1290 Infinity II UHPLC coupled to an Agilent 6495 QqQ MS. Samples were chromatographically separated on a 50 mm×1 mm Waters Acquity™ BEH-AMIDE column with a 1.9 μm particle size. A binary gradient was employed which consisted of solvent A: (3% (v/v) acetonitrile/water+0.1% formic acid) and solvent B: (95% acetonitrile/water). A 4.5-minute gradient with a flow rate of 0.6 ml/min was used for chromatographic separation: 70-67% B, 0-3 min; 67-25% B, 3-3.01 min; 25-25% B, 3.01-3.5 min; 25-70% B, 3.5-3.51 min; 70-70% B, 3.51-4.5 min. Electrospray ionization was used as the ion source and data was collected in the positive mode and utilized single ion monitoring (SIM). The capillary and fragmentor voltage were 1800 and 280 V, respectively. The quadrapole was set to scan masses corresponding to oligosaccharides from 2-10 hexoses with a dwell time of 50 ms. All ions were observed as their proton adduct.

Ammonium hydroxide and Ammonium Bicarbonate as exemplary PS-cleavage Reagents. Of the three cleavage reagents, ammonium hydroxide produced the highest amount of total oligosaccharides from locust bean gum at both 45° C. and 27° C., followed by both ammonium bicarbonate concentrations at 45° C., sodium hydroxide at both temperatures, and lastly, ammonium bicarbonate at 27° C. (FIG. 1). Unexpectedly, ammonium hydroxide produced highest overall abundance of oligosaccharides without sacrificing oligosaccharide structural diversity (FIG. 2), and produced two-fold more total oligosaccharides compared to sodium hydroxide and ammonium bicarbonate. The results were further unexpected, since it was expected that the concentration of hydroxide ions that are readily present in ammonium hydroxide and sodium hydroxide would be correlated with the production of oligosaccharides in the PS-cleavage step of the COG reactions; however, both the ammonium hydroxide and sodium hydroxide reactions reached pH 10, which indicated that the same concentration of hydroxide ions. Additionally, it was unexpected that ammonium bicarbonate would produce a substantial amount of oligosaccharides considering that at 27° C. the pH was only 7.5, although it nearly matched the oligosaccharide production of NaOH as the cleavage reagent. According to particular aspects of the present invention, these results indicate that a non-hydroxide mediated mechanism is mediating the cleavage by ammonium bicarbonate. Furthermore, the enhanced efficiency of ammonium hydroxide as a PS-cleavage reagent may indicate that a combination of both hydroxide-driven and ammonia-driven mechanisms is involved.

Figure 2:
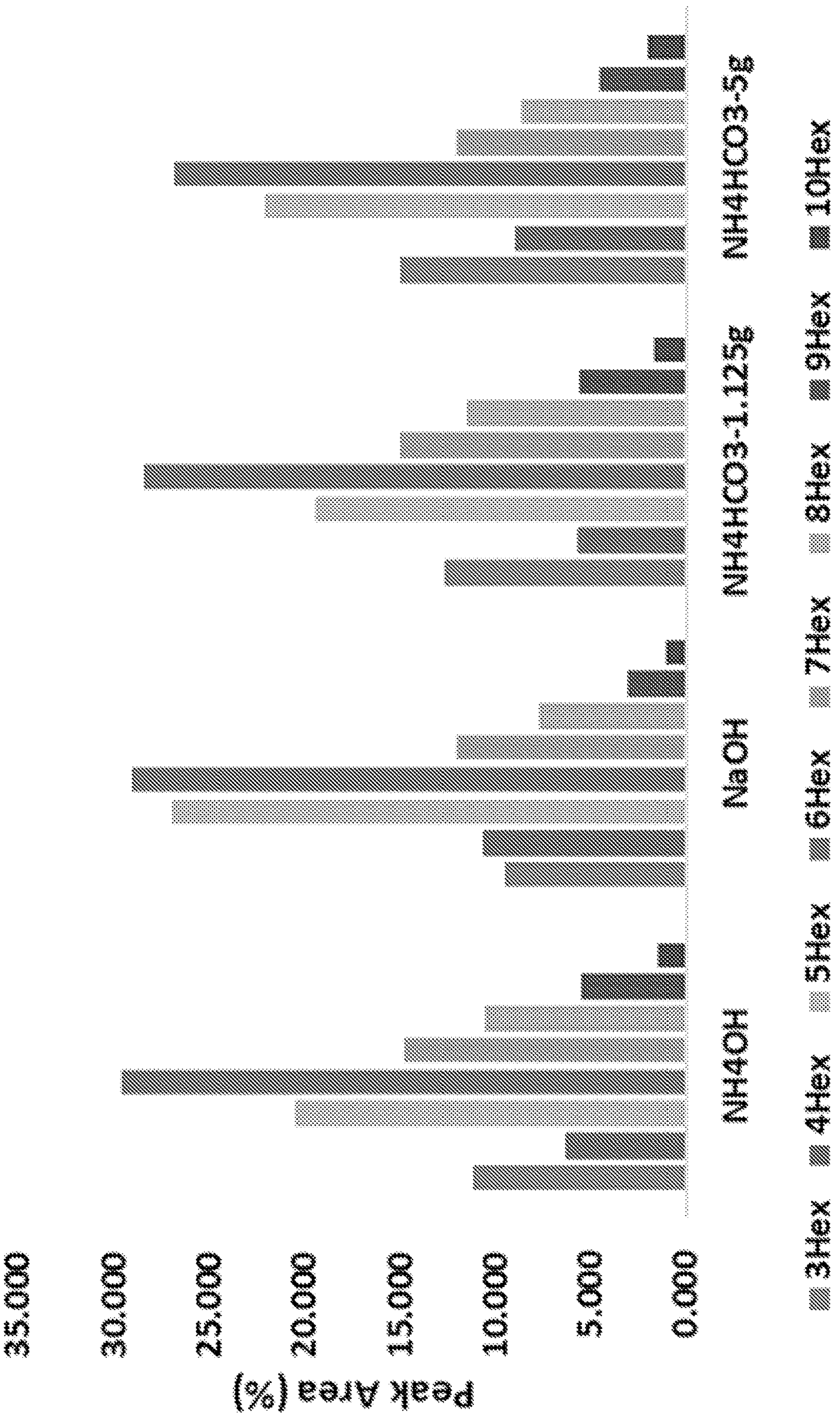
FIG. 2 shows, by way of non-limiting examples of the present invention, locust bean gum oligosaccharide profiles of different cleaving reagents reacted at 45° C.

Mechanistic differences are also observed in the specificity of the reaction in regard to the size distribution of the oligosaccharides produced (FIG. 2). Oligosaccharides from 3-10 monomers in length were observed from the 45° C. reactions. Notable differences in the relative concentration of trisaccharides were observed. The two ammonium bicarbonate-mediated PS-cleavage reactions produced the highest relative abundance of trisaccharides (15.0% and 12.7%), while the sodium hydroxide-mediated PS-cleavage reaction produced the least (9.52%), with ammonium hydroxide-mediated PS cleavage being in the middle (11.2%). The differential production of trisaccharides between the sodium hydroxide-mediated and the ammonium bicarbonate-mediated PS-cleavage reactions provides additional evidence of a different reaction mechanism, and the intermediate amount of trisaccharide production mediated by ammonium hydroxide yet further supports a combinatorial PS-cleavage mechanism. Other notable differences include sodium hydroxide producing the largest relative abundances of the tetrasaccharide and pentasaccharide, while the hexasaccharide remained the most abundant oligosaccharide in all four conditions. Furthermore, all three of the nitrogen-based reagent-mediated cleavage reactions produced higher amounts of the decasaccharide than did sodium hydroxide.

Without being bound by mechanism, applicant's data is consistent with a mechanism wherein cleaving hydroperoxyl radical-treated polysaccharide with, e.g., nitrogen-based cleavage agents (instead of with the strong Arrhenius bases used in the art) proceeds by a unique β-elimination mechanism involving deprotonation by, e.g., ammonia (or a decomposition product of the cleavage agent, e.g., of the nitrogen-based cleavage agents) of a hydroxyl moiety positioned β relative to a glycosidic bond, due to an adjacent ketone (from the peroxidation step) that pulls electron density away from the hydrogen, thereby rendering it a better leaving group. As proposed, when the e.g., ammonia deprotonates the carbohydrate, the electrons form a carbon-carbon double bond that facilitates breaking of the glycosidic bond, thus depolymerizing the polysaccharide.

Example 2

(The Need for Desalting was Reduced or Eliminated when Ammonium Bicarbonate or Ammonium Hydroxide was Used as a Polysaccharide (PS)-Cleavage Reagent)

Desalting oligosaccharides is an expensive and time-consuming process that, prior to the present invention, represented a major limitation in the production of oligosaccharides using prior Fenton's reagent-based methods. Dialysis and chromatographic desalting are two common processes for separating oligosaccharides from the salts (e.g., sodium chloride, sodium acetate, and potassium chloride) produced upon neutralization of the traditional strong Arrhenius base (e.g., NaOH, KOH, $Ca(OH)_2$) used in generating the oligosaccharides. Both processes prove difficult as low molecular weight salts such as sodium chloride (58.44 g/mol) and oligosaccharides such as maltotriose (504.44 g/mol) are close enough in mass to make separation difficult. Both processes additionally require that the sample first be reduced in volume prior to separation, which further increases both the cost and required process time. According to particular aspects, the presently disclosed use of high-yield nitrogen-based peroxide-quenching/PS-cleavage agents (e.g., ammonium bicarbonate, ammonium hydroxide, ammonia, etc.) eliminates the need for desalting via dialysis or other size-based methods because such agents, or the reactions products thereof can be evaporated from solution upon reaction completion. The ammonium bicarbonate, for example, can be efficiently removed as $CO_2$, $NH_3$, and $H_2O$ according to the reaction mechanism:

$$NH_4^+HCO_3^-(s)\Leftrightarrow NH_3(g)+CO_2(g)+H_2O(l)$$

while ammonium hydroxide, for example, can be removed as $NH_3$, and $H_2O$ according to the reaction mechanism:

$$NH_4^+OH^-(s)\Leftrightarrow NH_3(g)+H_2O(l).$$

Example 3

(Ammonium-Based PS-Cleavage Reagents were Shown to be Peroxide-Quenching Reagents that Eliminated Hydrogen Peroxide and Off-Target Oxidation, and Thus Represent Exemplary, Preferred Peroxide-Quenching/PS-Cleavage Reagents)

While hydrogen peroxide is a component of the initial oxidative step in production of oligosaccharides as disclosed herein (and in prior art methods), there is a danger of unwanted, off-target oxidation from any residual presence of hydrogen peroxide and/or of its radicals in the subsequent cleavage reaction step, and any subsequent downstream processing steps. As appreciated in the art, due to its high boiling point (150.2° C.), hydrogen peroxide cannot be easily removed through standard evaporative processes. Furthermore, its presence can hinder chromatographic efforts for downstream glycan purification and enrichment as many stationary phases are not stable against high red/ox states. Strategies for its removal can include dialysis, the use of enzymes such as horseradish peroxidase, and prolonged exposure to an open atmosphere environment. Enzymatic methods have the advantage of quenching the hydrogen peroxide quickly but will also require removal down-stream. Both dialysis and exposure to open atmosphere environments leave the hydrogen peroxide (and/or any residual radicals thereof) in contact with the produced oligosaccharides, which can produce side reactions including C-6 oxidation to create-uronic acid containing oligosaccharides and other unwanted species. According to particular aspects, the presently-disclosed COG methods solve this substantial problem.

Figure 3:
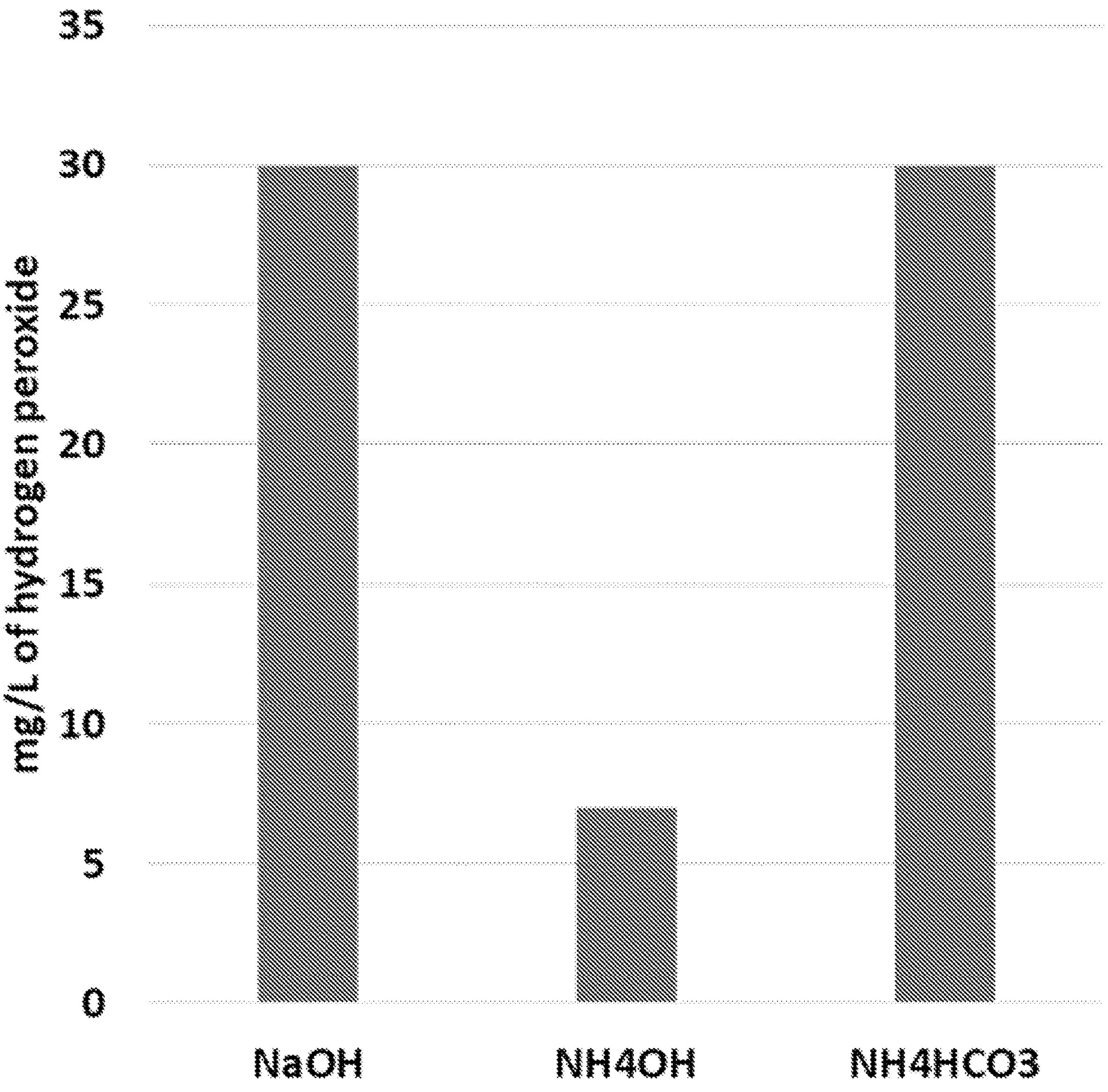
FIG. 3 shows, by way of non-limiting examples of the present invention, residual hydrogen peroxide after incubation with three exemplary cleavage reagents at 27° C. for one hour.

To determine the effects of different PS-cleavage reagents on the concentration of hydrogen peroxide, hydrogen peroxide concentrations were measured with test strips (Quantofix Peroxide 100™) after incubation with different cleaving reagents and temperatures. Three PS-cleavage reagents, ammonium hydroxide, ammonium bicarbonate, and sodium hydroxide were first incubated with locust bean gum treated with hydrogen peroxide and Fe(II). The use of ammonium hydroxide at room temperature was shown to quickly eliminate the presence of hydrogen peroxide. By contrast, however, neither ammonium bicarbonate nor sodium hydroxide had an effect on the concentration of hydrogen peroxide (FIG. 3). This confirms that while prior Fenton's-based methods used a strong Arrhenius base to quench the Fenton's reaction, there was no quenching or elimination of the residual hydrogen peroxide per se, or of any residual radicals thereof produced before introduction of the strong Arrhenius base.

According to particular aspects of the present invention, the following mechanisms:

$$2NH_3(g)+H_2O_2(l)\Leftrightarrow N_2(g)+2H_2O(l)+2H_2(g)$$

$$2NO_2^{-}2H^{+}aq\Leftrightarrow H_2O+NO+NO_2$$

support applicant's conception that as ammonia is produced (or otherwise introduced into the reaction), some residual hydrogen peroxide, or radicals thereof will be quenched/eliminated.

Figure 4:
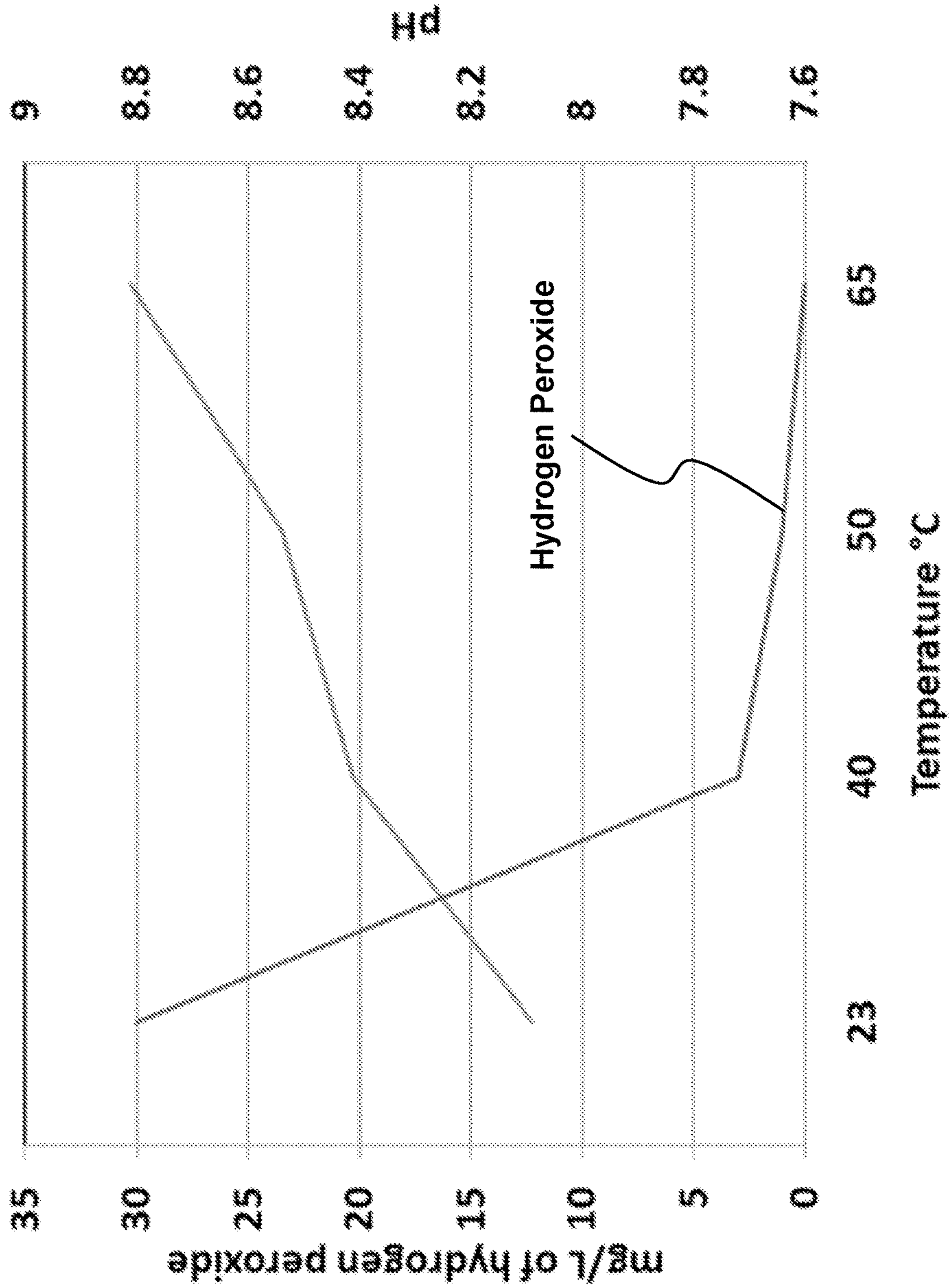
FIG. 4 shows, by way of non-limiting examples of the present invention, hydrogen peroxide concentration and pH after incubation with ammonium bicarbonate for one hour at varying temperatures.

To further test this proposed mechanism, the reactions with the three cleaving reagents were heated for one hour at increasingly higher temperatures, up to 65° C. to drive the ammonium bicarbonate solution to produce more ammonia. Indeed, the reaction pH increased with increasing temperature, indicating the presence of hydroxide ions, which would be accompanied by ammonia gas, and thus the simultaneous quenching of hydrogen peroxide was observed (FIG. 4). Moreover, this reaction happened rapidly at 40° C. and ultimately resulted in hydrogen peroxide levels that were below detectable limits at 65° C. Significantly, there was no observable difference in the hydrogen peroxide concentration in the heated sodium hydroxide solution. The data confirms that hydrogen peroxide is rapidly quenched/eliminated when incubated, for example, with the presently-disclosed nitrogen-based cleavage reagents, but not with traditional strong Arrhenius bases (e.g., $Na^+OH^-$, $K^+OH^-$, or $Ca^{2+}(OH^-)_2$) previously used in the art.

Example 4

(Ammonium Hydroxide Produced Unique Oligosaccharide Profiles from Spent Grain Fractions)

Figures 5A, 5B:
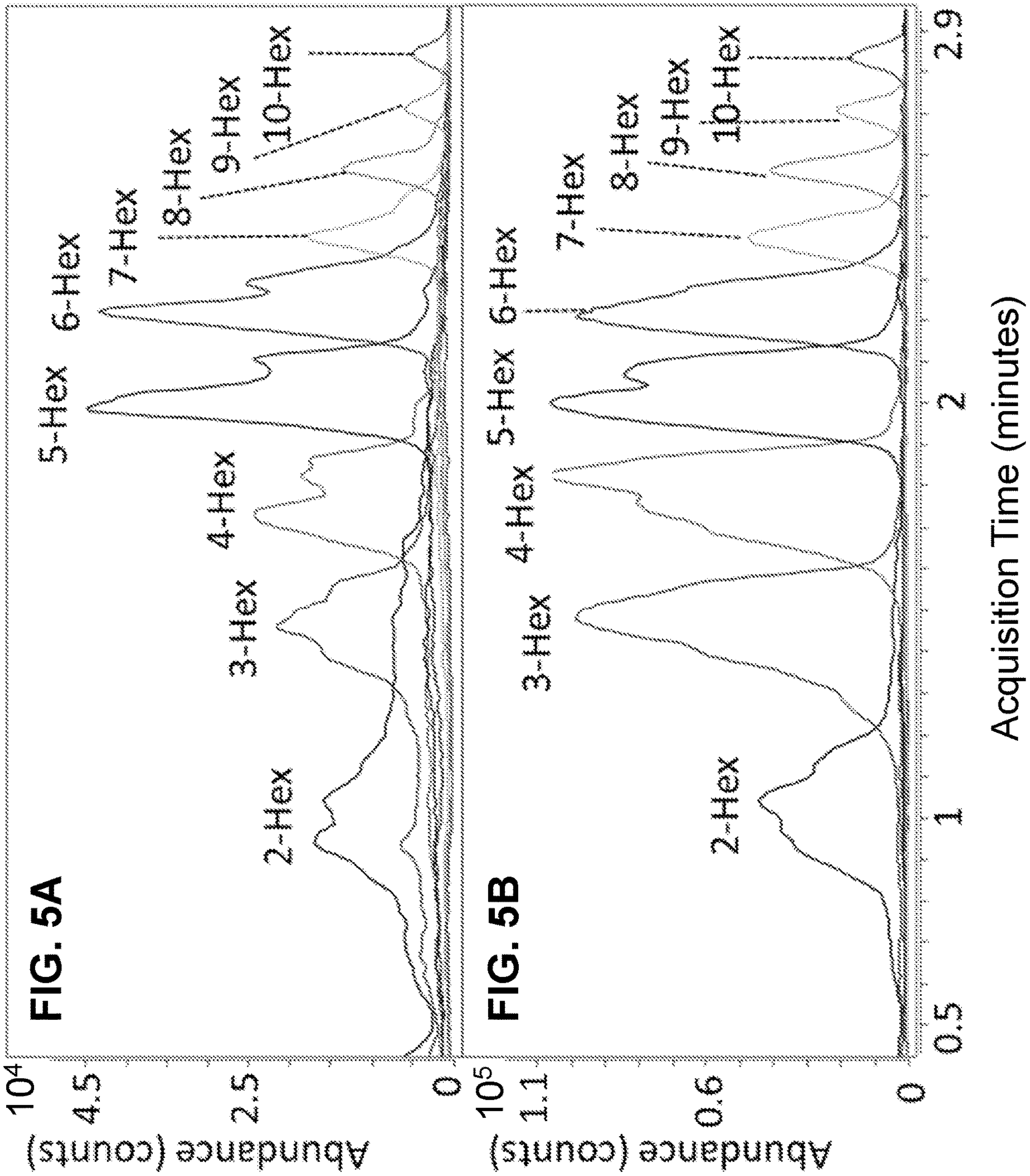
FIGS. 5A and 5B show, by way of non-limiting examples of the present invention, liquid chromatography-mass spectrum of two spent distiller's grain fractions.

Two spent grain fractions were ground to a fine powder and underwent the procedure described in Example 1, while employing ammonium hydroxide as a peroxide-quenching/PS-cleavage reagent. The grain samples represented a "whole" spent fraction and a protein-depleted fraction, produced and recovered from a bio-ethanol production process. A liquid chromatography-mass spectrum obtained from the depolymerization products of the two fractions (FIGS. 5A and 5B) showed that both fractions included abundant hexose oligomers that ranged from 3-10 monomeric units; however, larger structures are also abundant but were not monitored under the presented conditions. The protein-depleted fraction (FIG. 5B) contained both a higher concentration of total carbohydrate and produced roughly twice the concentration of oligosaccharides than the "whole" spent grain product (FIG. 5A). Non-carbohydrate components of complex mixtures can inhibit the effects of the reaction by competing for the oxidative and cleaving potential of the reactions (Stadtman and Berlett 1991). This result nonetheless demonstrates the broad effectiveness of the disclosed CDPG methods (e.g., involving use of non-Arrhenius and weak-Arrhenius bases as peroxide-quenching/PS-cleavage reagents after prior Fenton oxidation.

Example 5

(In the Disclosed COG Reactions, Peroxide-Quenching May be Initiated Prior to, Commensurate with, or Subsequent to Initiation of Polysaccharide (PS)-Cleavage)

Exemplary PS-cleavage, and/or peroxide-quenching agents are listed in Table 1 above.

In preferred COG method aspects, as disclosed and discussed above herein, the COG methods overcome a substantial problem in the art by using a hydrogen peroxide quenching agent ("peroxide-quenching" agent) to reduce or eliminate off-target side reactions after initiation of the PS-cleavage step. While prior methods are use strong-Arrhenius bases (i.e., $Na^+OH^-$, $K^+OH^-$, or $Ca^{2+}(OH^-)_2$) as PS-cleavage agents to allegedly "quench" the initial Fenton's reaction (i.e., by flocculating the metal ion reactant), such strong-Arrhenius base PS-cleavage agents do not (as disclosed herein; e.g., see Example 3, above) quench/eliminate residual peroxide or peroxide radicals per se, and thus prior art methods are susceptible to unwanted side reactions.

In preferred COG methods, the PS-cleavage initiator preferably also functions as a peroxide-quencher to quench (e.g., sufficiently reduce or eliminate) residual hydrogen peroxide and/or radicals thereof per se, to minimize or eliminate off-target side reactions. In such method aspects, initiation of peroxide-quenching (and thus also quenching of the Fenton's reaction) is commensurate with initiation of PS-cleavage. While such COG reactions may simplistically be viewed as two-step reaction aspects (comprising a Fenton's oxidation aspect followed by a PS-cleavage aspect), it is to be understood that peroxide-quenching (and/or quenching of the Fenton's reaction) may or may not be immediate or sharply delineated, and may yet occur over at least part of the PS-cleavage aspect; that is, despite the use of peroxide-quenching agents as disclosed herein, there may be at least some degree of overlap between the Fenton's reaction aspect, the peroxide-quenching aspect, and/or the PS-cleavage aspect of such COG reactions. The degree of overlap may vary depending on the nature and amount of the peroxide-quenching agent used.

In particular COG methods, the PS-cleavage agent (cleavage initiator) may or may not also be a peroxide-quenching agent, and in either case may be used in combination with an additional compatible peroxide-quenching agent, which itself may or may not also be a cleavage agent. In such aspects, the additional compatible peroxide-quenching agent may be introduced into the reaction prior to, commensurate with, or subsequent to introduction of the PS-cleavage agent.

In particular aspects the additional compatible peroxide-quenching agent is introduced into the reaction commensurate with introduction of the PS-cleavage agent. While such COG reaction aspects may simplistically be viewed as two-step reaction aspects (comprising a Fenton's oxidation aspect followed by a PS-cleavage aspect) it is to be understood that peroxide-quenching (and/or quenching of the Fenton's reaction) may or may not be immediate or sharply delineated, and may yet occur over at least part of the PS-cleavage aspect; that is, despite the use of peroxide-quenching agents as disclosed herein, there may be at least some degree of overlap between the Fenton's reaction aspect, the peroxide-quenching aspect, and/or the PS-cleavage aspect of such COG reactions. The degree of overlap may vary depending on the nature and amount of the peroxide-quenching agent used.

In particular aspects the additional compatible peroxide-quenching agent is introduced into the reaction prior to introduction of the PS-cleavage agent. While such COG reaction aspects may simplistically be viewed as two-step reaction aspects (comprising a Fenton's oxidation aspect followed by a PS-cleavage aspect), or as three-step reaction aspects (comprising a Fenton's oxidation aspect, followed by a peroxide-quenching aspect, followed by a PS-cleavage aspect), it is to be understood that peroxide-quenching (and/or quenching of the Fenton's reaction) may or may not be immediate or sharply delineated, and may yet occur over at least part of the PS-cleavage aspect; that is, despite the use of peroxide-quenching agents as disclosed herein, there may be at least some degree of overlap between the Fenton's reaction aspect, the peroxide-quenching aspect, and/or the PS-cleavage aspect of such COG reactions. The degree of overlap may vary depending on the nature and amount of the peroxide-quenching agent used.

In particular aspects the additional compatible peroxide-quenching agent is introduced into the reaction subsequent to introduction of the PS-cleavage agent. While such COG reaction aspects may simplistically be viewed as two-step reaction aspects (comprising a Fenton's oxidation aspect followed by a PS-cleavage aspect), or as three-step reaction aspects (comprising a Fenton's oxidation aspect, followed by a PS-cleavage aspect, followed by a peroxide-quenching aspect), it is to be understood that peroxide-quenching (and/or quenching of the Fenton's reaction) may or may not be immediate or sharply delineated, and may yet occur over at least part of the PS-cleavage aspect; that is, despite the use of peroxide-quenching agents as disclosed herein, there may be at least some degree of overlap between the Fenton's reaction aspect, the peroxide-quenching aspect, and/or the PS-cleavage aspect of such COG reactions. The degree of overlap may vary depending on the nature and amount of the peroxide-quenching agent used.

According to preferred aspects of the present invention, in all of the above COG method aspects, use of a peroxide-quencher to quench (e.g., sufficiently reduce or eliminate) residual hydrogen peroxide and/or radicals thereof per se, minimizes or eliminates off-target side reactions.

According to preferred aspects of the present invention, in all of the above COG method aspects, use of particular weak Arrhenius bases and/or non-Arrhenius bases (e.g., nitrogen-based peroxide-quenching/PS-cleavage reagents, etc.; e.g., see Table 1) not only provides for improved high-yield oligosaccharide production (relative to the strong Arrhenius bases used in the art), but also eliminates the need for costly and time-consuming post-reaction concentration, and desalting steps.

Example 6

(COG Offers Enhanced Bioactivity when Compared to Similar Methods)

In some aspects oligosaccharides generated from COG can be used to promote the growth of bacteria in fermentations (biotechnology, ethanol production, food processing) and/or the microbiota of humans and animals (gut, skin, respiratory, vaginal, ocular, oral). Common methods of assessing the ability for microbes to consume particular oligosaccharides and groups of oligosaccharides entail their monitoring by optical density across the growth period. However, if the oligosaccharides are contaminated by endogenous or exogenous materials, these results can be erroneous. Compounds such as salts, acids, metals, and oxidizing/reducing agents can inhibit bacterial growth in in vitro systems.

Oligosaccharide production: In this exemplary aspect, amylopectin (550 mg) was dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and iron (II) sulfate (2.75 mg in 50 μL water) were added to the reaction mixture and mixed thoroughly. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) or NaOH (600 ul of 10.45 M) was used to adjust pH and sample was reacted at 45° C. in a shaker-incubator for 1 hour at 20 RPM, the cap was left loose to allow oxygen, ammonia, and carbon dioxide gases to be released. The sample was then frozen and lyophilized, then stored at −80° C. Size exclusion chromatography was conducted on a 50 mL Bio-Scale™ Mini Bio-Gel® P-6 Desalting Cartridge using 0.03M ammonium bicarbonate buffer at a flow rate of 10 mL/min. For the purpose of desalting, an elution window of 50 mL was collected post void volume and the samples were lyophilized to complete dryness. The resulting materials were analyzed for concentrations of iron, hydrogen peroxide, and sulfate, pH, oxidative/reductive potential (ORP), and electrical conductivity (EC).

Carbohydrate analysis: Post-cleavage oligosaccharide samples were reconstituted in water and subjected to alditol reduction. Samples were reduced for 1 hour with 2 M sodium borohydride at 65° C., then immediately underwent C18 solid phase extraction. Solid phase cartridges were washed with three volumes acetonitrile and two volumes water before samples were loaded and collected as the immediate flow-through. The C18 cartridge-extracted samples were then subjected to non-porous graphitized carbon (NPGC) solid phase extraction. NPGC cartridges were sequentially pre-washed with two volumes water, two volumes of 80% acetonitrile with 0.01% (v/v) TFA in water, and two more volumes of water. The C18 cartridge-extracted samples were then loaded and washed with five volumes of water before being eluted with 40% acetonitrile with 0.05% (v/v) TFA. Finally, the post-NPGC samples were completely dried by evaporative centrifugation and stored at −20° C. until analysis.

Oligosaccharide analysis was carried out on an Agilent 1290 Infinity II HPLC coupled to an Agilent 6530 Accurate-Mass Q-TOF MS. Chromatographic separation was performed on a Thermo Scientific Hypercarb PGC column with a binary gradient which consisted of solvent A: 3% acetonitrile/water+0.1% formic acid and solvent B: 10% water/acetonitrile+0.1% formic acid. With a flow rate of 0.15 mL/min, the gradient was run for 60 min: 2-15% B, 0-20 min; 15-60% B, 20-45 min; 60-99% B, 45-45.10 min; 99-99% B, 45.10-51 min; 99-2% B, 51-51.10 min; 2-2% B, 51.10-60 min. The mass spectrometer was run in positive mode, with a reference mass of 922.0098 m/z. The gas temperature and flow rate were set to 150° C. and 11 l/min, respectively. The nozzle, fragmentor, skimmer voltages were set to be 1500, 75 and 60 volts, respectively. Using tandem mass spectrometry, fragmentation was performed with collision energy of 1.45×(m/z)−3.5. Data was processed using Agilent MassHunter Workstation Quantitative Analysis 10.1 Software. Major peaks in the chromatograms that corresponded to oligosaccharide masses were integrated. Responses of oligosaccharides with DP 2-10 were summed to represent the total oligosaccharide peak area.

Furthermore, the samples were analyzed for their monosaccharide composition as described in Amicucci et al (Amicucci, Galermo, et al. 2019).

Bacterial Growth Method: Ability of the generated oligosaccharide fractions to support bacterial growth was evaluated by incubating a *Bifidobacterium breve* (model organism) in minimal media supplemented with 3% (m/v) of oligosaccharide fraction at 37 C under anaerobic conditions. Minimal media used for these experiments was basal MRS (Ruiz-Moyano et al. 2013). Before inoculation basal MRS was mixed with lactose and each of the oligosaccharide fractions, pH was adjusted to 6.8, filter sterilized and placed in the anaerobic chamber for approximately 12 hours to remove oxygen. Triplicates of each treatment, including a positive (1% lactose only) and a negative control (no carbohydrate) were inoculated with 2% of a fresh culture of *Bifodobacterium* and incubated under anaerobic conditions. Growth was determined based on absorbance measurements at 600 nm for 24 hours. Media sterility was tested by incubating non-inoculated media.

Figure 6:
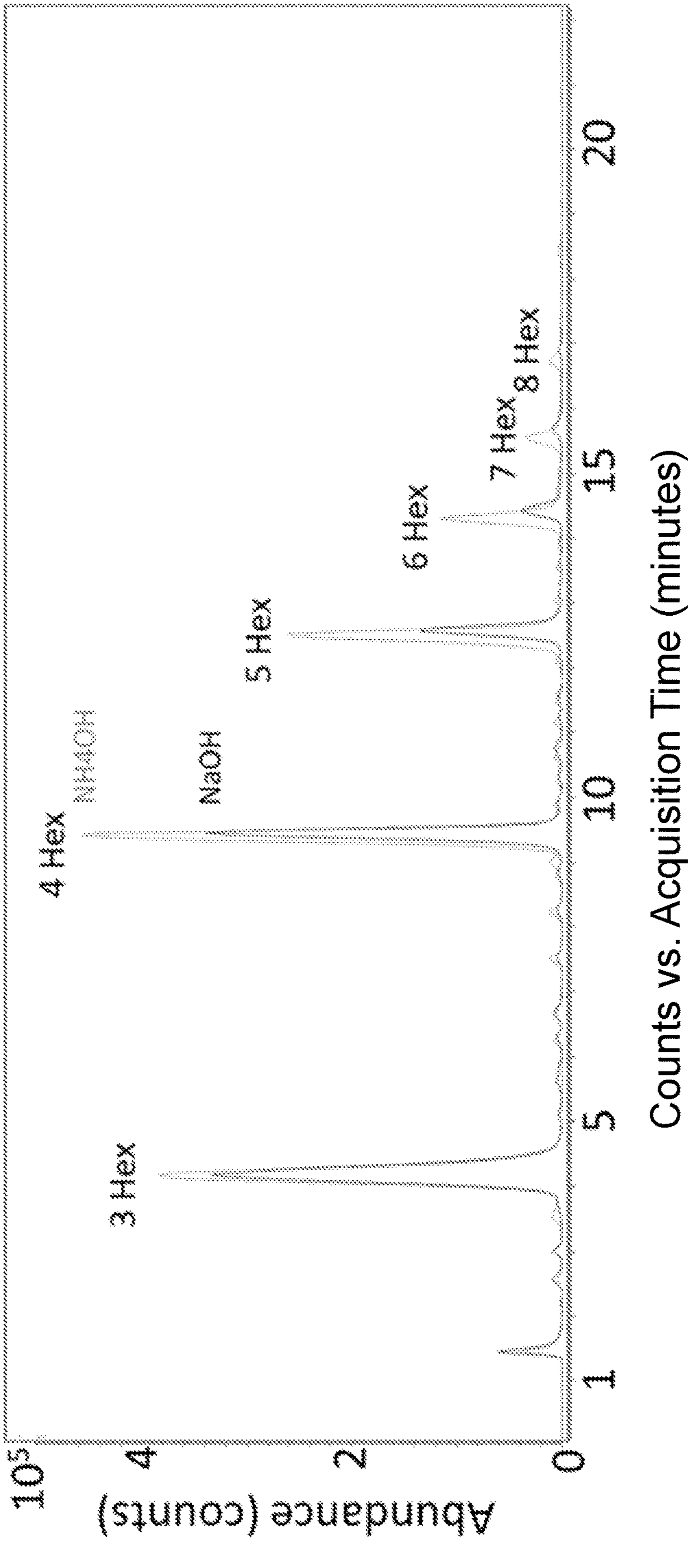
FIG. 6 shows, HPLC/Q-TOF chromatogram of oligosaccharides generated from amylopectin. Oligosaccharides are generated from the base cleavage step using ammonium hydroxide or sodium hydroxide.
Figure 7:
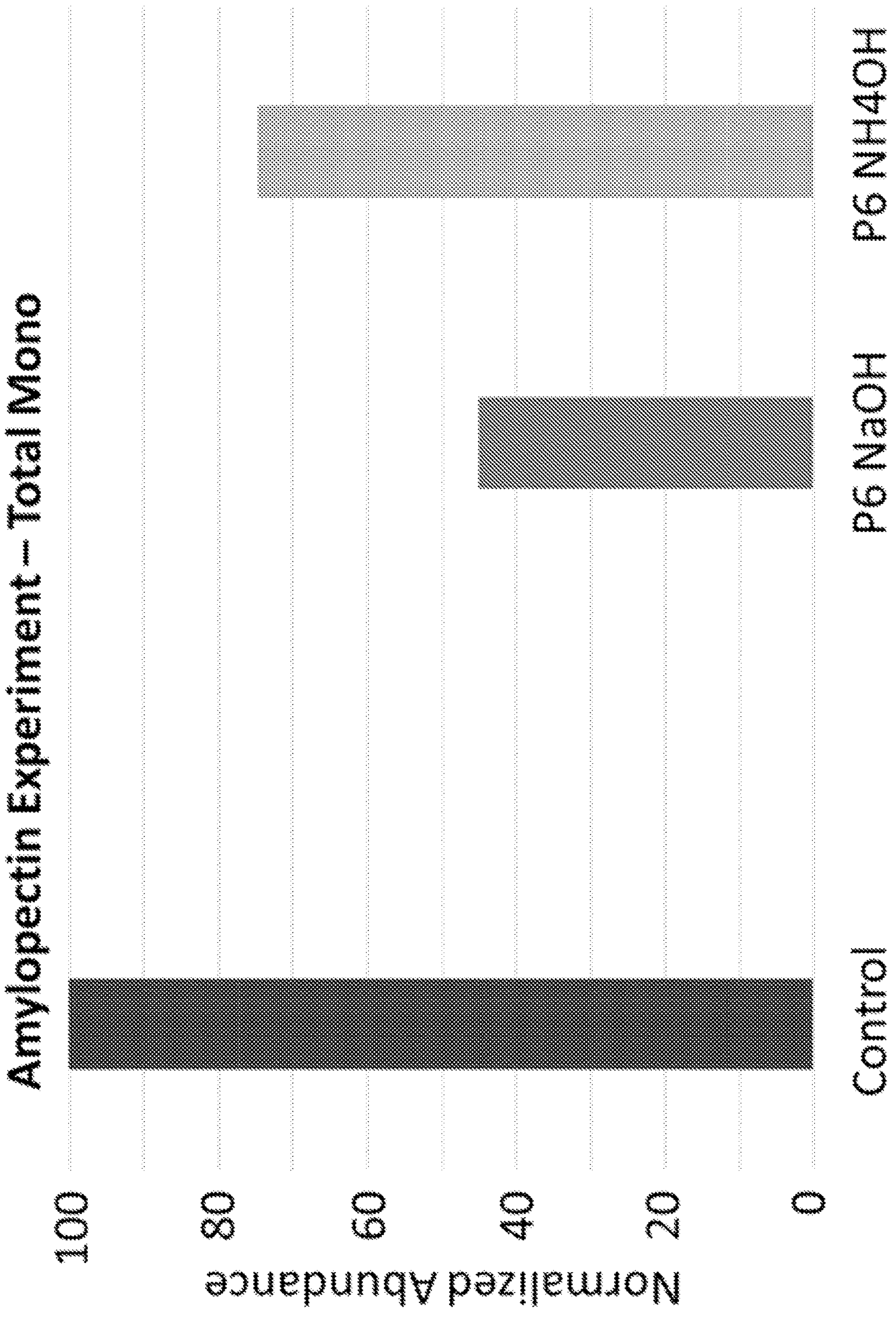
FIG. 7 shows, monosaccharide composition of oligosaccharides generated from amylopectin. Oligosaccharides are generated from the base cleavage step using ammonium hydroxide or sodium hydroxide. Monosaccharide abundance is normalized to that of the control.
Figure 8:
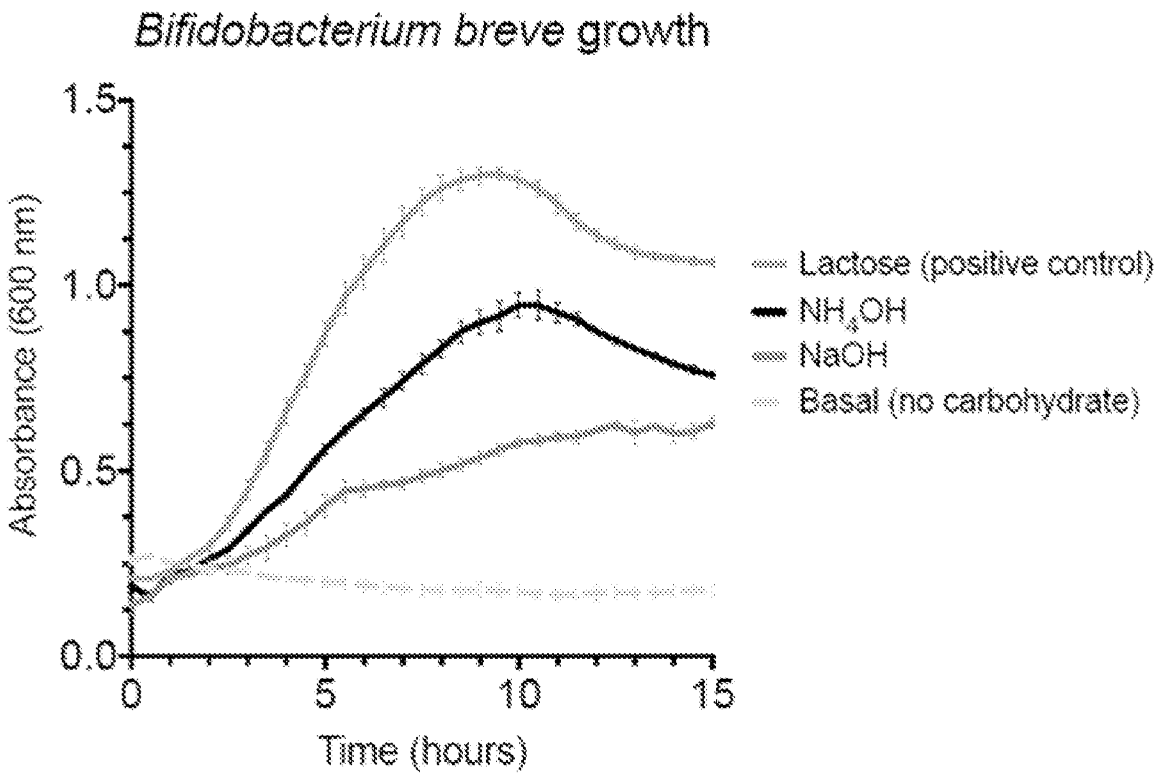
FIG. 8 shows, oligosaccharide analysis of amylopectin oligosaccharides generated from the base cleavage step using different strong Arrhenius and nitrogen-containing bases.

Results: Oligosaccharides produced by ammonium hydroxide cleavage produced a higher yield of oligosaccharides than the sodium hydroxide (FIG. 6) and also a purer final product as indicated by quantitative monosaccharide analysis (FIG. 7). Furthermore, the ammonium hydroxide showed lower ORP, indicating less residual hydrogen peroxide, and similar conductivity (EC), indicating lower ionic content (Table 2). Oligosaccharides generated using $NH_4OH$ showed a stronger growth response than their counterparts generated with NaOH (FIG. 8). While $NH_4OH$ oligosaccharides supported *bifidobacteria* growth to a max OD (620 nm) of 0.974, cell density with NaOH oligosaccharides only reached a max OD (620 nm) of 0.64. This demonstrates *bifidobacteria* substrate preference of $NH_4OH$ over NaOH oligosaccharides and suggests that this and other COG fractions will enrich other bacterial groups in a similarly superior manner.

TABLE 2

Physical properties of oligosaccharide pools.

| Post COG with NaOH | Post COG with NH4OH |
|---|---|
| pH: 7.62 | pH: 5.69 |
| EC: 4.31 μS/cm] | EC: 7.40 μS/cm] |
| ORP: −378 mV | ORP: −132.9 mV |
| Fe2/Fe3: 5 mg/L | Fe2/Fe3: 5 mg/L |
| Peroxide: 0 mg/L | Peroxide: 0 mg/L |
| Sulfate: <200 mg/L | Sulfate: >400 mg/L |

Example 7

(Oligosaccharide Profiles are Dependent on Base Selection)

In an exemplary aspect, Amylopectin (200 mg) was dissolved in 7 ml of HPLC grade water in a capped reaction vessel and placed in a shaker-incubator for 20 min at 55° C. and 85 RPM. The pH of the solution was adjusted to 5.2. Hydrogen peroxide (1.75 ml) and iron (II) sulfate (1 mg in 25 μL water) were added to the reaction mixture and mixed thoroughly. The reaction in the capped reaction vessel proceeded in the shaker-incubator at 55° C. and 65 RPM for two hours. The capped reactions cooled to 12° C. in a −20° C. freezer. Seven bases were examined: Pyridine (100 ul), N, N-Diisopropylethylamine (DIPEA), NaOH (35 μl, 10 M), CsOH (35 μl, 10 M), $Ca(OH)_2$ (45 μl, 10 M), KOH (35 μl, 10 M) and $NH_4OH$ (500 μl of 28% v/v). All bases were added to the reaction mixture to a pH of 10, except pyridine which reached pH 9. All seven conditions were reacted at 45° C. in a shaker-incubator for 1 hour at 20 RPM, the cap was left loose to allow oxygen, ammonia, and carbon dioxide gases to be released. The samples were frozen and lyophilized than stored at −80° C., prior to clean-up and subsequent mass spectrometry analysis.

Carbohydrate analysis: Post-cleavage oligosaccharide samples were reconstituted in water and subjected to alditol reduction. Samples were reduced for 1 hour with 2 M sodium borohydride at 65° C., then immediately underwent C18 solid phase extraction. Solid phase cartridges were washed with three volumes acetonitrile and two volumes water before samples were loaded and collected as the immediate flow-through. The C18 cartridge-extracted samples were then subjected to non-porous graphitized carbon (NPGC) solid phase extraction. NPGC cartridges were sequentially pre-washed with two volumes water, two volumes of 80% acetonitrile with 0.01% (v/v) TFA in water, and two more volumes of water. The C18 cartridge-extracted samples were then loaded and washed with five volumes of water before being eluted with 40% acetonitrile with 0.05% (v/v) TFA. Finally, the post-NPGC samples were completely dried by evaporative centrifugation and stored at −20° C. until analysis.

(Amicucci, Galermo et al. 2019). Oligosaccharide analysis was carried out on an Agilent 1290 Infinity II HPLC coupled to an Agilent 6530 Accurate-Mass Q-TOF MS. Chromatographic separation was performed on a Thermo Scientific Hypercarb PGC column with a binary gradient which consisted of solvent A: 3% acetonitrile/water+0.1% formic acid and solvent B: 10% water/acetonitrile+0.1% formic acid. With a flow rate of 0.15 mL/min, the gradient was run for 60 min: 2-15% B, 0-20 min; 15-60% B, 20-45 min; 60-99% B, 45-45.10 min; 99-99% B, 45.10-51 min; 99-2% B, 51-51.10 min; 2-2% B, 51.10-60 min. The mass spectrometer was run in positive mode, with a reference mass of 922.0098 m/z. The gas temperature and flow rate were set to 150° C. and 11 l/min, respectively. The nozzle, fragmentor, skimmer voltages were set to be 1500, 75 and 60 volts, respectively. Using tandem mass spectrometry, fragmentation was performed with collision energy of 1.45×(m/z)−3.5. Data was processed using Agilent MassHunter Workstation Quantitative Analysis 10.1 Software. Major peaks in the chromatograms that corresponded to oligosaccharide masses were integrated. Responses of oligosaccharides with DP 2-10 were summed to represent the total oligosaccharide peak area.

Figure 9:
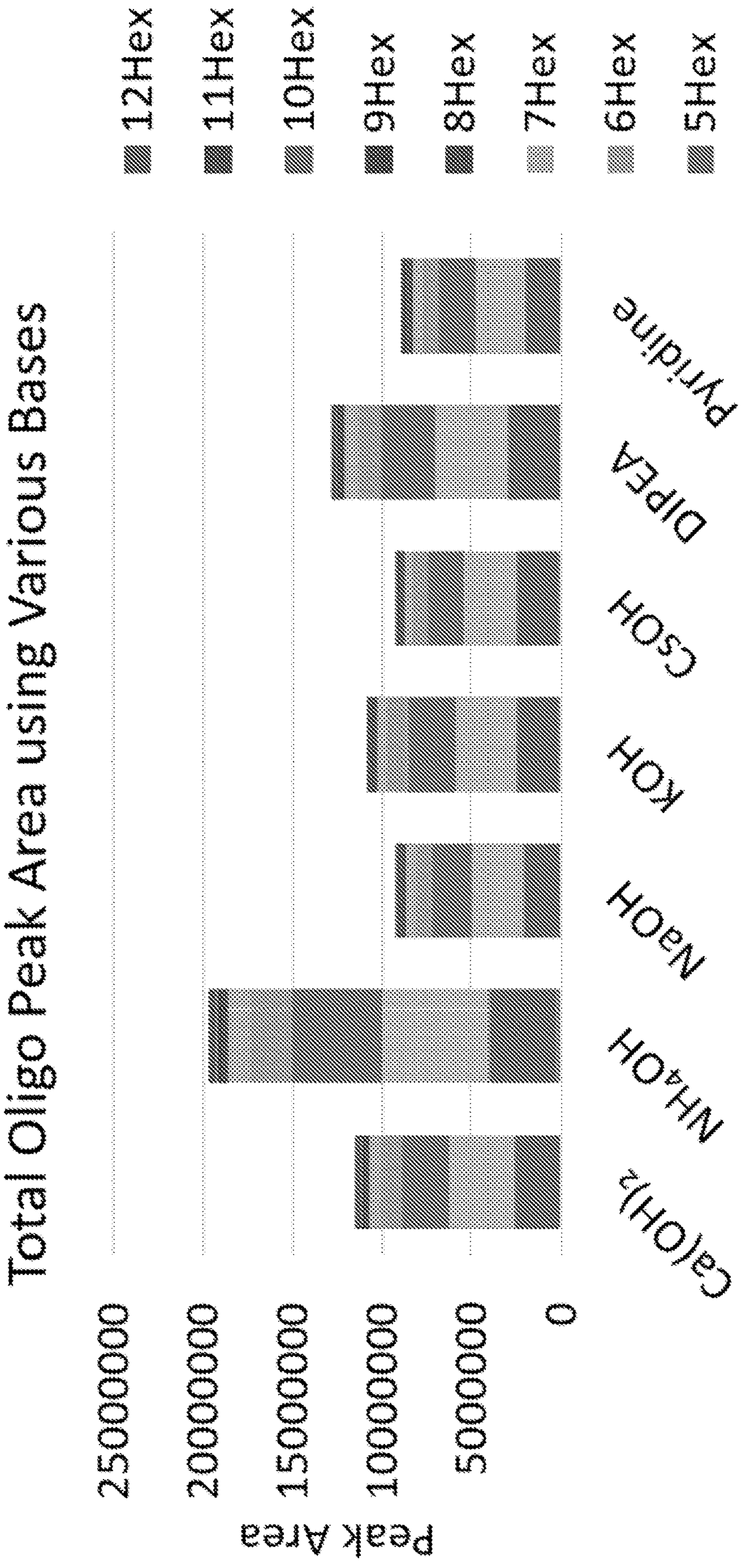
FIG. 9 shows, bacterial growth of oligosaccharides generated from amylopectin. Oligosaccharides are generated from the base cleavage step using ammonium hydroxide or sodium hydroxide.

The oligosaccharide analysis showed different amounts of oligosaccharide production on both the total and structure specific level. All of the bases used in this experiment did produce oligosaccharide products. Ammonium hydroxide produced the highest concentration of oligosaccharides, nearly double the sodium hydroxide (FIG. 9.) Additionally, DIPEA, a nitrogen containing base, produced the second largest concentration of oligosaccharides, while pyridine produced oligosaccharides on-par with the Arrhenius bases. This provides further evidence for the broad classification of "nitrogen-based cleavage reagents" to be considered good cleavage reagents.

Example 8

(Iron (II) and the Production of Locust Bean Oligosaccharides)

In some aspects the oxidation state of the metal can be changed for similar or different results. In this described aspect, Iron (II) was used to produce oligosaccharides from locust bean gum polysaccharide. Locust bean gum contains a galactomannan polymer that contains a β 1,4 mannose backbone with terminal branches of α 1,6 galactose.

Oligosaccharide production: Locust bean gum (550 mg) was dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and iron (II) sulfate (2.75 mg in 50 μL water) were added to the reaction mixture and mixed thoroughly. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) was used to adjust pH and sample was reacted at 45° C. in a shaker-incubator for 1 hour at 20 RPM, the cap was left loose to allow oxygen, ammonia, and carbon dioxide gases to be released. The sample is then frozen and lyophilized, then stored at −80° C. The freeze-dried oligosaccharide mixture was rehydrated with the minimum amount of water required to allow for a free-flowing solution. This solution was then loaded onto a column containing 15 mL mixed bed ion exchange resin per gram (dry weight) of crude material, and the runoff was collected in a plastic freezer bag. Once the material was loaded onto the column, the column was then rinsed with 3 bed volumes of water. Finally, the runoff was sealed and frozen in the bag, then carefully shattered and subjected to lyophilization.

Carbohydrate analysis: Post-cleavage oligosaccharide samples were reconstituted in water and subjected to alditol reduction. Samples were reduced for 1 hour with 2M sodium borohydride at 65° C., then immediately underwent C18 solid phase extraction. Solid phase cartridges were washed with three volumes acetonitrile and two volumes water before samples were loaded and collected as the immediate flow-through. The C18 cartridge-extracted samples were then subjected to non-porous graphitized carbon (NPGC) solid phase extraction. NPGC cartridges were sequentially pre-washed with two volumes water, two volumes of 80% acetonitrile with 0.01% (v/v) TFA in water, and two more volumes of water. The C18 cartridge-extracted samples were then loaded and washed with five volumes of water before being eluted with 40% acetonitrile with 0.05% (v/v) TFA. Finally, the post-NPGC samples were completely dried by evaporative centrifugation and stored at −20° C. until analysis.

(Amicucci, Galermo et al. 2019). Oligosaccharide analysis was carried out on an Agilent 1290 Infinity II HPLC coupled to an Agilent 6530 Accurate-Mass Q-TOF MS. Chromatographic separation was performed on a Thermo Scientific Hypercarb PGC column with a binary gradient which consisted of solvent A: 3% acetonitrile/water+0.1% formic acid and solvent B: 10% water/acetonitrile+0.1% formic acid. With a flow rate of 0.15 mL/min, the gradient was run for 60 min: 2-15% B, 0-20 min; 15-60% B, 20-45 min; 60-99% B, 45-45.10 min; 99-99% B, 45.10-51 min; 99-2% B, 51-51.10 min; 2-2% B, 51.10-60 min. The mass spectrometer was run in positive mode, with a reference mass of 922.0098 m/z. The gas temperature and flow rate were set to 150° C. and 11 l/min, respectively. The nozzle, fragmentor, skimmer voltages were set to be 1500, 75 and 60 volts, respectively. Using tandem mass spectrometry, fragmentation was performed with collision energy of 1.45×(m/z)−3.5. Data was processed using Agilent MassHunter Workstation Quantitative Analysis 10.1 Software. Major peaks in the chromatograms that corresponded to oligosaccharide masses were integrated. Responses of oligosaccharides with DP 2-10 were summed to represent the total oligosaccharide peak area.

Figure 10:
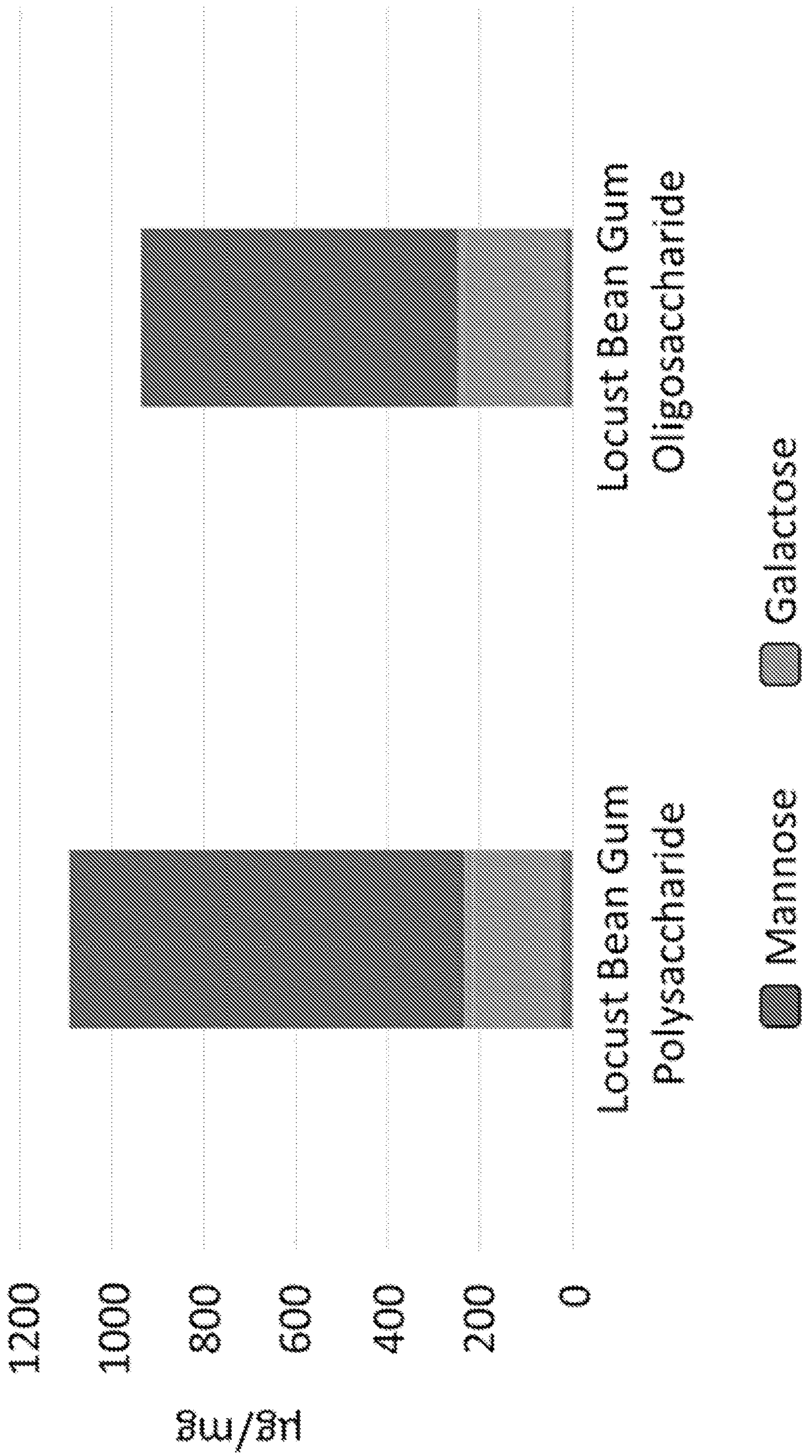
FIG. 10 shows, monosaccharide composition of locust bean gum polysaccharides and locust bean gum oligosaccharides.
Figure 11:
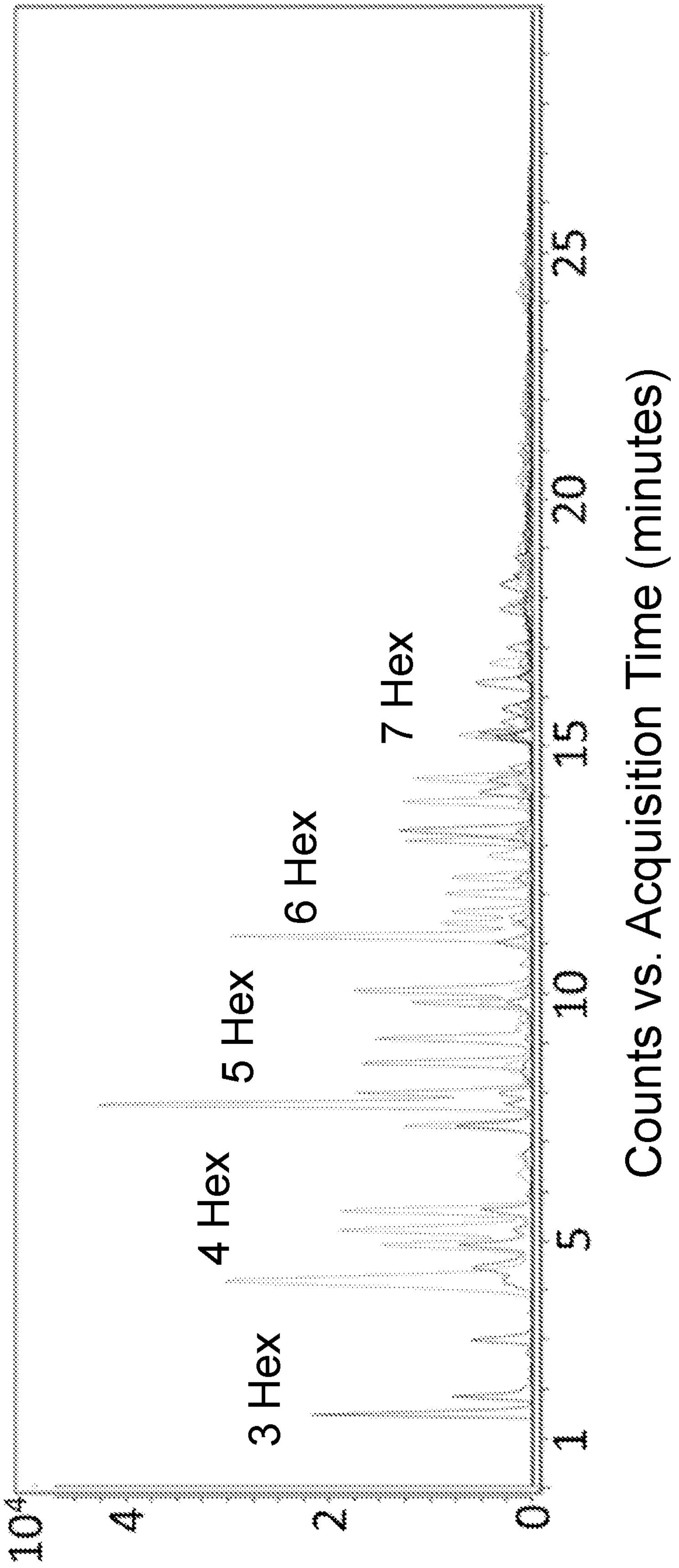
FIG. 11 shows, HPLC/Q-TOF chromatogram showing COG-derived locust bean gum oligosaccharides.

Results: The oligosaccharides produced from the Fe(II) oxidation and cleavage of locust bean gum produced oligosaccharides that resembled their parent locust bean polysaccharide structure, besides for their degree of polymerization, which were much shorter. The monosaccharide analysis indicated a high level of purity (>90%) and a similar monomeric composition as the parent polymer, 3.17:1 vs. 4.52:1 mannose:galactose, respectively (FIG. 10). The oligosaccharide analysis revealed oligosaccharides from 3 to 8 hexoses in length that that contain a plethora of isomers (FIG. 11). Locust bean gum is known to contain the galactomannan polysaccharide which contains a β 1,4 mannose backbone single α 1,6 linked galactoses branching from the backbone.

Example 9

(Arabinoxylan Oligosaccharides Derived from Corn Fiber)

Corn fiber is a highly abundant waste stream from the leftover fermentation of corn to produce ethanol. This material comprises several abundant polysaccharides including, beta-glucan, arabinoxylan, cellulose, and residual amylose and amylopectin. The arabinoxylan components offer an opportunity for producing arabinoxylan oligosaccharides, which have been shown to modulate the gut microbiome (Neyrinck et al. 2012).

Corn fiber was subjected to purification via a chloroform extraction where 5 g of the material was suspended in 100 ml of chloroform and allowed to mix for approximately 2 hours. The resulting mixture was then crashed with 50 mL of 0° C. water, producing a viscous material. The mixture was centrifuged for 30 min at 6500 rpm discarding the liquid layer. The bottom layer was then resuspended in 10 ml of water and crashed with absolute ethanol at 0° C. An additional two subsequent washes with absolute ethanol at 0° C. were conducted to produce a white polysaccharide precipitate. Material was subjected to drying by lyophilization, producing 4.8 g.

The material was subjected to the COG reaction under the following conditions. 550 mg was dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and Copper (II) sulfate (2.75 mg in 50 μL water) or Iron (II) sulfate (2.75 mg in 50 μL water) were added to the reaction mixture and mixed thoroughly. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) was used to adjust pH to 8, 9, or 10 and the sample was reacted at 45° C. in a shaker-incubator for 45 min, 60 min, or 90 min at 20 RPM, the cap was left loose to allow oxygen, ammonia, and carbon dioxide gases to be released. The sample was then frozen and lyophilized.

The freeze-dried oligosaccharide mixture was rehydrated with the minimum amount of water required to allow for a free-flowing solution. This solution was then loaded onto a column containing 15 mL mixed bed ion exchange resin per gram (dry weight) of crude material, and the runoff was collected in a plastic freezer bag. Once the material was loaded onto the column, the column was then rinsed with 3 bed volumes of water. Finally, the runoff was sealed and frozen in the bag, then carefully shattered and subjected to lyophilization.

Carbohydrate analysis: Post-cleavage oligosaccharide samples were reconstituted in water and subjected to alditol reduction. Samples were reduced for 1 hour with 2M sodium borohydride at 65° C., then immediately underwent C18 solid phase extraction. Solid phase cartridges were washed with three volumes acetonitrile and two volumes water before samples were loaded and collected as the immediate flow-through. The C18 cartridge-extracted samples were then subjected to non-porous graphitized carbon (NPGC) solid phase extraction. NPGC cartridges were sequentially pre-washed with two volumes water, two volumes of 80% acetonitrile with 0.01% (v/v) TFA in water, and two more volumes of water. The C18 cartridge-extracted samples were then loaded and washed with five volumes of water before being eluted with 40% acetonitrile with 0.05% (v/v) TFA. Finally, the post-NPGC samples were completely dried by evaporative centrifugation and stored at −20° C. until analysis.

(Amicucci, Galermo et al. 2019). Oligosaccharide analysis was carried out on an Agilent 1290 Infinity II HPLC coupled to an Agilent 6530 Accurate-Mass Q-TOF MS. Chromatographic separation was performed on a Thermo Scientific Hypercarb PGC column with a binary gradient which consisted of solvent A: 3% acetonitrile/water+0.1% formic acid and solvent B: 10% water/acetonitrile+0.1% formic acid. With a flow rate of 0.15 mL/min, the gradient was run for 60 min: 2-15% B, 0-20 min; 15-60% B, 20-45 min; 60-99% B, 45-45.10 min; 99-99% B, 45.10-51 min; 99-2% B, 51-51.10 min; 2-2% B, 51.10-60 min. The mass spectrometer was run in positive mode, with a reference mass of 922.0098 m/z. The gas temperature and flow rate were set to 150° C. and 11 l/min, respectively. The nozzle, fragmentor, skimmer voltages were set to be 1500, 75 and 60 volts, respectively. Using tandem mass spectrometry, fragmentation was performed with collision energy of 1.45×(m/z)−3.5. Data was processed using Agilent MassHunter Workstation Quantitative Analysis 10.1 Software. Major peaks in the chromatograms that corresponded to oligosaccharide masses were integrated.

Figure 12:
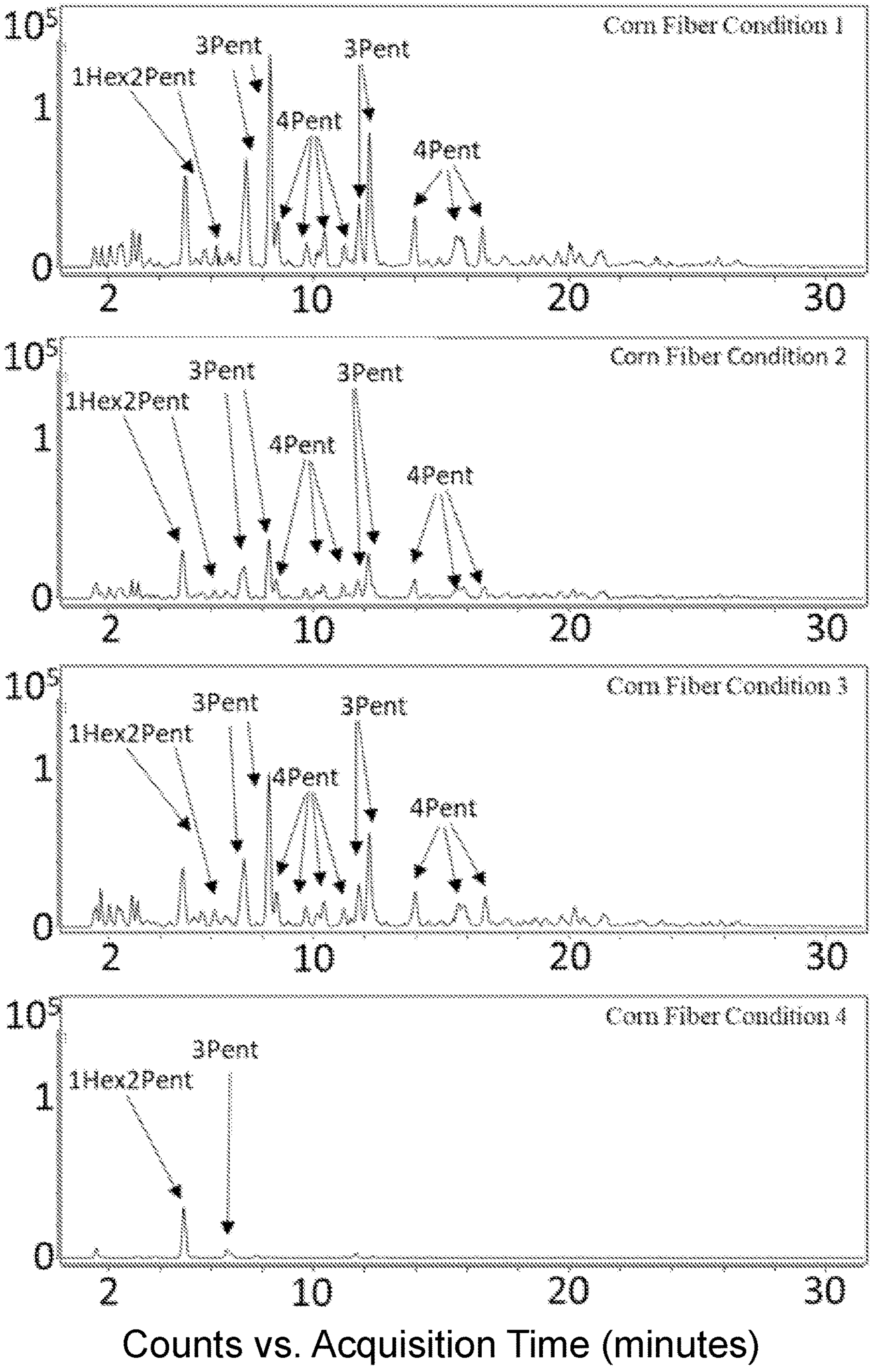
FIG. 12 shows, the comparison of corn fiber oligosaccharide production using differing catalysts and conditions.
Figure 15:
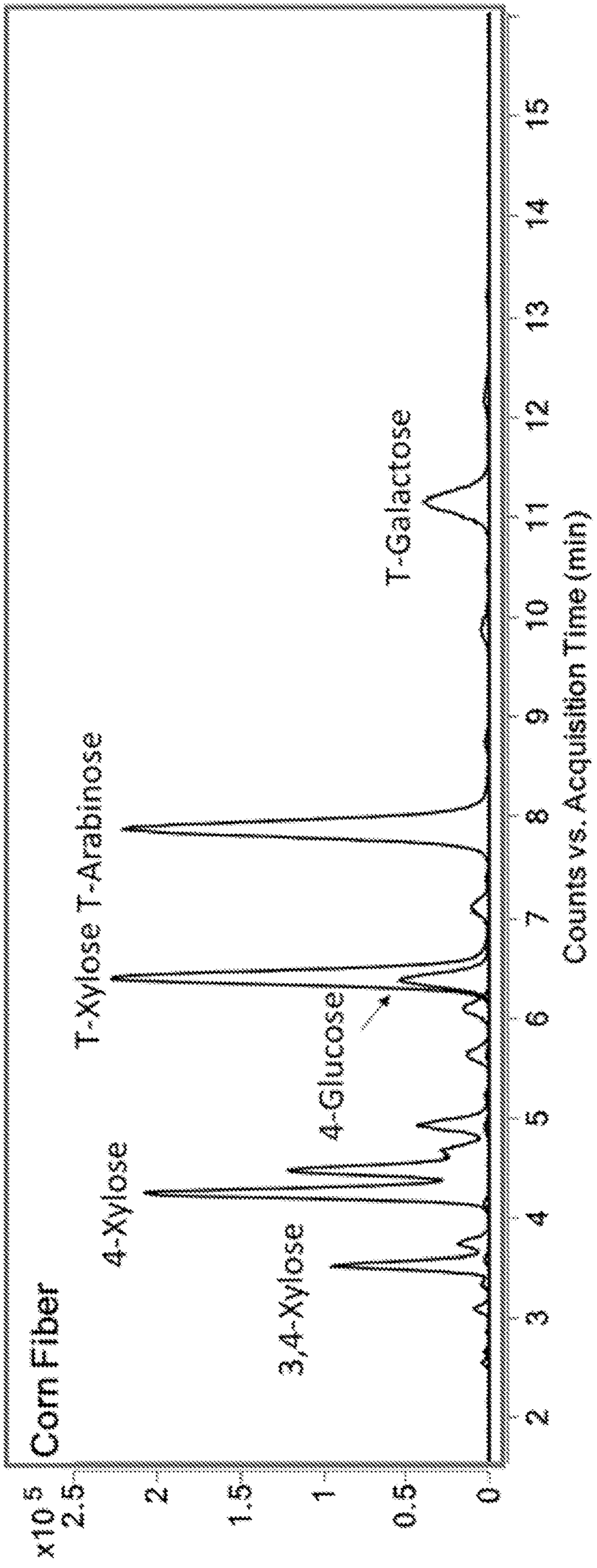
FIG. 15 shows, annotated linkage analysis chromatogram of corn fiber.

Results: The oligosaccharides produced from the Cu(II) oxidation and cleavage of corn fiber at pH 10 for 60 min proved to be the most successful at producing oligosaccharides (FIG. 12). The oligosaccharides ranged from DP 3-4 and had monosaccharide and linkage profiles that represented arabinoxylan. The oligosaccharides had a ratio of 1.36:1 xylose:arabinose and had linkages that include terminal xylose, terminal arabinose, terminal galactose, 4-xylose, 3,4-xylose and 4-glucose. For reference, an annotated linkage analysis chromatogram of corn fiber is provided in FIG. 15. FIG. 12 shows four unique corn fiber oligosaccharide profiles. Condition 1 produced the most oligosaccharides and resulted from the addition of $NH_4OH$ to reach pH 10, where the solution was heated for 1 hour at 45° C. post Fenton oxidation with Cu (II). Condition 2 produced roughly 5-fold less oligosaccharides than Condition 1, which resulted from the addition of $NH_4OH$ to reach pH 9, where the solution was heated for 1.5 hour at 45° C. post Fenton oxidation with Cu (II). Condition 3 produced slightly less oligosaccharides than Condition 1 and resulted from the addition of $NH_4OH$ to reach pH 8, where the solution was heated for 0.75 hour at 45° C. post Fenton oxidation with Cu (II). These results indicate the pH, time, and temperature are important factors for optimizing the oligosaccharide yield. Furthermore, Condition 4 produced only few oligosaccharides and resulted from the addition of $NH_4OH$ to reach pH 10, where the solution was heated for 1 hour at 45° C. post Fenton oxidation with Fe (II). This result indicates that some polysaccharide sources are more amenable to depolymerization when copper is used in the oxidation step, rather than iron.

Example 10

(Composition of Matter)

A number of polysaccharide rich materials were assessed for their ability to be dissociated by COG. Each material produced a number of unexpected oligosaccharide products, due to the prior lack of mechanism, and were characterized at both the pool level (multiple oligosaccharides) and the individual oligosaccharide level. When possible, the pools are described by their monosaccharide and glycosidic linkage profiles, 2D-NMR (Table 5), and liquid chromatography/quadrapole-time-of-flight mass spectrometry (LC/Q-TOF MS). Furthermore, individual oligosaccharides were identified and characterized by their mass, retention time, and fragmentation patterns.

Oligosaccharide production: Arabinogalactan II, Lichenan, 1,4 B-Mannan, Xylan, Amylopectin, Arabinoxylan, Beta-Glucan, Galactan, Galactomannan Glucomannan, Xyloglucan, and Locust Bean Gum (550 mg) were dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and iron (II) sulfate (2.75 mg in 50 μL water) were added to the reaction mixture and mixed thoroughly. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) was used to adjust pH and sample was reacted at 45° C. in a shaker-incubator for 1 hour at 20 RPM, the cap was left loose to allow oxygen, ammonia, and carbon dioxide gases to be released. The sample is then frozen and lyophilized, then stored at −80° C. The freeze-dried oligosaccharide mixture was rehydrated with the minimum amount of water required to allow for a free-flowing solution. This solution was then loaded onto a column containing 15 mL mixed bed ion exchange resin per gram (dry weight) of crude material, and the runoff was collected in a plastic freezer bag. Once the material was loaded onto the column, the column was then rinsed with 3 bed volumes of water. Finally, the runoff was sealed and frozen in the bag, then carefully shattered and subjected to lyophilization.

Curdlan and Corn Fiber (550 mg) were dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and Cu (II) sulfate (2.75 mg in 50 μL water) were added to the reaction mixture and mixed thoroughly. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) was used to adjust pH and sample was reacted at 45° C. in a shaker-incubator for 1 hour at 20 RPM, the cap was left loose to allow oxygen, ammonia, and carbon dioxide gases to be released. The sample is then frozen and lyophilized, then stored at −80° C. The freeze-dried oligosaccharide mixture was rehydrated with the minimum amount of water required to allow for a free-flowing solution. This solution was then loaded onto a column containing 15 mL mixed bed ion exchange resin per gram (dry weight) of crude material, and the runoff was collected in a plastic freezer bag. Once the material was loaded onto the column, the column was then rinsed with 3 bed volumes of water. Finally, the runoff was sealed and frozen in the bag, then carefully shattered and subjected to lyophilization.

Monosaccharide analysis was performed in the manner of Amicucci et al. (Amicucci, M. J., Galermo, A. G., et al. (2019). International Journal of Mass Spectrometry 438: 22-28.) but was adapted to be run on an Agilent 6530 Q-TOF mass spectrometer. Glycosidic linkage analysis was performed in the manner of Galermo, A. G., Nandita, E., et al. (2018). Analytical Chemistry 90(21): 13073-13080 with the expanded retention time library presented in Galermo, A. G., Nandita, E., et al. (2019). Analytical Chemistry 91(20): 13022-13031 and was adapted to be run on an Agilent 6530 Q-TOF mass spectrometer. Oligosaccharide analysis was performed in the manner of Amicucci, M. J., Nandita, E., et al. (2020). Nature Communications 11(1): 1-12. Oligosaccharide peak volumes were generated from Agilent Mass Hunter Qualitative Analysis B.10 by using their "find by molecular feature" function. For NMR analysis, oligosaccharides were dissolved in $D_2O$ at a concentration of 50 mg/ml and were analyzed on a 600 MHz Bruker NMR spectrometer for their HSQC spectra.

Monosaccharide Composition: The oligosaccharide pools generated from the COG reaction were analyzed for their monosaccharide compositions, which are shown in Table 3. Seven monosaccharides were measured in the 14 samples that underwent the COG reactions.

TABLE 3

Monosaccharide composition of claimed composition of matter pools. Units represent relative abundance by mass. The notation "—" represents a monosaccharide that exists an amount less than 2% of the total polymer weight.

| | Glucose | Galactose | Mannose | Arabinose | Xylose | Rhamnose | GalA | Others |
|---|---|---|---|---|---|---|---|---|
| Arabinogalactan II | — | 87.28 | — | 7.23 | — | — | — | 1.27 |
| Lichenan | 80.21 | 8.64 | 8.64 | — | — | — | — | 1.11 |
| 1,4 B-Mannan | 4.48 | 7.61 | 83.8 | 2.99 | — | — | — | 1.11 |
| Xylan | 5.36 | 2.04 | 4.9 | — | 85.48 | — | — | 0.78 |
| Amylopectin | 98.19 | — | — | — | — | — | — | 0.54 |
| Arabinoxylan | — | 2.08 | — | 36.99 | 60.28 | — | — | 0.09 |
| Beta-Glucan | 97.04 | — | — | — | — | — | — | 1.61 |
| Galactan | — | 80.06 | — | 9.28 | — | 4.59 | 3.04 | 2.44 |
| Galactomannan | — | 18.91 | 78.14 | — | — | — | — | 0.3 |
| Glucomannan | 36.73 | — | 60.45 | — | — | — | — | 0.19 |
| Xyloglucan | 48.75 | 14.14 | — | — | 36.38 | — | — | 0.48 |
| Locust Bean Gum | — | 22.98 | 72.91 | — | — | — | — | 0.33 |
| Curdlan | 99.04 | — | — | — | — | — | — | 0.28 |
| Corn Fiber | 3.07 | 6.78 | — | 35.76 | 48.68 | — | — | 4.65 |

Glycosidic Linkage Analysis: The oligosaccharide pools generated from the COG reaction were analyzed for their monosaccharide compositions, which are shown in Table 4. Sixteen glycosidic linkage positions were identified in the 14 samples that underwent the COG reactions.

TABLE 4

Glycosidic linkage compositions of claimed composition of matter pools. Units represent relative abundance by peak area. The notation "—" represents a glycosidic linkage that exists an amount less than 2% of the total polymer weight.

| | 3-Glc | 4-Glc | 6-Glc | 4,6-Glc | T-Glc | 3-Gal | 4-Gal | 3,6-Gal | 6-Gal | T-Gal |
|---|---|---|---|---|---|---|---|---|---|---|
| Arabinoxylan | — | — | — | — | — | — | — | — | — | — |
| Xyloglucan | — | 28.23 | 5.63 | 20.49 | 4.23 | — | — | — | — | 20.62 |
| Beta-glucan | 17.06 | 48.91 | — | — | 30.95 | — | — | — | — | — |
| Amylopectin | — | 70.23 | — | 3.83 | 17.60 | — | — | — | — | — |
| Galactomannan | — | 2.34 | — | — | — | — | — | — | — | 17.85 |
| Arabinogalactan II | — | — | — | — | — | 17.33 | — | 14.18 | 11.83 | 50.75 |
| Lichenan | 25.57 | 42.76 | — | — | 22.71 | — | — | — | — | 7.45 |
| Mannan | — | — | — | — | — | — | — | — | — | 3.63 |
| Xylan | — | 13.61 | — | — | 5.19 | — | — | — | — | — |
| Galactan | — | — | — | — | — | — | 61.68 | — | — | 33.73 |
| Glucomannan | — | 31.52 | — | — | 7.65 | — | — | — | — | — |
| Locust Bean Gum | — | — | — | — | — | — | — | — | — | 19.58 |
| Curdlan | 74.84 | — | — | — | 8.82 | — | — | — | — | — |
| Corn Fiber | — | 5.83 | — | — | — | — | — | — | — | 6.49 |

| | 2-Xyl | 4-Xyl | 3,4-Xyl | T-Xyl | T-Arab | 4-Man | 4,6-Man | T-Man | Other |
|---|---|---|---|---|---|---|---|---|---|
| Arabinoxylan | — | 31.20 | 22.22 | 2.65 | 30.55 | — | — | — | 11.14 |
| Xyloglucan | 5.81 | — | — | 10.78 | — | — | — | — | 0.97 |
| Beta-glucan | — | — | — | — | — | — | — | — | 1.36 |
| Amylopectin | — | — | — | — | — | — | — | — | 4.82 |
| Galactomannan | — | — | — | — | — | 47.34 | 6.52 | 20.79 | 4.39 |
| Arabinogalactan II | — | — | — | — | 3.28 | — | — | — | 1.09 |
| Lichenan | — | — | — | — | — | — | — | — | 0.0 |
| Mannan | — | — | — | — | — | 58.31 | — | 34.60 | 0.0 |
| Xylan | — | 54.71 | — | 7.18 | — | 15.28 | — | — | 1.93 |
| Galactan | — | — | — | — | 2.02 | — | — | — | 1.62 |
| Glucomannan | — | — | — | — | — | 47.58 | | 12.58 | 0.0 |
| Locust Bean Gum | — | — | — | — | — | 62.02 | 8.95 | 6.82 | 0.0 |
| Curdlan | — | — | — | — | — | — | — | — | 15.13 |
| Corn Fiber | — | 16.33 | 6.21 | 25.05 | 27.79 | — | — | — | 12.29 |

1H-13C HSQC NMR: Was performed on all of the samples except galactan. The analysis provided a fingerprint of each sample in order to compare the similarities between these and future oligosaccharide pools. The cross peak coordinates found in the anomeric region of the spectra are listed in Table 5 and the spectra are provided in FIG. 13.

TABLE 5

1H-13C HSQC NMR correlations from oligosaccharides created from the COG process. The listed pairs correspond to those major peaks in the anomeric region.

| Microbial Curdlan | | Konjac Glucomannan | | Carob Galactomannan | | Barley β-Glucan | | Arabinogalactan II | | Lichenan | |
|---|---|---|---|---|---|---|---|---|---|---|---|
| 1H δ [ppm] | 13C δ [ppm] | 1H δ [ppm] | 13C δ [ppm] | 1H δ [ppm] | 13C δ [ppm] | 1H δ [ppm] | 13C δ [ppm] | 1H δ [ppm] | 13C δ [ppm] | 1H δ [ppm] | 13C δ [ppm] |
| 3.37 | 103.44 | 4.52 | 102.44 | 4.50 | 96.76 | 4.64 | 95.88 | 3.54 | 100.74 | 4.51 | 102.45 |
| 3.42 | 99.57 | 4.55 | 96.58 | 4.51 | 96.70 | 4.75 | 102.73 | 3.64 | 99.80 | 4.54 | 102.32 |
| 3.52 | 105.61 | 4.56 | 96.52 | 4.55 | 96.52 | 4.67 | 95.70 | 3.65 | 99.80 | 4.64 | 95.82 |
| 3.52 | 98.05 | 4.62 | 95.88 | 4.57 | 96.46 | 4.76 | 102.68 | 3.66 | 102.68 | 4.66 | 95.75 |
| 3.57 | 103.32 | 4.65 | 95.76 | 4.58 | 96.41 | 4.78 | 102.50 | 3.70 | 93.24 | 4.67 | 95.75 |
| 3.74 | 90.66 | 4.66 | 95.76 | 4.85 | 96.82 | 4.79 | 102.50 | 3.71 | 105.14 | 4.75 | 102.73 |
| 3.76 | 90.61 | 4.76 | 99.98 | 4.87 | 96.76 | 5.23 | 91.89 | 3.71 | 105.08 | 4.79 | 102.52 |
| 3.80 | 84.04 | 4.84 | 96.82 | 4.89 | 93.65 | 4.65 | 95.88 | 3.77 | 90.96 | 5.23 | 91.92 |
| 3.92 | 90.66 | 4.86 | 96.76 | 4.91 | 93.65 | 4.52 | 102.50 | 3.78 | 100.16 | 5.37 | 99.03 |
| 3.95 | 90.66 | 4.88 | 93.65 | 5.00 | 98.34 | 4.51 | 102.50 | 3.86 | 81.93 | 5.42 | 99.72 |
| 4.64 | 95.88 | 4.90 | 93.65 | 5.00 | 94.00 | 4.54 | 102.32 | 3.91 | 103.61 | | |
| 4.65 | 95.88 | 5.17 | 93.77 | 5.03 | 98.69 | 4.66 | 95.70 | 3.91 | 99.22 | | |
| 4.67 | 95.64 | 5.21 | 91.84 | 5.18 | 93.83 | | | 3.93 | 98.63 | | |
| 4.69 | 95.64 | 5.27 | 92.30 | 5.23 | 92.54 | | | 3.96 | 98.57 | | |

TABLE 5-continued 1H-13C HSQC NMR correlations from oligosaccharides created from the COG process. The listed pairs correspond to those major peaks in the anomeric region.

| | | | | | | | | | | | |
|---|---|---|---|---|---|---|---|---|---|---|---|
| 4.76 | 102.73 | 5.39 | 99.57 | 5.23 | 88.55 | | | 4.05 | 99.22 | | |
| 4.77 | 102.68 | | | 5.24 | 88.55 | | | 4.20 | 98.40 | | |
| 4.80 | 102.50 | | | 5.26 | 92.25 | | | 4.24 | 98.46 | | |
| 4.81 | 102.50 | | | 5.28 | 92.30 | | | 4.45 | 103.44 | | |
| 5.24 | 92.01 | | | 5.29 | 101.39 | | | 4.69 | 103.85 | | |

| Corn Fiber Arabinoxylan | | Beechwood Xylan | | Amylopectin | | Tamarind Xyloglucan | | Locust Bean Gum Galactomannan | | Rye Arabinoxylan | |
|---|---|---|---|---|---|---|---|---|---|---|---|
| 1H δ [ppm] | 13C δ [ppm] | 1H δ [ppm] | 13C δ [ppm] | 1H δ [ppm] | 13C δ [ppm] | 1H δ [ppm] | 13C δ [ppm] | 1H δ [ppm] | 13C δ [ppm] | 1H δ [ppm] | 13C δ [ppm] |
| 4.49 | 102.93 | 4.16 | 101.09 | 4.26 | 100.40 | 4.56 | 104.43 | 4.52 | 102.52 | 4.46 | 101.27 |
| 4.50 | 103.00 | 4.31 | 101.15 | 4.29 | 100.40 | 4.56 | 102.45 | 4.53 | 102.52 | 4.48 | 101.56 |
| 4.51 | 102.93 | 4.35 | 109.59 | 4.56 | 96.57 | 4.57 | 96.57 | 4.55 | 96.50 | 4.49 | 101.56 |
| 4.51 | 96.78 | 4.39 | 100.10 | 4.57 | 96.50 | 4.67 | 103.00 | 4.57 | 96.50 | 4.51 | 102.91 |
| 4.56 | 102.32 | 4.40 | 100.74 | 4.64 | 95.75 | 4.67 | 95.68 | 4.64 | 104.30 | 4.51 | 101.56 |
| 4.58 | 102.11 | 4.46 | 101.80 | 4.65 | 95.75 | 4.68 | 95.75 | 4.76 | 100.13 | 4.55 | 102.91 |
| 5.18 | 92.13 | 4.48 | 101.62 | 4.85 | 108.47 | 4.69 | 95.75 | 4.87 | 96.78 | 4.58 | 102.27 |
| 5.19 | 92.06 | 4.48 | 100.86 | 4.87 | 108.40 | 4.70 | 95.68 | 4.91 | 93.63 | 4.58 | 99.92 |
| 5.22 | 92.61 | 4.49 | 102.79 | 4.95 | 97.94 | 4.96 | 98.83 | 5.03 | 99.38 | 4.58 | 96.46 |
| 5.24 | 92.47 | 4.49 | 101.62 | 4.98 | 98.42 | 5.18 | 98.62 | 5.03 | 98.69 | 4.60 | 96.41 |
| 5.35 | 108.06 | 4.49 | 100.86 | 5.00 | 97.12 | 5.24 | 91.79 | 5.03 | 97.80 | 4.61 | 102.27 |
| 5.37 | 108.26 | 4.50 | 102.79 | 5.04 | 98.90 | 5.41 | 92.06 | 5.09 | 107.44 | 4.62 | 96.35 |
| 5.39 | 108.26 | 4.53 | 102.91 | 5.08 | 100.81 | | | 5.18 | 93.77 | 4.63 | 99.86 |
| 5.40 | 108.26 | 4.54 | 102.91 | 5.15 | 109.15 | | | 5.19 | 107.10 | 4.63 | 96.35 |
| | | 4.55 | 100.21 | 5.18 | 100.13 | | | 5.28 | 92.27 | 5.05 | 108.18 |
| | | 4.57 | 102.21 | 5.22 | 100.13 | | | 5.41 | 92.13 | 5.19 | 92.01 |
| | | 4.57 | 100.21 | 5.22 | 91.86 | | | 5.43 | 92.06 | 5.23 | 108.59 |
| | | 4.58 | 102.21 | 5.25 | 100.74 | | | | | 5.28 | 108.01 |
| | | 4.58 | 96.46 | 5.25 | 97.94 | | | | | 5.33 | 108.01 |
| | | 4.59 | 100.27 | 5.26 | 92.61 | | | | | 5.35 | 91.72 |
| | | 4.59 | 96.46 | 5.40 | 99.58 | | | | | 5.39 | 107.60 |
| | | 4.63 | 101.27 | | | | | | | | |
| | | 4.64 | 101.27 | | | | | | | | |
| | | 4.71 | 101.68 | | | | | | | | |
| | | 4.72 | 101.74 | | | | | | | | |
| | | 4.73 | 96.64 | | | | | | | | |
| | | 4.74 | 96.64 | | | | | | | | |
| | | 5.06 | 101.39 | | | | | | | | |
| | | 5.06 | 98.46 | | | | | | | | |
| | | 5.09 | 96.93 | | | | | | | | |
| | | 5.12 | 98.05 | | | | | | | | |
| | | 5.19 | 91.95 | | | | | | | | |
| | | 5.29 | 97.75 | | | | | | | | |
| | | 5.30 | 97.75 | | | | | | | | |
| | | 5.40 | 99.57 | | | | | | | | |
| | | 5.41 | 97.93 | | | | | | | | |
| | | 5.41 | 92.13 | | | | | | | | |

Figure 14:
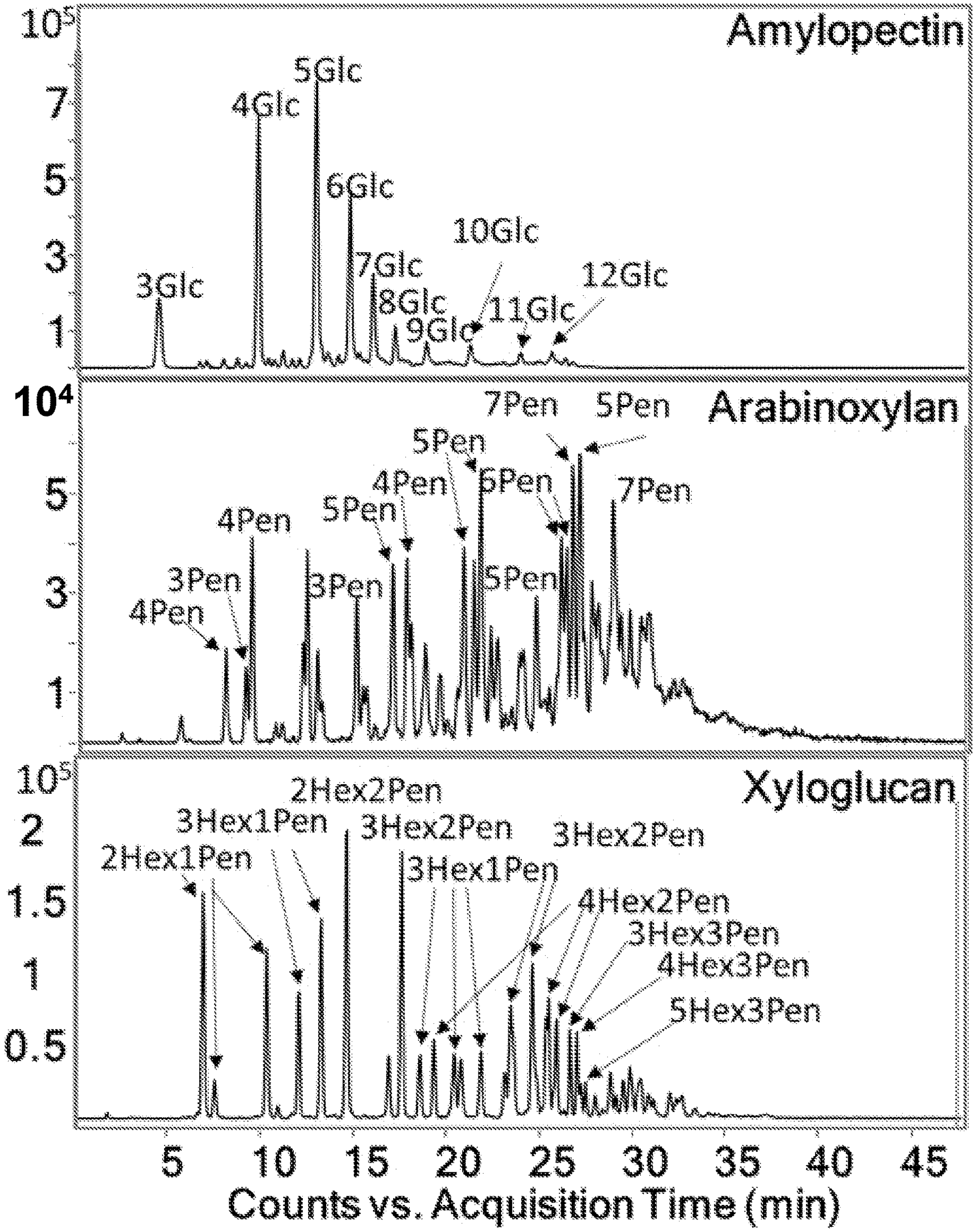
FIG. 14 shows, annotated Extracted Ion Chromatograms with the most abundant oligosaccharides labeled.
Figure 14:
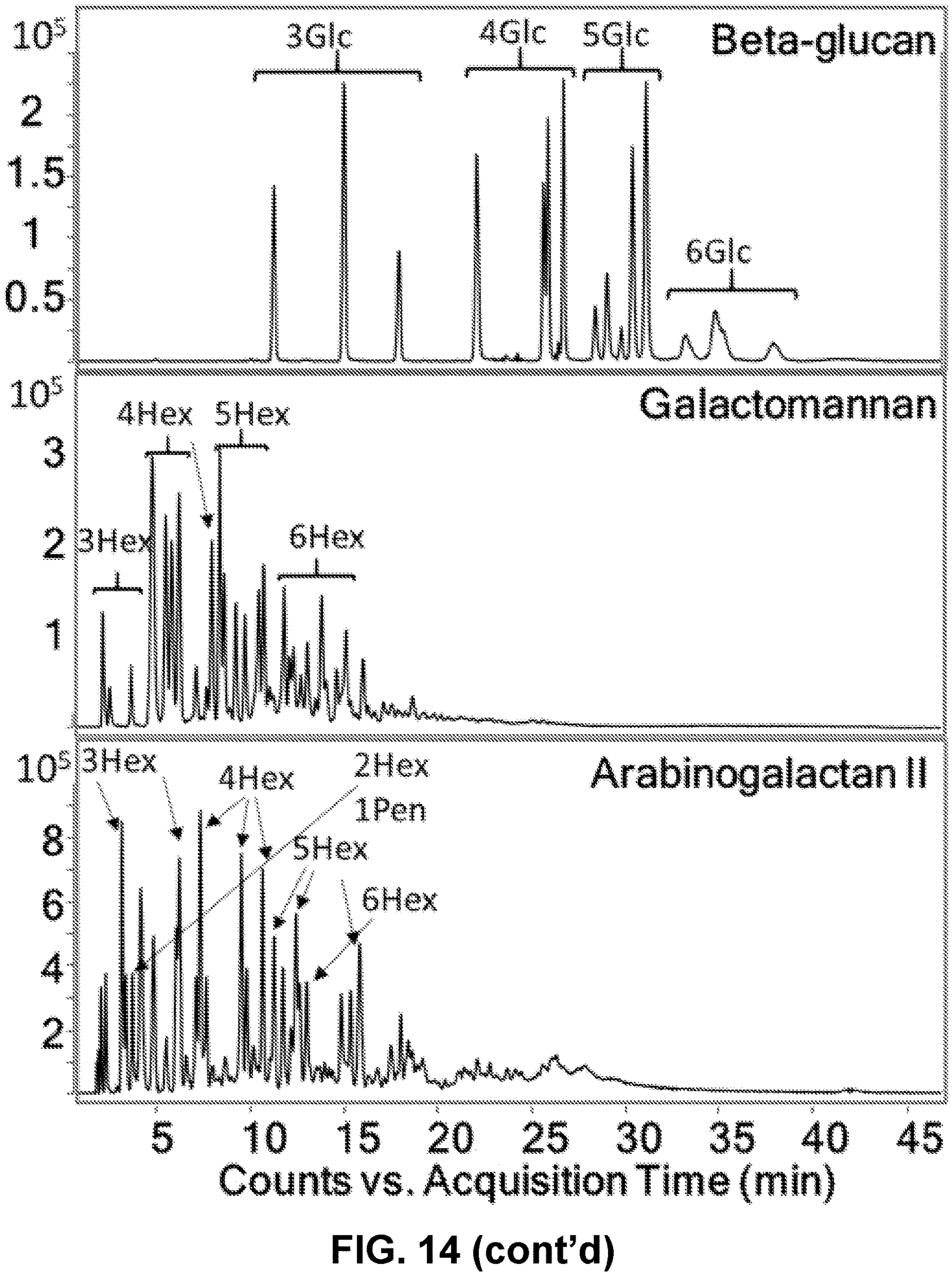
Figure 14:
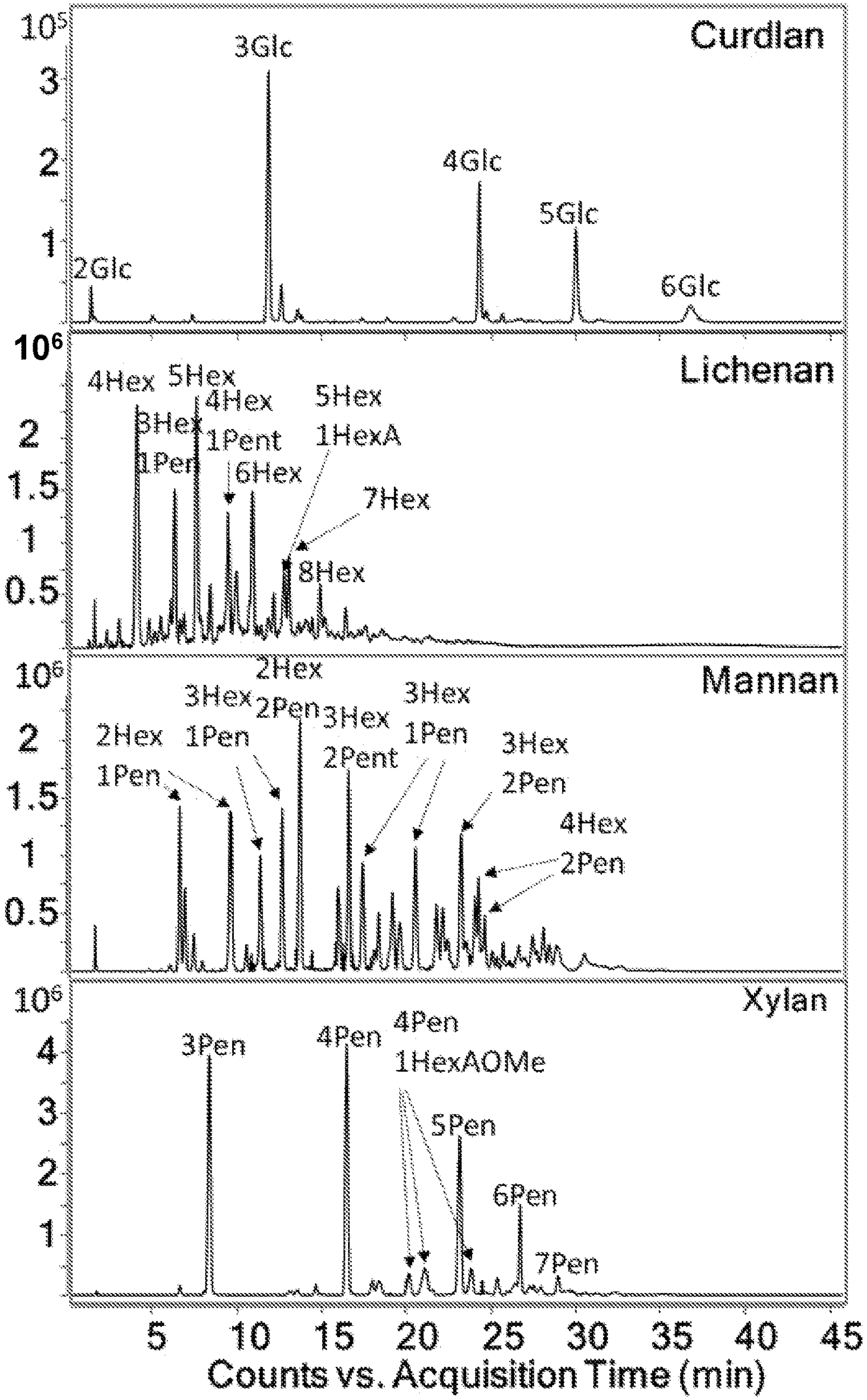
Figure 14:
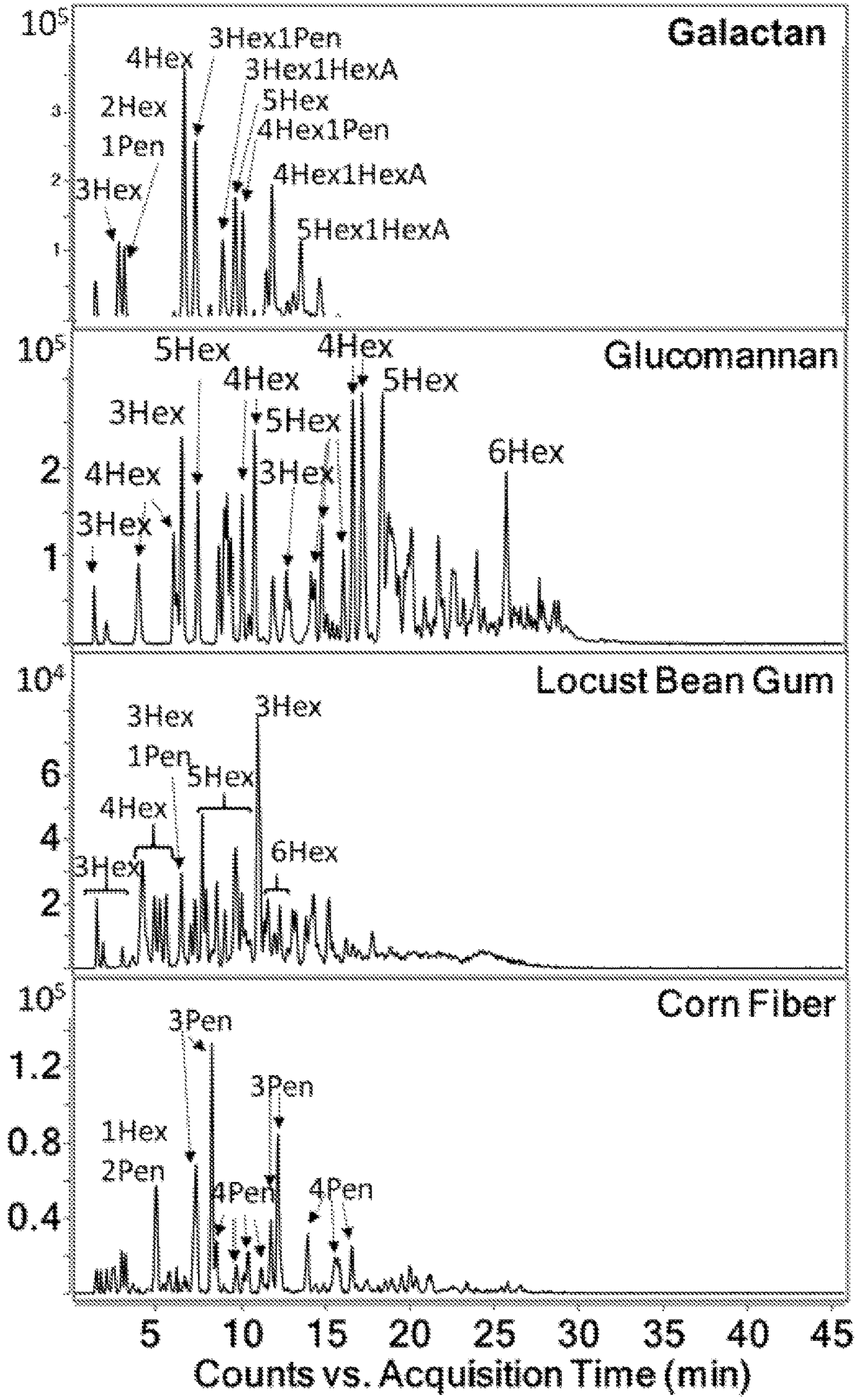

1H-13C HSQC NMR: Oligosaccharides are presented in two formats. Tables 6-19 show the "Find By Molecular Feature" data that shows the mass, retention time, composition, and oligosaccharide relative abundance. Additionally, we have provided annotated chromatograms of the oligosaccharides in FIG. 14.

Figure 13:
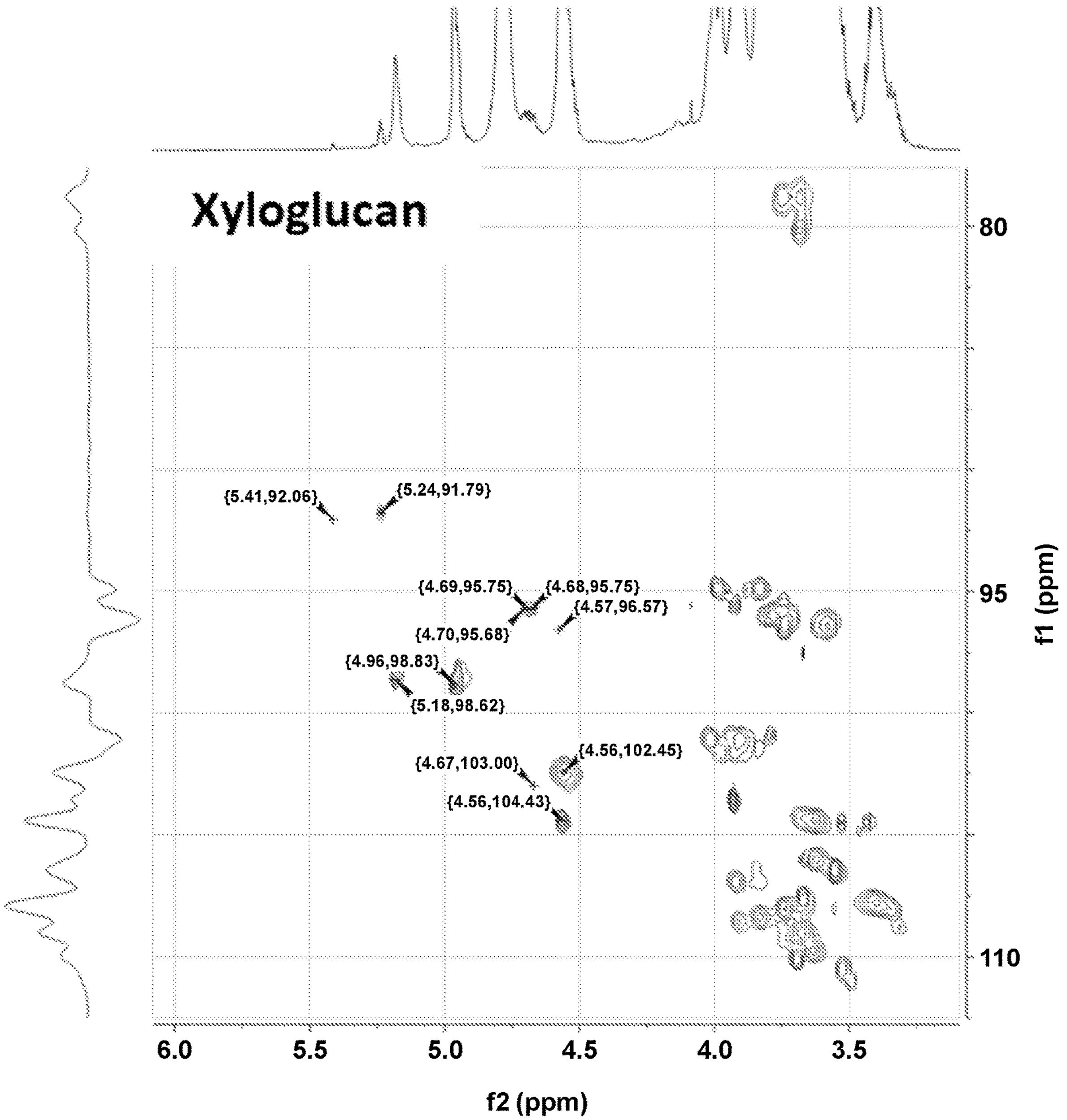
FIG. 13 shows, 1H-13C HSQC NMR spectra of COG-derived oligosaccharides.
Figure 13:
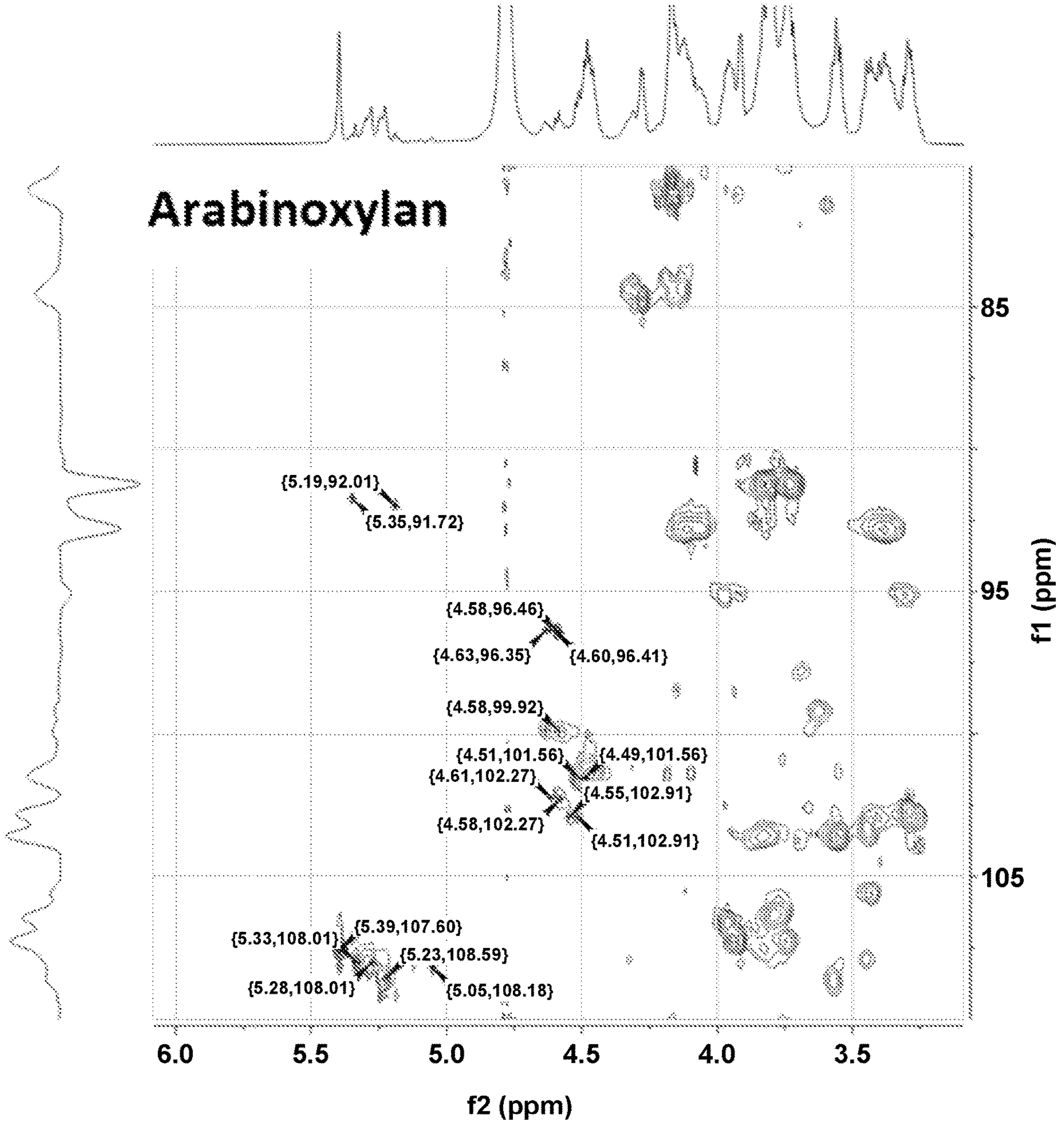
Figure 13:
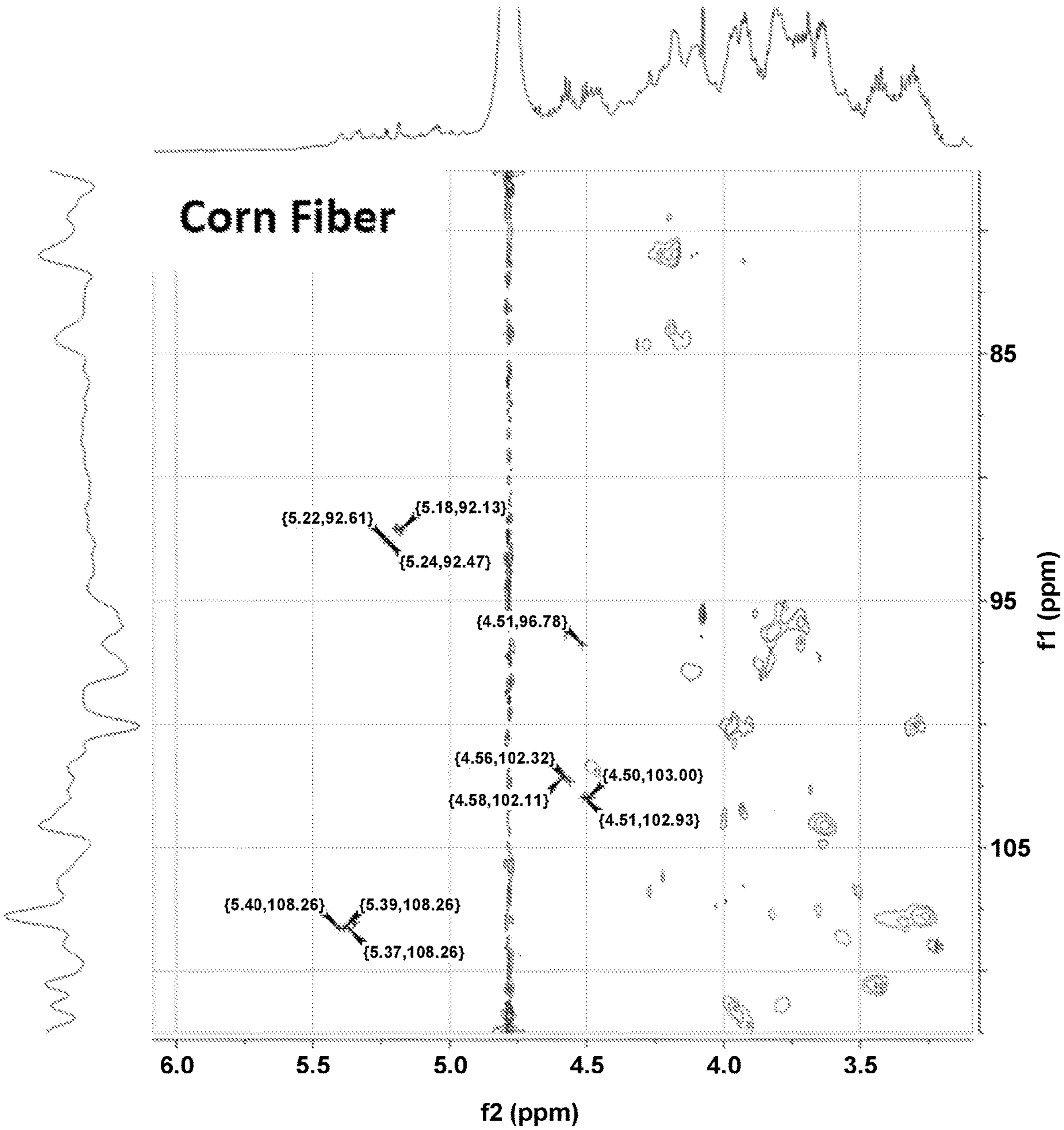
Figure 13:
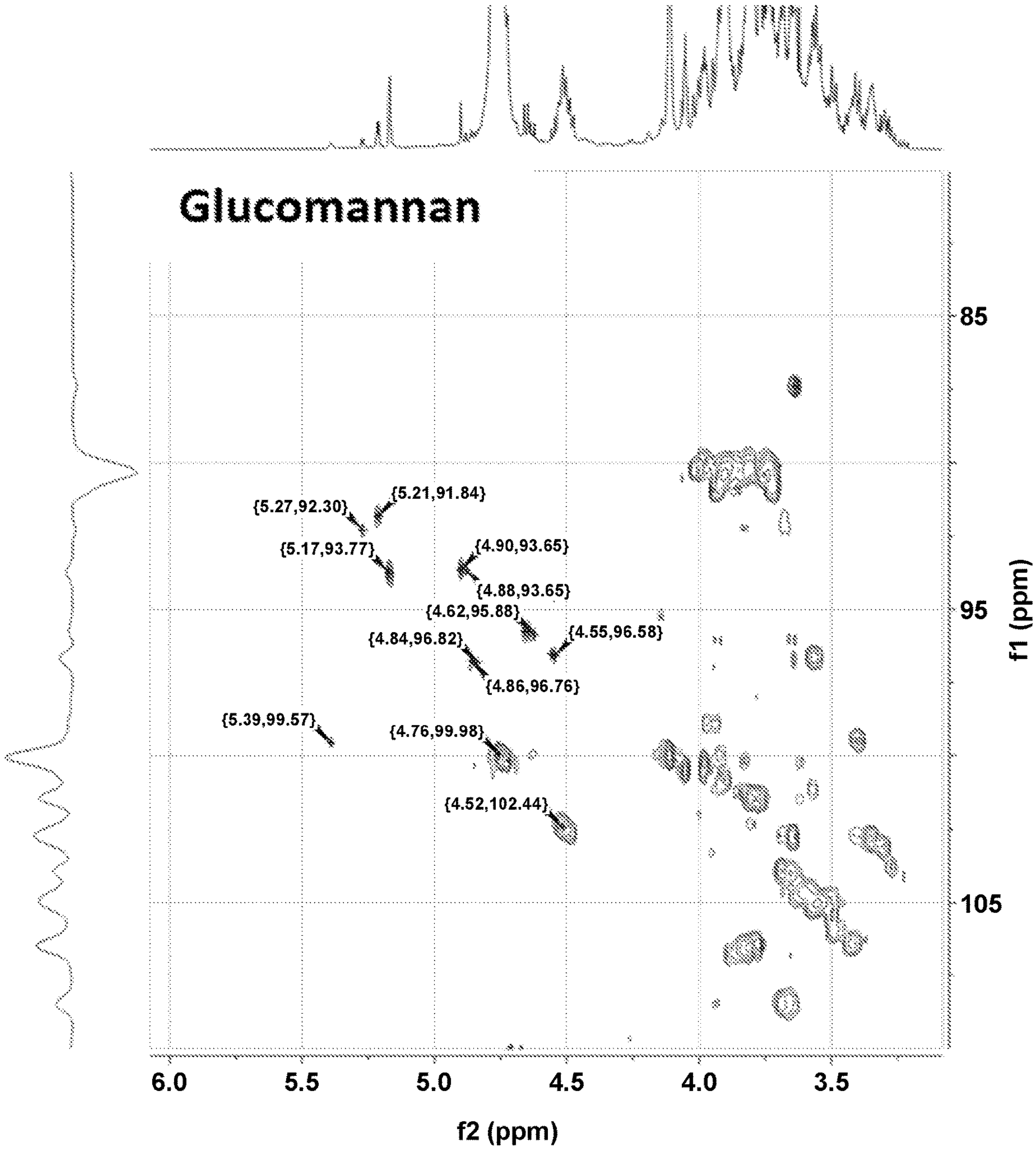
Figure 13:
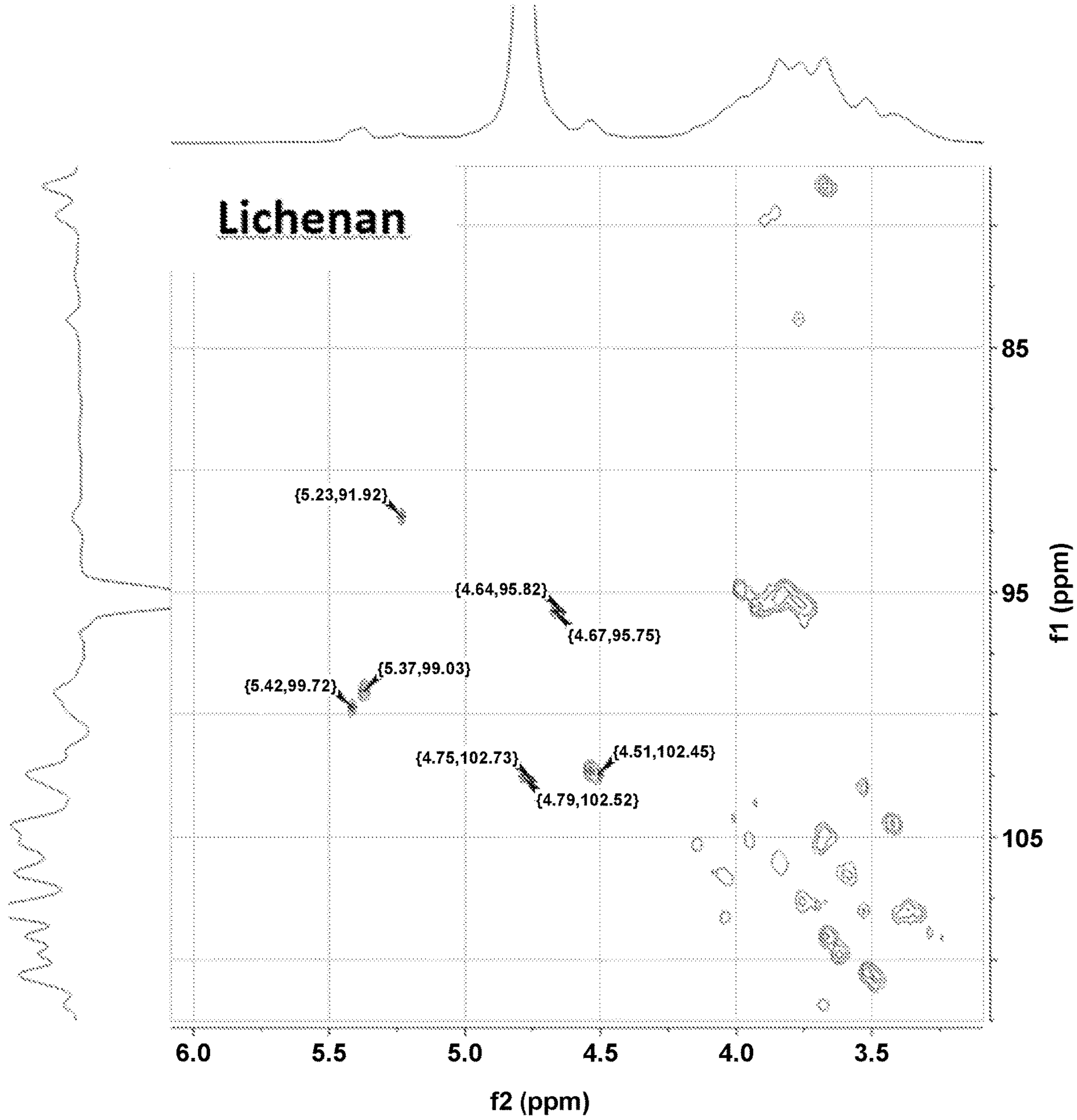
Figure 13:
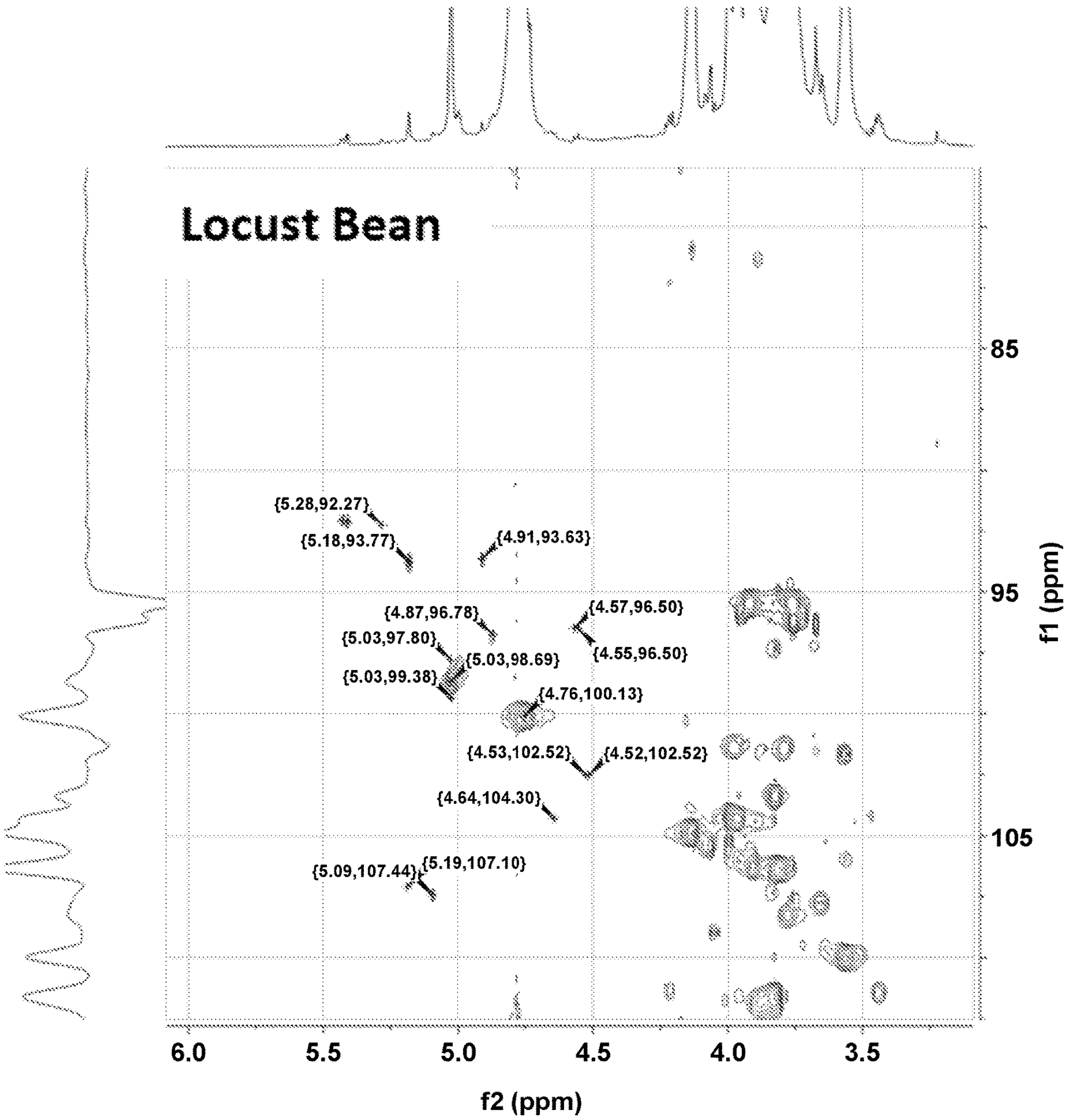
Figure 13:
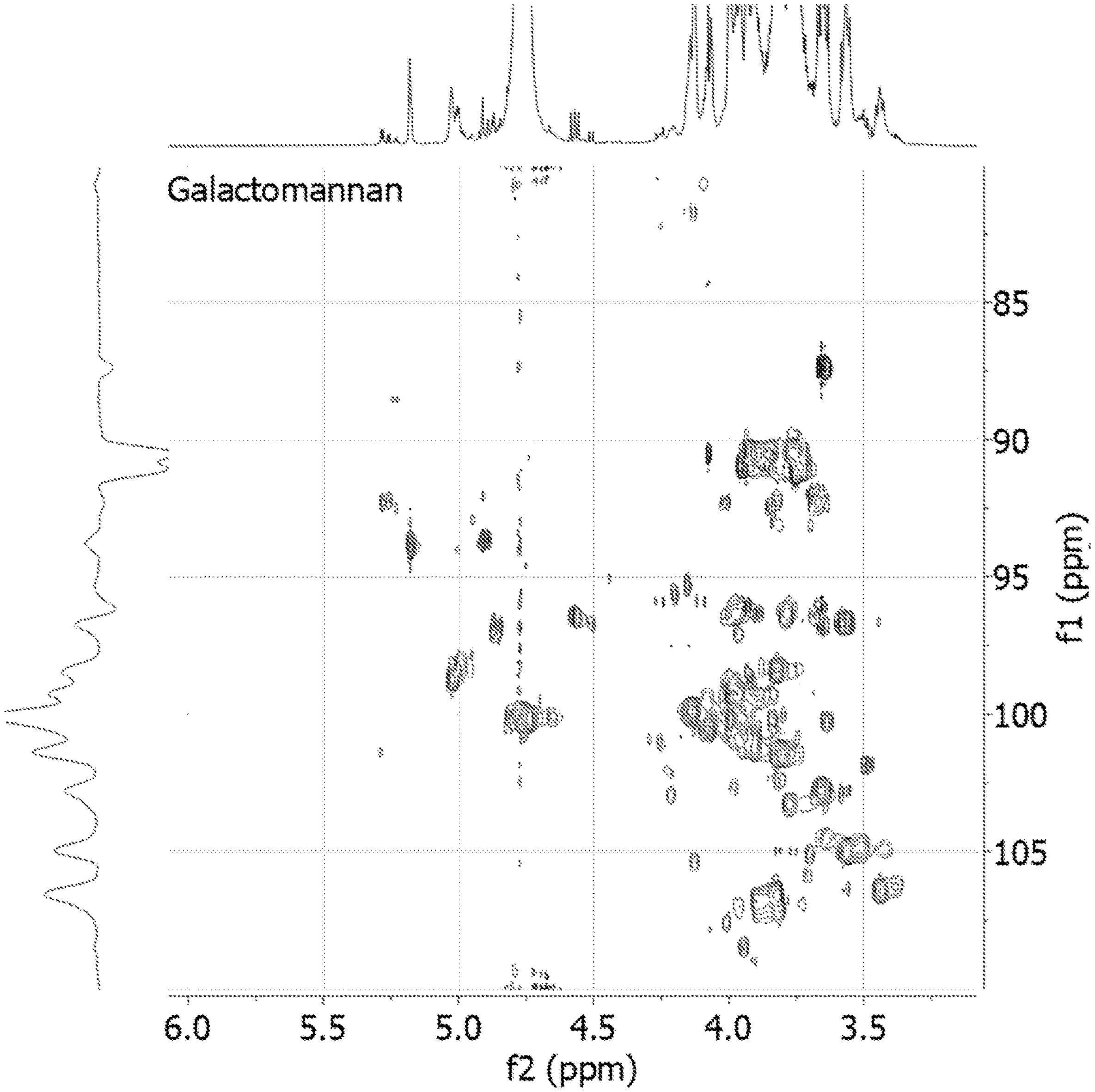
Figure 13:
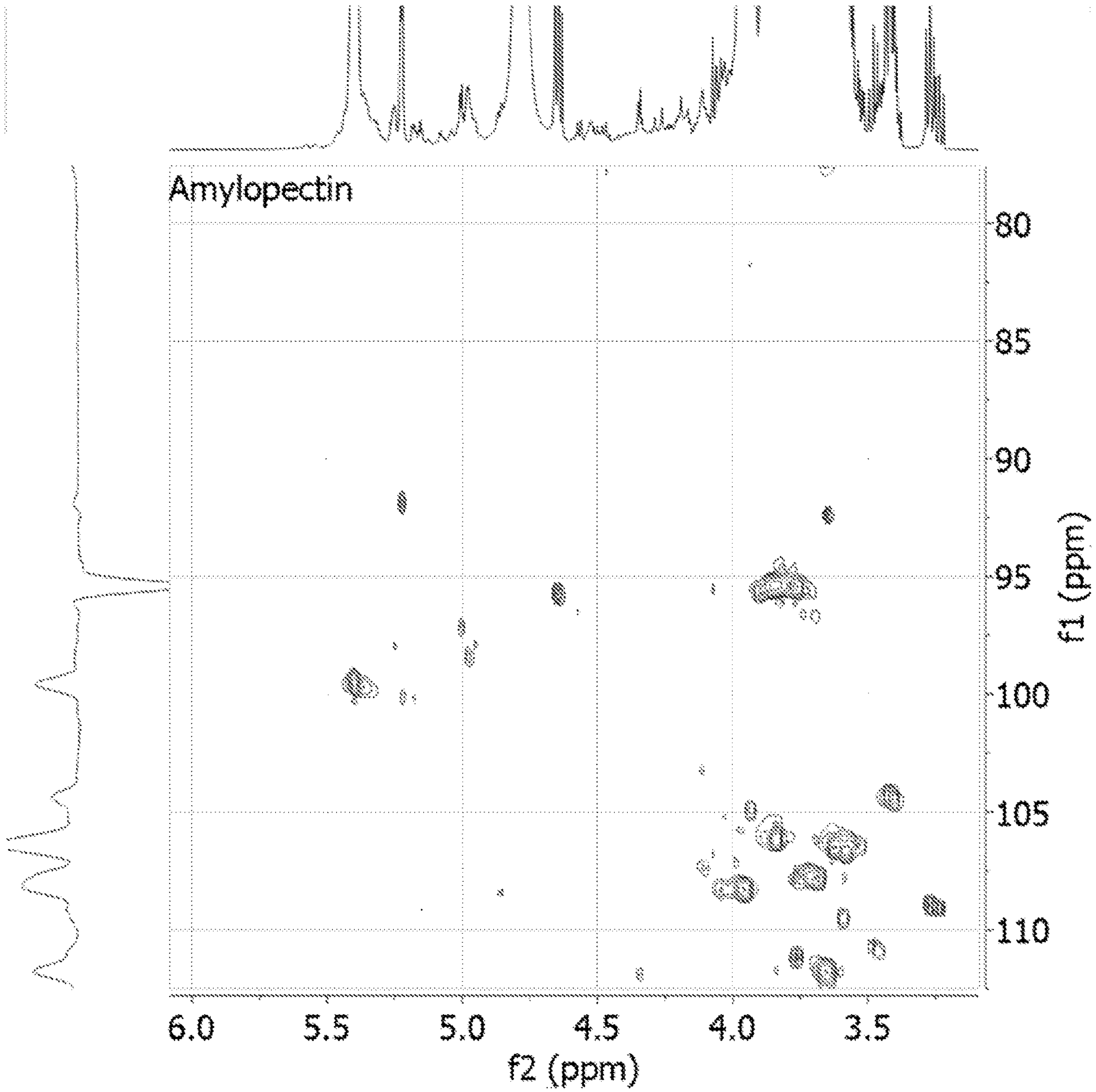
Figure 13:
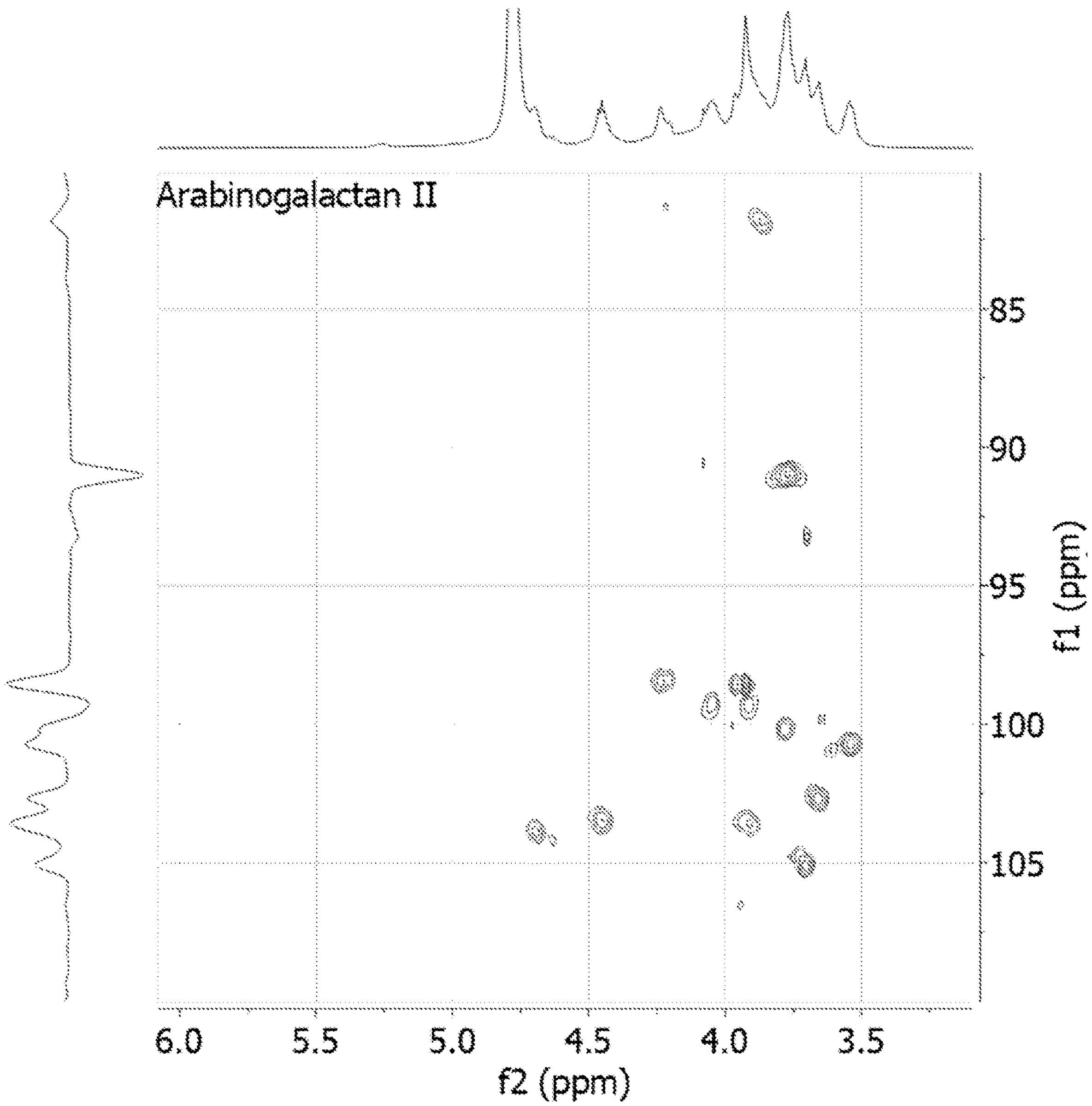
Figure 13:
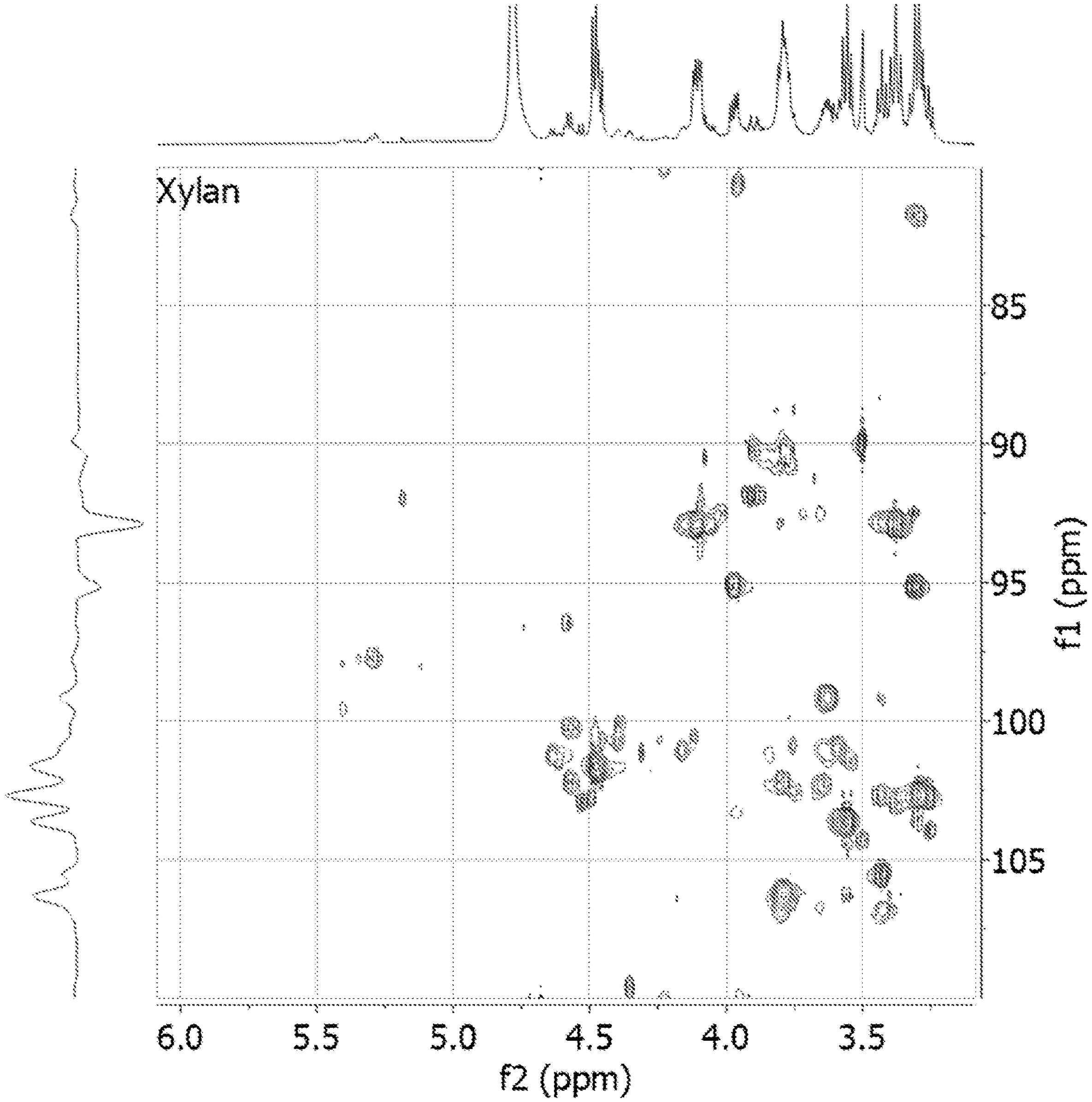

Amylopectin refers to a polysaccharide with an α-1,4 backbone with α-1,6 branches that extend in linear α-1,4 branches that may be similarly branched. The oligosaccharides we produced matched this composition very closely. The glucose composition was 98.19% (Table 3) and a glycosidic linkage composition of 17.6% terminal-glucose, 70.23% 4-linked glucose, and 3.83% 4,6-linked glucose (Table 4). 29 oligosaccharides were observed in the pool that ranged from 3 pentose to 7 pentose in length. The most abundant structures represent linear α-1,4 glucose polymers (3Hex, 4.11 min; 4Hex 9.29 min; 5Hex 12.31 min; 6Hex, 14.058; 7Hex, 15.254 min; 8Hex, 16.394; 9Hex, 18.013 min; 10Hex, 21.99 min; 11Hex, 22.911; 12Hex, 24.55 min). Other isomers were found and would represent structures with at minimum 1 α-1,6 branch. The full list of oligosaccharide peaks and abundances are found in Table 6. The oligosaccharide pool can be further distinguished by it's 1H-13C 2D-NMR (HSQC) fingerprint (FIG. 13). Prominent peaks include those described in Table 5.

TABLE 6

Oligosaccharides generated from the COG depolymerization of amylopectin. Hex refers to hexose sugars, Pent refers to pentose sugars, HexA refers to hexuronic acid sugars, and Deoxyhex refers to deoxyhexose sugars. Hexose sugars comprise solely glucose.

| Compound | Name | Mass | RT (min) | Volume (% counts) |
|---|---|---|---|---|
| 1 | 3Hex | 504.19 | 4.11 | 10.54 |
| 2 | 4Hex | 666.24 | 6.232 | 0.37 |
| 3 | 4Hex | 666.24 | 6.595 | 0.49 |
| 4 | 4Hex | 666.24 | 7.475 | 0.48 |
| 5 | 4Hex | 666.24 | 8.216 | 0.59 |
| 6 | 4Hex | 666.24 | 8.663 | 0.28 |
| 7 | 4Hex | 666.24 | 9.29 | 23.07 |
| 8 | 5Hex | 828.29 | 9.85 | 0.46 |
| 9 | 5Hex | 828.29 | 10.155 | 0.33 |
| 10 | 5Hex | 828.29 | 10.58 | 0.91 |
| 11 | 5Hex | 828.29 | 11.437 | 0.48 |
| 12 | 5Hex | 828.29 | 12.311 | 25.53 |
| 13 | 6Hex | 990.34 | 12.538 | 0.26 |
| 14 | 6Hex | 990.34 | 12.917 | 0.99 |
| 15 | 6Hex | 990.34 | 13.441 | 0.65 |
| 16 | 6Hex | 990.35 | 14.058 | 16.07 |
| 17 | 7Hex | 1152.40 | 15.254 | 9.04 |
| 18 | 8Hex | 1314.45 | 16.394 | 3.44 |
| 19 | 7Hex | 1152.40 | 16.902 | 0.11 |
| 20 | 6Hex | 990.35 | 17.064 | 0.22 |
| 21 | 9Hex | 1476.50 | 17.529 | 0.07 |
| 22 | 9Hex | 1476.50 | 18.013 | 1.38 |
| 23 | 10Hex | 1638.56 | 19.224 | 0.22 |
| 24 | 10Hex | 1638.56 | 20.3 | 1.04 |
| 25 | 12Hex | 1962.66 | 21.991 | 0.54 |
| 26 | 11Hex | 1800.61 | 22.911 | 1.21 |
| 27 | 10Hex | 1638.55 | 23.898 | 0.06 |
| 28 | 12Hex | 1962.66 | 24.551 | 1.09 |
| 29 | 12Hex | 1962.66 | 25.186 | 0.08 |

Arabinoxylan refers to a polysaccharide with β-1,4 xylose backbone with α-1,3 and α-1,2 arabinose branches in a 1 to 2 ratio. The oligosaccharides we produced matched this composition very closely. The xylose composition was 60.28% followed by 36.99% arabinose and 2.08% galactose (Table 3). With the glycosidic linkage composition being 30.55% terminal-arabinose, 31.20% 4 linked xylose, 22.22% 3,4 linked xylose and 2.65% terminal xylose (Table 4). 22 oligosaccharides were observed in the pool that ranged from 3 pentose to 7 pentose in length. The most abundant structures represent 3 pent, 8.612 min and 14.346 min; 4 pent, 20.455 min; Spent, 20.812 min and 25.947 min; 6 pent, 24.969 min; 7 pent, 27.697 min; The full list of oligosaccharide peaks and abundances are found in Table 7. The oligosaccharide pool can be further distinguished by it's 1H-13C 2D-NMR (HSQC) fingerprint (FIG. 13). Prominent peaks include those described in Table 5.

TABLE 7

Oligosaccharides generated from the COG depolymerization of Arabinoxylan. Hex refers to hexose sugars, Pent refers to pentose sugars, HexA refers to hexuronic acid sugars, and Deoxyhex refers to deoxyhexose sugars. Pentose sugars refer to arabinose and xylose.

| Compound | Name | Mass | RT (min) | Volume (% counts) |
|---|---|---|---|---|
| 1 | 3Pent | 414.15 | 5.215 | 2.15 |
| 2 | 4Pent | 546.2 | 7.539 | 2.29 |
| 3 | 3Pent | 414.15 | 8.612 | 5.60 |
| 4 | 4Pent | 546.2 | 8.925 | 5.02 |
| 5 | 3Pent | 414.15 | 11.556 | 5.01 |
| 6 | 5Pent | 678.24 | 11.806 | 3.97 |
| 7 | 3Pent | 414.15 | 14.346 | 8.99 |
| 8 | 5Pent | 678.24 | 16.229 | 4.00 |
| 9 | 4Pent | 546.19 | 16.952 | 4.99 |
| 10 | 6Pent | 810.28 | 17.177 | 2.16 |
| 11 | 5Pent | 678.24 | 19.91 | 5.20 |
| 12 | 4Pent | 546.2 | 20.455 | 5.68 |
| 13 | 5Pent | 678.24 | 20.812 | 8.23 |
| 14 | 6Pent | 810.28 | 21.326 | 2.88 |
| 15 | 3Pent | 414.15 | 21.696 | 3.32 |
| 16 | 5Pent | 678.24 | 23.691 | 3.63 |
| 17 | 6Pent | 810.28 | 24.969 | 4.62 |
| 18 | 6Pent | 810.28 | 25.26 | 3.51 |
| 19 | 7Pent | 942.32 | 25.618 | 2.90 |
| 20 | 5Pent | 678.24 | 25.947 | 6.89 |

TABLE 7-continued

Oligosaccharides generated from the COG depolymerization of Arabinoxylan. Hex refers to hexose sugars, Pent refers to pentose sugars, HexA refers to hexuronic acid sugars, and Deoxyhex refers to deoxyhexose sugars. Pentose sugars refer to arabinose and xylose.

| Compound | Name | Mass | RT (min) | Volume (% counts) |
|---|---|---|---|---|
| 21 | 6Pent | 810.28 | 26.913 | 3.30 |
| 22 | 7Pent | 942.32 | 27.697 | 5.66 |

Xyloglucan refers to a polysaccharide with β-1,4 glucose backbone with α-1,6 xylose branches. In a 1 to 2 ratio branches may be further extended via the addition of β-2,1 galactose. The oligosaccharides we produced matched this composition very closely. The glucose composition was 48.75% followed by 36.99% xylose and 14.14% galactose (Table 3). With the glycosidic linkage composition being 4-glucose, 4,6 glucose, 6 glucose, and terminal glucose at 28.23%, 20.49%, 5.63% and 4.23% respectively, with terminal-galactose being 20.62% (Table 4). In addition, further linkages were seen as terminal-xylan 10.78% and 2-xylan 5.81% (Table 4). 42 oligosaccharides were observed in the pool that ranged from 2Hex1Pent to 5Hex3Pent in length. The most abundant structures represent 2Hex1Pent, 6.596 min; 2Hex2Pent, 14.055 min; 3Hex1Pent, 12.735; 3Hex2Pent, 23.712 min and 22.6 min; 4Hex2Pent 24.966 min and 29.18 min; 4Hex3Pent 26.017. The full list of oligosaccharide peaks and abundances are found in Table 8. The oligosaccharide pool can be further distinguished by its 1H-13C 2D-NMR (HSQC) fingerprint (FIG. 13). Prominent peaks include those described in Table 5.

TABLE 8

Oligosaccharides generated from the COG depolymerization of Xyloglucan. Hex refers to hexose sugars, Pent refers to pentose sugars, HexA refers to hexuronic acid sugars, and Deoxyhex refers to deoxyhexose sugars. Hexose sugars refer to glucose and galactose. Pentose sugars refer to xylose.

| Compound | Name | Mass | RT (min) | Volume (% counts) |
|---|---|---|---|---|
| 1 | 2Hex1Pent | 474.17 | 6.596 | 8.71 |
| 2 | 2Hex1Pent | 474.17 | 7.182 | 1.54 |
| 3 | 2Hex1Pent | 474.17 | 9.915 | 6.7 |
| 4 | 2Hex2Pent | 606.22 | 10.489 | 0.41 |
| 5 | 3Hex1Pent | 636.23 | 11.569 | 2.3 |
| 6 | 3Hex1Pent | 636.23 | 12.735 | 4.64 |
| 7 | 2Hex2Pent | 606.22 | 14.055 | 8.77 |
| 8 | 3Hex2Pent | 768.27 | 16.236 | 1.77 |
| 9 | 3Hex2Pent | 768.27 | 16.913 | 7.56 |
| 10 | 3Hex1Pent | 636.23 | 17.858 | 2.32 |
| 11 | 4Hex2Pent | 930.32 | 18.582 | 2.65 |
| 12 | 3Hex1Pent | 636.23 | 19.639 | 2.6 |
| 13 | 4Hex1Pent | 798.28 | 19.976 | 2.44 |
| 14 | 3Hex1Pent | 636.23 | 21.047 | 2.57 |
| 15 | 4Hex1Pent | 798.28 | 22.29 | 1.57 |
| 16 | 3Hex2Pent | 768.27 | 22.6 | 4.71 |
| 17 | 4Hex2Pent | 930.32 | 22.74 | 1.7 |
| 18 | 3Hex2Pent | 768.27 | 23.712 | 4.79 |
| 19 | 4Hex2Pent | 930.32 | 23.905 | 1.69 |
| 20 | 3Hex2Pent | 768.27 | 24.427 | 2.85 |
| 21 | 4Hex2Pent | 930.32 | 24.564 | 3.31 |
| 22 | 4Hex2Pent | 930.32 | 24.966 | 3.86 |
| 23 | 3Hex3Pent | 900.31 | 25.675 | 1.94 |
| 24 | 4Hex3Pent | 1062.36 | 26.017 | 1.49 |
| 25 | 4Hex3Pent | 1062.36 | 26.225 | 1.2 |
| 26 | 5Hex3Pent | 1224.42 | 26.484 | 1.27 |
| 27 | 4Hex1Pent | 798.28 | 26.972 | 0.62 |
| 28 | 4Hex2Pent | 930.32 | 27.736 | 1.18 |
| 29 | 4Hex1Pent | 798.28 | 27.808 | 0.91 |
| 30 | 4Hex1Pent | 798.28 | 28.061 | 0.79 |
| 31 | 4Hex2Pent | 930.32 | 28.44 | 0.98 |
| 32 | 4Hex2Pent | 930.32 | 28.778 | 1.97 |
| 33 | 5Hex3Pent | 1224.42 | 28.91 | 0.54 |
| 34 | 4Hex2Pent | 930.32 | 29.18 | 1.24 |
| 35 | 5Hex3Pent | 1224.42 | 29.282 | 0.74 |
| 36 | 4Hex3Pent | 1062.36 | 29.365 | 0.99 |
| 37 | 4Hex3Pent | 1062.36 | 29.76 | 0.96 |
| 38 | 5Hex3Pent | 1224.42 | 30.009 | 0.89 |
| 39 | 4Hex2Pent | 930.32 | 30.836 | 0.75 |
| 40 | 4Hex3Pent | 1062.36 | 31.172 | 0.58 |
| 41 | 5Hex3Pent | 1224.42 | 31.349 | 0.47 |
| 42 | 4Hex3Pent | 1062.36 | 31.49 | 1.02 |

B-Glucan refers to a polysaccharide with a β-1,4 β-1,3 in a 4 to 1 ratio glucose backbone. The oligosaccharides we produced matched this composition very closely. The glucose composition was 97.04% (Table 3). With the glycosidic linkage composition being 4-glucose, 3 glucose, and terminal glucose at 48.91%, 30.95%, and 17.06% respectively (Table 4). 15 oligosaccharides were observed in the pool that ranged from 3 hexose to 6 hexoses in length. The most abundant structures represent 3Hex, 14.158 min; 4Hex 9.81 min and 11.27 min; 5Hex 7.33 min and 11.24 min; 6Hex, 34.032 min. The full list of oligosaccharide peaks and abundances are found in Table 9. The oligosaccharide pool can be further distinguished by its 1H-13C 2D-NMR (HSQC) fingerprint (FIG. 13). Prominent peaks include those described in Table 5.

TABLE 9

Oligosaccharides generated from the COG depolymerization of β-glucan. Hex refers to hexose sugars, Pent refers to pentose sugars, HexA refers to hexuronic acid sugars, and Deoxyhex refers to deoxyhexose sugars. Hexose sugars refer solely to glucose.

| Compound | Name | Mass | RT (min) | Volume (% counts) |
|---|---|---|---|---|
| 1 | 3Hex | 504.19 | 10.431 | 7.9 |
| 2 | 3Hex | 504.19 | 14.158 | 13.53 |
| 3 | 3Hex | 504.19 | 17.074 | 5.47 |
| 4 | 4Hex | 666.24 | 21.248 | 11.27 |
| 5 | 4Hex | 666.24 | 24.78 | 6.29 |
| 6 | 4Hex | 666.24 | 25.028 | 8.82 |
| 7 | 4Hex | 666.24 | 25.857 | 9.81 |
| 8 | 5Hex | 828.29 | 27.544 | 2.08 |
| 9 | 5Hex | 828.29 | 28.172 | 3.8 |
| 10 | 5Hex | 828.29 | 28.914 | 1.18 |
| 11 | 5Hex | 828.29 | 29.507 | 7.33 |
| 12 | 5Hex | 828.29 | 30.241 | 11.24 |
| 13 | 6Hex | 990.34 | 32.369 | 2.62 |
| 14 | 6Hex | 990.34 | 34.032 | 6.74 |
| 15 | 6Hex | 990.34 | 37.05 | 1.95 |

Galactomannan refers to a polysaccharide with a β-1,4 mannose backbone, with 22% α-1,3 galactose branching. The oligosaccharides we produced matched this composition very closely. The mannose composition being 78.14% and galactose being 18.91% (Table 3). With the glycosidic linkage composition being 4-mannose, terminal mannose and 4,6-mannose at 47.34%, 20.76%, and 6.52% respectively, with terminal-galactose being 17.85% and 2.34% 4-glucose (Table 4). 54 oligosaccharides were observed in the pool that ranged from 3 hexose to 7 hexoses in length. The most abundant structures represent 3Hex, 1.489 min; 4Hex 4.109 min and 5.122 min; 4Hex1HexA, 10.301 min; 4Hex1Pent, 9.614 min 5Hex 7.65 min; 6Hex, 11.077 min; 7Hex, 13.245 min. The full list of oligosaccharide peaks and abundances are found in Table 10. The oligosaccharide pool can be further distinguished by its 1H-13C 2D-NMR (HSQC) fingerprint (FIG. 13). Prominent peaks include those described in Table 5.

TABLE 10

Oligosaccharides generated from the COG depolymerization of Galactomannan. Hex refers to hexose sugars, Pent refers to pentose sugars, HexA refers to hexuronic acid sugars, and Deoxyhex refers to deoxyhexose sugars. Hexoses refer to galactose and mannose.

| Compound | Name | Mass | RT (min) | Volume (% counts) |
|---|---|---|---|---|
| 1 | 3Hex | 504.19 | 1.489 | 2.72 |
| 2 | 3Hex | 504.19 | 1.845 | 1.04 |
| 3 | 3Hex | 504.19 | 2.978 | 1.54 |
| 4 | 4Hex | 666.24 | 4.109 | 12.41 |
| 5 | 4Hex | 666.24 | 4.802 | 4.74 |
| 6 | 4Hex | 666.24 | 5.122 | 5.89 |
| 7 | 4Hex | 666.24 | 5.502 | 6.4 |
| 8 | 3Hex1Pent | 636.23 | 6.404 | 1.79 |
| 9 | 3Hex1Pent | 636.23 | 6.968 | 1.16 |
| 10 | 4Hex | 666.24 | 7.239 | 3.54 |
| 11 | 5Hex | 828.29 | 7.65 | 7.46 |
| 12 | 5Hex | 828.29 | 7.896 | 3.61 |
| 13 | 3Hex1Pent | 636.23 | 8.198 | 0.38 |

TABLE 10-continued

Oligosaccharides generated from the COG depolymerization of Galactomannan. Hex refers to hexose sugars, Pent refers to pentose sugars, HexA refers to hexuronic acid sugars, and Deoxyhex refers to deoxyhexose sugars. Hexoses refer to galactose and mannose.

| Compound | Name | Mass | RT (min) | Volume (% counts) |
|---|---|---|---|---|
| 14 | 5Hex | 828.29 | 8.52 | 2.77 |
| 15 | 3Hex1Pent | 636.23 | 8.566 | 0.55 |
| 16 | 5Hex | 828.29 | 9.013 | 3.16 |
| 17 | 4Hex1HexA | 842.27 | 9.515 | 0.39 |
| 18 | 4Hex1Pent | 798.28 | 9.614 | 1.3 |
| 19 | 5Hex | 828.29 | 9.737 | 2.53 |
| 20 | 5Hex | 828.29 | 9.999 | 4.5 |
| 21 | 4Hex1HexA | 842.27 | 10.301 | 1.26 |
| 22 | 4Hex1Deoxyhex | 812.26 | 10.495 | 0.58 |
| 23 | 3Hex2Pent | 768.27 | 10.827 | 0.28 |
| 24 | 4Hex1Pent | 798.28 | 10.996 | 0.83 |
| 25 | 4Hex1HexA | 842.27 | 11.02 | 0.71 |
| 26 | 6Hex | 990.34 | 11.077 | 3.58 |
| 27 | 6Hex | 990.34 | 11.342 | 1.11 |
| 28 | 5Hex | 828.29 | 11.477 | 0.62 |
| 29 | 4Hex1Pent | 798.28 | 11.525 | 0.31 |
| 30 | 6Hex | 990.34 | 11.581 | 1.58 |
| 31 | 4Hex1HexA | 842.27 | 11.725 | 0.52 |
| 32 | 6Hex | 990.34 | 11.96 | 1.27 |
| 33 | 6Hex | 990.34 | 12.288 | 1.28 |
| 34 | 4Hex1HexA | 842.27 | 12.33 | 0.98 |
| 35 | 3Hex2Pent | 768.27 | 12.342 | 0.23 |
| 36 | 6Hex | 990.34 | 12.746 | 0.79 |
| 37 | 5Hex | 828.29 | 13.038 | 3.41 |
| 38 | 7Hex | 1152.4 | 13.245 | 1.35 |
| 39 | 3Hex2Pent | 768.27 | 13.372 | 0.43 |
| 40 | 6Hex | 990.34 | 13.842 | 1.74 |
| 41 | 7Hex | 1152.4 | 14.057 | 0.86 |
| 42 | 4Hex1Pent | 798.28 | 14.191 | 0.44 |
| 43 | 7Hex | 1152.39 | 14.302 | 0.48 |
| 44 | 6Hex | 990.34 | 14.332 | 2.32 |
| 45 | 7Hex | 1152.39 | 14.551 | 0.39 |
| 46 | 4Hex1Deoxyhex | 812.26 | 14.627 | 0.42 |
| 47 | 4Hex1HexA | 842.27 | 14.866 | 0.43 |
| 48 | 6Hex | 990.34 | 15.227 | 1.21 |
| 49 | 7Hex | 1152.4 | 15.271 | 0.49 |
| 50 | 7Hex | 1152.39 | 15.516 | 0.31 |
| 51 | 7Hex | 1152.4 | 16.316 | 0.79 |
| 52 | 4Hex1HexA | 842.27 | 16.706 | 0.33 |
| 53 | 6Hex | 990.34 | 17.443 | 0.31 |
| 54 | 7Hex | 1152.39 | 17.823 | 0.51 |

Arabinogalactan ii refers to a polysaccharide with a β-1,3 galactose backbone, extensive branching comprising of α-1,6 arabinose, β-1,6 galactose-β-1,6 galactose, β-1,6 galactose-α-1,4 arabinose and β-1,4 galactose-β-1,6 galactose. The oligosaccharides we produced matched this composition very closely. The galactose composition being 87.28% and arabinose being 7.23% (Table 3). With the glycosidic linkage composition being terminal galactose, 1,3 galactose, 1,3,6 galactose and 6 galactose at 50.75%, 17.33%, 14.18%, and 11.83% respectively, with terminal arabinose being 3.28% (Table 4). 62 oligosaccharides were observed in the pool that ranged from 3 hexose to 6 hexoses in length. The most abundant structures represent 3Hex, 2.53 min and 5.552 min; 4Hex 3.534 min and 8.843 min; 5Hex 10.555 min and 11.7 min; 6Hex, 12.269. The full list of oligosaccharide peaks and abundances are found in Table 11. The oligosaccharide pool can be further distinguished by its 1H-13C 2D-NMR (HSQC) fingerprint (FIG. 13). Prominent peaks include those described in Table 5.

TABLE 11

Oligosaccharides generated from the COG depolymerization of Arabinogalactan II. Hex refers to hexose sugars, Pent refers to pentose sugars, HexA refers to hexuronic acid sugars, and Deoxyhex refers to deoxyhexose sugars. Pentoses refer to arabinose and hexoses refer to galactose.

| Compound | Name | Mass | RT (min) | Volume (% counts) |
|---|---|---|---|---|
| 1 | 2Hex | 342.13 | 1.233 | 0.58 |
| 2 | 2Hex | 342.13 | 1.43 | 1.79 |
| 3 | 3Hex | 504.19 | 1.679 | 1.59 |
| 4 | 2Hex1Pent | 474.18 | 2.505 | 0.47 |
| 5 | 3Hex | 504.19 | 2.53 | 3.99 |
| 6 | 3Hex | 504.19 | 2.732 | 1.91 |

TABLE 11-continued

Oligosaccharides generated from the COG depolymerization of Arabinogalactan II. Hex refers to hexose sugars, Pent refers to pentose sugars, HexA refers to hexuronic acid sugars, and Deoxyhex refers to deoxyhexose sugars. Pentoses refer to arabinose and hexoses refer to galactose.

| Compound | Name | Mass | RT (min) | Volume (% counts) |
|---|---|---|---|---|
| 7 | 2Hex1Pent | 474.18 | 3.087 | 0.77 |
| 8 | 2Hex2Pent | 606.22 | 3.233 | 0.29 |
| 9 | 4Hex | 666.24 | 3.534 | 6.47 |
| 10 | 4Hex | 666.24 | 4.2 | 5.10 |
| 11 | 2Hex2Pent | 606.22 | 4.847 | 0.75 |
| 12 | 4Hex | 666.24 | 5.381 | 4.02 |
| 13 | 2Hex1Pent | 474.18 | 5.487 | 0.38 |
| 14 | 3Hex | 504.19 | 5.552 | 4.44 |
| 15 | 2Hex1Pent | 474.18 | 5.912 | 0.19 |
| 16 | 5Hex | 828.29 | 6.433 | 2.57 |
| 17 | 2Hex1Pent | 474.18 | 6.635 | 0.18 |
| 18 | 4Hex | 666.24 | 6.643 | 5.20 |
| 19 | 3Hex1Pent | 636.23 | 6.836 | 0.85 |
| 20 | 5Hex | 828.29 | 6.983 | 2.91 |
| 21 | 2Hex2Pent | 606.22 | 7.968 | 0.27 |
| 22 | 3Hex1Pent | 636.23 | 8.019 | 0.25 |
| 23 | 3Hex2Pent | 768.27 | 8.577 | 0.20 |
| 24 | 6Hex | 990.34 | 8.723 | 0.94 |
| 25 | 4Hex | 666.24 | 8.843 | 7.15 |
| 26 | 5Hex | 828.29 | 9.107 | 2.45 |
| 27 | 2Hex1Pent | 474.18 | 9.208 | 0.61 |
| 28 | 2Hex1Pent | 474.18 | 9.452 | 0.28 |
| 29 | 3Hex1Pent | 636.23 | 9.729 | 0.23 |
| 30 | 3Hex1Pent | 636.23 | 9.949 | 0.63 |
| 31 | 4Hex | 666.24 | 9.955 | 2.70 |
| 32 | 5Hex | 828.29 | 10.555 | 4.78 |
| 33 | 5Hex | 828.29 | 11.023 | 2.10 |
| 34 | 4Hex | 666.24 | 11.036 | 0.91 |
| 35 | 6Hex | 990.34 | 11.052 | 0.76 |
| 36 | 3Hex1Pent | 636.23 | 11.439 | 1.27 |
| 37 | 5Hex | 828.29 | 11.7 | 5.43 |
| 38 | 6Hex | 990.35 | 11.731 | 1.68 |
| 39 | 6Hex | 990.34 | 11.938 | 1.53 |
| 40 | 4Hex1Pent | 798.28 | 12.257 | 0.21 |
| 41 | 6Hex | 990.34 | 12.269 | 2.86 |
| 42 | 3Hex3Pent | 900.31 | 12.393 | 0.29 |
| 43 | 4Hex1Pent | 798.28 | 12.449 | 0.23 |
| 44 | 4Hex1Pent | 798.28 | 12.783 | 0.63 |
| 45 | 7Hex | 1152.4 | 12.943 | 0.51 |
| 46 | 7Hex | 1152.39 | 13.193 | 0.47 |
| 47 | 7Hex | 1152.39 | 13.639 | 0.53 |
| 48 | 5Hex | 828.29 | 14.088 | 0.77 |
| 49 | 6Hex | 990.34 | 14.213 | 0.73 |
| 50 | 4Hex1Pent | 798.28 | 14.336 | 0.50 |
| 51 | 6Hex | 990.35 | 14.432 | 0.24 |
| 52 | 4Hex | 666.24 | 14.586 | 1.15 |
| 53 | 5Hex | 828.29 | 15.047 | 3.80 |
| 54 | 6Hex | 990.35 | 15.11 | 1.94 |
| 55 | 7Hex | 1152.4 | 16.038 | 0.26 |
| 56 | 6Hex | 990.34 | 16.676 | 1.33 |
| 57 | 7Hex | 1152.4 | 16.731 | 0.50 |
| 58 | 6Hex | 990.35 | 17.193 | 0.92 |
| 59 | 7Hex | 1152.4 | 17.67 | 1.40 |
| 60 | 6Hex | 990.34 | 17.84 | 0.56 |
| 61 | 4Hex1Pent | 798.28 | 18.353 | 0.52 |
| 62 | 6Hex | 990.34 | 21.269 | 1.03 |

Curdlan refers to a polysaccharide with a β-1,3 glucose backbone. The oligosaccharides we produced matched this composition very closely. The glucose composition being 99.04% (Table 3). With the glycosidic linkage composition being 1,3 glucose at 74.84% and 8.82% being terminal glucose (Table 4). 10 oligosaccharides were observed in the pool that ranged from 2 hexose to 6 hexoses in length. The most abundant structures represent 2Hex, 1.456 min, 3Hex, 1.456 min; 2Hex1Pent, 12.672 min; 4Hex 24.35 min; 5Hex 30.063 min; 6Hex, 36.833. The full list of oligosaccharide peaks and abundances are found in Table 12. The oligosaccharide pool can be further distinguished by its 1H-13C 2D-NMR (HSQC) fingerprint (FIG. 13). Prominent peaks include those described in Table 5.

TABLE 12

| Oligosaccharides generated from the COG depolymerization of Curdlan. Hex refers to hexose sugars, Pent refers to pentose sugars, HexA refers to hexuronic acid sugars, and Deoxyhex refers to deoxyhexose sugars. Hexoses refer to glucose. | | | | |
|---|---|---|---|---|
| Compound | Name | Mass | RT (min) | Volume (% counts) |
| 1 | 2Hex | 342.13 | 1.456 | 3.34 |
| 2 | 1Hex1Pent | 312.12 | 1.663 | 0.75 |
| 3 | 3Hex | 504.18 | 7.423 | 0.85 |
| 4 | 3Hex | 504.19 | 11.902 | 38.62 |
| 5 | 2Hex1Pent | 474.17 | 12.672 | 4.45 |
| 6 | 2Hex1Pent | 474.17 | 13.644 | 1.57 |
| 7 | 4Hex | 666.24 | 24.35 | 20.24 |
| 8 | 3Hex1Pent | 636.23 | 24.761 | 0.98 |
| 9 | 5Hex | 828.29 | 30.063 | 18.87 |
| 10 | 6Hex | 990.34 | 36.833 | 10.32 |

Lichenan refers to a polysaccharide with a β-1,4 glucose backbone with alternating β-1,3 glucose 33% of the time. The oligosaccharides we produced matched this composition very closely. The glucose composition being 80.21%, with galactose and mannose both being 8.64% (Table 3). With the glycosidic linkage composition being 4-mannose, 4,6-mannose and terminal mannose at 67.02%, 8.95%, and 6.82% respectively, with terminal-galactose being 19.58% (Table 4). 42 oligosaccharides were observed in the pool that ranged from 3 hexose to 8 hexoses in length. The most abundant structures represent 3Hex1Pent, 7.59 min; 4Hex 17.74 min; 4Hex1Pent, 6.96 min; 5Hex 15.88 min; 5Hex1HexA, 12.747 min, 6Hex, 10.877 min; 7Hex, 13.039 min. The full list of oligosaccharide peaks and abundances are found in Table 13. The oligosaccharide pool can be further distinguished by its 1H-13C 2D-NMR (HSQC) fingerprint (FIG. 13). Prominent peaks include those described in Table 5.

TABLE 13

| Oligosaccharides generated from the COG depolymerization of Lichenan. Hex refers to hexose sugars, Pent refers to pentose sugars, HexA refers to hexuronic acid sugars, and Deoxyhex refers to deoxyhexose sugars. Hexoses refer to glucose. | | | | |
|---|---|---|---|---|
| Compound | Name | Mass | RT (min) | Volume (% counts) |
| 1 | 3Hex | 504.19 | 1.488 | 0.99 |
| 2 | 2Hex1Pent | 474.18 | 2.211 | 0.62 |
| 3 | 2Hex | 342.13 | 2.925 | 0.46 |
| 4 | 1Hex2Pent | 444.17 | 2.988 | 0.50 |
| 5 | 4Hex | 666.24 | 4.016 | 17.74 |
| 6 | 4Hex | 666.24 | 4.726 | 0.99 |
| 7 | 4Hex | 666.24 | 5.06 | 0.58 |
| 8 | 4Hex | 666.24 | 5.439 | 0.93 |
| 9 | 3Hex1Deoxyhex | 650.24 | 5.754 | 0.30 |
| 10 | 3Hex1HexA | 680.22 | 5.977 | 1.65 |
| 11 | 3Hex1Pent | 636.23 | 6.275 | 7.59 |
| 12 | 3Hex | 504.18 | 6.593 | 0.81 |
| 13 | 3Hex1Pent | 636.23 | 6.83 | 1.29 |
| 14 | 5Hex | 828.29 | 7.567 | 15.88 |
| 15 | 3Hex1Pent | 636.23 | 8.396 | 0.29 |
| 16 | 2Hex2Pent | 606.22 | 8.398 | 2.08 |
| 17 | 5Hex | 828.29 | 8.882 | 0.70 |
| 18 | 5Hex | 828.29 | 9.089 | 0.61 |
| 19 | 4Hex | 666.24 | 9.279 | 0.88 |
| 20 | 4Hex1Pent | 798.28 | 9.459 | 6.96 |
| 21 | 5Hex | 828.29 | 9.783 | 1.38 |
| 22 | 4Hex1HexA | 842.27 | 9.907 | 4.28 |
| 23 | 4Hex | 666.24 | 10.087 | 0.35 |
| 24 | 4Hex1Deoxyhex | 812.26 | 10.22 | 0.78 |
| 25 | 4Hex1HexA | 842.27 | 10.504 | 0.59 |
| 26 | 3Hex2Pent | 768.27 | 10.68 | 1.43 |
| 27 | 6Hex | 990.35 | 10.877 | 8.71 |
| 28 | 6Hex | 990.35 | 11.152 | 0.34 |
| 29 | 6Hex | 990.34 | 11.405 | 0.55 |
| 30 | 6Hex | 990.35 | 11.76 | 0.64 |
| 31 | 5Hex1Pent | 960.34 | 12.139 | 2.06 |
| 32 | 5Hex1HexA | 1004.33 | 12.747 | 4.44 |
| 33 | 7Hex | 1152.4 | 13.039 | 4.18 |
| 34 | 5Hex1HexA | 1004.32 | 13.358 | 0.79 |
| 35 | 5Hex1Deoxyhex | 974.31 | 13.623 | 0.88 |
| 36 | 6Hex | 990.34 | 14.094 | 0.59 |
| 37 | 6Hex1Pent | 1122.39 | 14.439 | 0.96 |
| 38 | 8Hex | 1314.45 | 14.906 | 0.98 |
| 39 | 6Hex1HexA | 1166.38 | 15.181 | 1.68 |

TABLE 13-continued

Oligosaccharides generated from the COG depolymerization of Lichenan. Hex refers to hexose sugars, Pent refers to pentose sugars, HexA refers to hexuronic acid sugars, and Deoxyhex refers to deoxyhexose sugars. Hexoses refer to glucose.

| Compound | Name | Mass | RT (min) | Volume (% counts) |
|---|---|---|---|---|
| 40 | 4Hex | 666.24 | 16.429 | 1.54 |
| 41 | 5Hex | 828.29 | 17.217 | 0.47 |
| 42 | 5Hex | 828.29 | 18.075 | 0.52 |

Mannan refers to a polysaccharide with a β-1,4 mannose backbone. The oligosaccharides we produced matched this composition very closely. The mannose composition being 83.8%, followed by galactose, glucose, and arabinose at 7.61%, 4.48% and 2.99% respectively (Table 3). With the glycosidic linkage composition being 4-mannose, and terminal mannose 58.31%, and 34.6% respectively, with terminal-galactose being 3.63% (Table 4). 46 oligosaccharides were observed in the pool that ranged from 1 hexose and 1 pentose to 5 hexoses and 2 pentoses in length. The most abundant structures represent 2Hex1Pent, 6.624 min and 9.655 min; 2Hex1Pent, 13.77 min; 3Hex1Pent 12.727 min; 3Hex2Pent 16.706 min and 23.412 min; 4Hex1pent, 19.731 min; 4Hex2pent, 24.422 min. The full list of oligosaccharide peaks and abundances are found in Table 14. The full list of oligosaccharides can be further distinguished by its 1H-13C 2D-NMR (HSQC) fingerprint (FIG. 13). Prominent peaks include those described in Table 5.

TABLE 14

Oligosaccharides generated from the COG depolymerization of Mannan. Hex refers to hexose sugars, Pent refers to pentose sugars, HexA refers to hexuronic acid sugars, and Deoxyhex refers to deoxyhexose sugars. Hexoses refer to mannose.

| Compound | Name | Mass | RT (min) | Volume (% counts) |
|---|---|---|---|---|
| 1 | 1Hex1Pent | 312.12 | 1.583 | 1.24 |
| 2 | 2Hex1Pent | 474.18 | 6.624 | 6.54 |
| 3 | 2Hex1Pent | 474.18 | 6.954 | 1.33 |
| 4 | 1Hex2Pent | 444.17 | 7.463 | 1.10 |
| 5 | 1Hex2Pent | 444.16 | 7.984 | 0.37 |
| 6 | 2Hex1Pent | 474.18 | 9.655 | 7.95 |
| 7 | 2Hex2Pent | 606.22 | 10.576 | 0.66 |
| 8 | 3Hex1Pent | 636.23 | 11.423 | 2.81 |
| 9 | 2Hex1Pent | 474.18 | 12.409 | 0.24 |
| 10 | 3Hex1Pent | 636.23 | 12.727 | 5.63 |
| 11 | 2Hex2Pent | 606.22 | 13.77 | 8.45 |
| 12 | 3Hex | 504.19 | 13.847 | 1.40 |
| 13 | 2Hex2Pent | 606.22 | 16.102 | 0.47 |
| 14 | 3Hex2Pent | 768.27 | 16.706 | 8.36 |
| 15 | 3Hex1Pent | 636.23 | 17.531 | 3.44 |
| 16 | 2Hex2Pent | 606.22 | 18.235 | 0.51 |
| 17 | 4Hex2Pent | 930.32 | 18.491 | 3.19 |
| 18 | 2Hex2Pent | 606.22 | 19.122 | 0.74 |
| 19 | 3Hex1Pent | 636.23 | 19.328 | 3.95 |
| 20 | 4Hex1Pent | 798.28 | 19.731 | 3.68 |
| 21 | 3Hex1Pent | 636.23 | 20.683 | 4.59 |
| 22 | 4Hex1Pent | 798.29 | 21.95 | 3.25 |
| 23 | 3Hex2Pent | 768.27 | 22.303 | 3.01 |
| 24 | 4Hex2Pent | 930.32 | 22.608 | 0.87 |
| 25 | 3Hex2Pent | 768.27 | 23.412 | 5.81 |
| 26 | 5Hex2Pent | 1092.38 | 24.1 | 0.88 |
| 27 | 4Hex2Pent | 930.32 | 24.422 | 3.83 |
| 28 | 4Hex2Pent | 930.32 | 24.785 | 2.53 |
| 29 | 3Hex2Pent | 768.27 | 24.786 | 0.26 |
| 30 | 5Hex2Pent | 1092.38 | 25.241 | 0.64 |
| 31 | 3Hex2Pent | 768.27 | 25.534 | 0.48 |
| 32 | 4Hex1Pent | 798.28 | 25.871 | 1.14 |
| 33 | 5Hex1Pent | 960.34 | 26.217 | 0.49 |
| 34 | 5Hex1Pent | 960.33 | 26.435 | 0.23 |
| 35 | 4Hex1Pent | 798.28 | 26.802 | 0.73 |
| 36 | 3Hex1HexA | 680.22 | 27.032 | 0.84 |
| 37 | 4Hex2Pent | 930.32 | 27.594 | 0.72 |
| 38 | 5Hex2Pent | 1092.38 | 27.782 | 0.26 |

TABLE 14-continued

Oligosaccharides generated from the COG depolymerization of Mannan. Hex refers to hexose sugars, Pent refers to pentose sugars, HexA refers to hexuronic acid sugars, and Deoxyhex refers to deoxyhexose sugars. Hexoses refer to mannose.

| Compound | Name | Mass | RT (min) | Volume (% counts) |
|---|---|---|---|---|
| 39 | 4Hex1Deoxyhex | 812.26 | 28.218 | 0.82 |
| 40 | 5Hex2Pent | 1092.38 | 28.33 | 0.68 |
| 41 | 4Hex2Pent | 930.32 | 28.643 | 1.53 |
| 42 | 5Hex2Pent | 1092.38 | 29.139 | 0.74 |
| 43 | 4Hex1Deoxyhex | 812.26 | 29.164 | 1.19 |
| 44 | 3Hex1HexA | 680.22 | 29.171 | 0.69 |
| 45 | 4Hex1Deoxyhex | 812.26 | 30.672 | 1.25 |
| 46 | 4Hex2Pent | 930.32 | 30.759 | 0.47 |

Xylan refers to a polysaccharide with a β-1,4 xylose backbone with a 13% α-1,2 Glucose-4-OMe. The oligosaccharides we produced matched this composition very closely. The xylose composition being 85.48%, followed by glucose, mannose and galactose at 5.36%, 4.9% and 2.04% respectively (Table 3). With the glycosidic linkage composition being 1,4 xylose at 54.71%, 1,4 mannose at 15.28%, 1,4 glucose at 13.61%, terminal xylose at 7.18% and terminal glucose at 5.19% (Table 4). 15 oligosaccharides were observed in the pool that ranged from 2 pentose to 6 hexoses and 1 pentose in length. The most abundant structures represent 3Pent, 8.429 min; 4Pent, 16.521 min; 4Pent1HexAoMe, 21.15 min; 5Pent, 23.199; 6Pent, 26.735; 6Hex1Pent, 18.422 min. The full list of oligosaccharide peaks and abundances are found in Table 15. The oligosaccharide pool can be further distinguished by it's 1H-13C 2D-NMR (HSQC) fingerprint (FIG. 13). Prominent peaks include those described in Table 5.

TABLE 15

Oligosaccharides generated from the COG depolymerization of xylan. Hex refers to hexose sugars, Pent refers to pentose sugars, HexA refers to hexuronic acid sugars, and Deoxyhex refers to deoxyhexose sugars. Pentoses refer to xylose. 1HexAOMe refer to methylated glucuronic acid.

| Compound | Name | Mass | RT (min) | Volume (% counts) |
|---|---|---|---|---|
| 1 | 2Pent | 282.11 | 6.692 | 1.60 |
| 2 | 5Hex2Pent | 1092.42 | 8.109 | 1.07 |
| 3 | 3Pent | 414.16 | 8.429 | 14.82 |
| 4 | 5Pent | 678.24 | 8.432 | 1.07 |
| 5 | 4Pent | 546.2 | 16.521 | 18.68 |
| 6 | 3Pent1HexAOMe | 604.2 | 18.034 | 2.79 |
| 7 | 6Hex1Pent | 1122.35 | 18.442 | 7.75 |
| 8 | 4Pent1HexAOMe | 736.24 | 20.205 | 2.61 |
| 9 | 4Pent1HexAOMe | 736.24 | 21.15 | 6.91 |
| 10 | 5Pent | 678.24 | 23.199 | 19.00 |
| 11 | 4Pent1HexAOMe | 736.24 | 23.844 | 4.67 |
| 12 | 4Pent1HexAOMe | 736.24 | 25.394 | 2.61 |
| 13 | 4Pent1HexAOMe | 736.24 | 26.435 | 2.91 |
| 14 | 6Pent | 810.28 | 26.735 | 9.99 |
| 15 | 7Pent | 942.32 | 28.974 | 3.51 |

Galatian refers to a polysaccharide with a β-1,4 galactan backbone. The oligosaccharides we produced matched this composition very closely. The galactan composition being 80.06%, followed by Arabinose, Rhamnose and Galacturonic acid at 9.28%, 4.59% and 3.04% respectively (Table 3). With the glycosidic linkage composition being 4 galactose, and terminal galactose at 61.68%, and 33.73% respectively, and terminal-arabinose being 2.02% (Table 4). 17 oligosaccharides were observed in the pool that ranged from 3 hexose to 6 hexoses and a hexuronic acid in length. The most abundant structures represent 3Hex, 2.69 min; 2Hex1Pent, 3.038 min; 4Hex 6.614 min; 3Hex1Pent, 7.292; 3Hex1hexA, 8.937 min; 5Hex 9.652 min; 4Hex1Pent, 10.112 min, 6Hex, 11.525 min, 4Hex1HexA, 11.857 min; 5Hex1HexA, 13.573 min. The full list of oligosaccharide peaks and abundances are found in Table 16. The oligosaccharide pool can be further distinguished by it's 1H-13C 2D-NMR (HSQC) fingerprint (FIG. 13). Prominent peaks include those described in Table 5.

TABLE 16

Oligosaccharides generated from the COG depolymerization of galactan. Hex refers to hexose sugars, Pent refers to pentose sugars, HexA refers to hexuronic acid sugars, and Deoxyhex refers to deoxyhexose sugars. Hexose refers to galactose.

| Compound | Name | Mass | RT (min) | Volume (% counts) |
|---|---|---|---|---|
| 1 | 2Hex1Pent | 474.18 | 2.658 | 0.59 |
| 2 | 3Hex | 504.19 | 2.69 | 6.74 |
| 3 | 2Hex1Pent | 474.17 | 3.038 | 5.45 |
| 4 | 3Hex1Pent | 636.23 | 6.014 | 0.60 |
| 5 | 4Hex | 666.24 | 6.614 | 15.53 |
| 6 | 3Hex1Pent | 636.23 | 7.292 | 10.79 |
| 7 | 3Hex1HexA | 680.22 | 8.937 | 9.12 |
| 8 | 4Hex1Pent | 798.28 | 9.508 | 0.62 |
| 9 | 5Hex | 828.29 | 9.652 | 9.27 |
| 10 | 4Hex1Pent | 798.28 | 10.112 | 7.58 |
| 11 | 6Hex | 990.34 | 11.515 | 4.50 |
| 12 | 4Hex1HexA | 842.27 | 11.857 | 11.47 |
| 13 | 7Hex | 1152.39 | 12.782 | 1.15 |
| 14 | 4Hex1Deoxyhex | 812.26 | 13.126 | 3.46 |
| 15 | 5Hex1HexA | 1004.32 | 13.573 | 7.20 |
| 16 | 6Hex1HexA | 1166.37 | 14.673 | 3.11 |
| 17 | 5Hex1Deoxyhex | 974.31 | 14.753 | 2.85 |

Glucomannan refers to a polysaccharide with a 60% β-1,4 mannose and 40% β-1,4 glucose backbone. The oligosaccharides we produced matched this composition very closely. The mannose composition being 60.45%, followed by glucose at 36.73% (Table 3). With the glycosidic linkage composition being 4 mannose, and terminal mannose at 47.58%, and 20.23% respectively, and 31.52% being 4-glucose (Table 4). 87 oligosaccharides were observed in the pool that ranged from 3 hexose to 8 hexoses in length. The most abundant structures represent 3Hex, 6.695 min; 3Hex1Pent, 18.947 min; 4Hex 16.802 min and 17.38 min; 4Hex1Pent, 20.328 min; 5Hex 18.549 min and 25.896 min; 6Hex, 22.854 min; 7Hex, 24.537 min. The full list of oligosaccharide peaks and abundances are found in Table 17.

TABLE 17

Oligosaccharides generated from the COG depolymerization of Glucomannan. Hex refers to hexose sugars, Pent refers to pentose sugars, HexA refers to hexuronic acid sugars, and Deoxyhex refers to deoxyhexose sugars. Hexoses refer to glucose and mannose.

| Compound | Name | Mass | RT (min) | Volume (% counts) |
|---|---|---|---|---|
| 1 | 3Hex | 504.18 | 1.491 | 0.84 |
| 2 | 3Hex | 504.18 | 2.193 | 0.35 |
| 3 | 2Hex1Pent | 474.17 | 2.263 | 0.17 |
| 4 | 4Hex | 666.24 | 4.124 | 2.33 |
| 5 | 4Hex | 666.24 | 6.206 | 2.04 |
| 6 | 3Hex1Pent | 636.23 | 6.413 | 0.92 |
| 7 | 3Hex | 504.19 | 6.695 | 4.31 |
| 8 | 3Hex | 504.19 | 7.637 | 2.06 |
| 9 | 5Hex | 828.29 | 7.648 | 1.05 |
| 10 | 3Hex | 504.18 | 8.885 | 1.94 |
| 11 | 2Hex1Pent | 474.17 | 9.187 | 0.88 |
| 12 | 5Hex | 828.29 | 9.213 | 1.28 |
| 13 | 4Hex | 666.24 | 9.373 | 2.99 |
| 14 | 4Hex1Pent | 798.28 | 9.604 | 0.45 |
| 15 | 3Hex | 504.19 | 9.605 | 1.74 |
| 16 | 4Hex | 666.24 | 10.25 | 2.66 |
| 17 | 2Hex1Pent | 474.17 | 10.653 | 0.54 |
| 18 | 4Hex | 666.24 | 10.97 | 3.94 |
| 19 | 6Hex | 990.34 | 11.067 | 0.31 |
| 20 | 6Hex | 990.34 | 11.999 | 0.4 |
| 21 | 3Hex1Pent | 636.23 | 12.074 | 1.13 |
| 22 | 5Hex | 828.29 | 12.21 | 0.37 |
| 23 | 2Hex1Pent | 474.17 | 12.713 | 0.37 |
| 24 | 3Hex | 504.19 | 12.868 | 1.45 |
| 25 | 3Hex1Pent | 636.23 | 13.068 | 0.77 |
| 26 | 3Hex | 504.18 | 14.159 | 0.4 |
| 27 | 5Hex | 828.29 | 14.335 | 1.28 |
| 28 | 5Hex | 828.29 | 14.932 | 0.75 |
| 29 | 4Hex | 666.24 | 14.977 | 1.75 |
| 30 | 4Hex1Pent | 798.28 | 15.28 | 0.48 |
| 31 | 6Hex | 990.34 | 15.579 | 0.48 |
| 32 | 5Hex | 828.29 | 16.24 | 2.01 |
| 33 | 4Hex | 666.24 | 16.802 | 4.87 |

TABLE 17-continued

Oligosaccharides generated from the COG depolymerization of Glucomannan. Hex refers to hexose sugars, Pent refers to pentose sugars, HexA refers to hexuronic acid sugars, and Deoxyhex refers to deoxyhexose sugars. Hexoses refer to glucose and mannose.

| Compound | Name | Mass | RT (min) | Volume (% counts) |
|---|---|---|---|---|
| 34 | 4Hex1Pent | 798.28 | 17.219 | 0.45 |
| 35 | 6Hex | 990.34 | 17.343 | 0.5 |
| 36 | 4Hex | 666.24 | 17.38 | 5.13 |
| 37 | 5Hex | 828.29 | 17.527 | 1.3 |
| 38 | 7Hex | 1152.39 | 17.924 | 0.18 |
| 39 | 5Hex | 828.29 | 18.549 | 5.98 |
| 40 | 4Hex1Pent | 798.28 | 18.793 | 0.64 |
| 41 | 5Hex | 828.29 | 18.882 | 0.36 |
| 42 | 6Hex | 990.34 | 18.939 | 0.55 |
| 43 | 3Hex1Pent | 636.23 | 18.947 | 1.52 |
| 44 | 4Hex | 666.24 | 19.079 | 1.69 |
| 45 | 5Hex | 828.29 | 19.204 | 1.29 |
| 46 | 5Hex | 828.29 | 19.522 | 0.69 |
| 47 | 3Hex1Pent | 636.23 | 19.573 | 0.75 |
| 48 | 6Hex | 990.34 | 19.881 | 1.01 |
| 49 | 4Hex | 666.24 | 19.911 | 0.58 |
| 50 | 5Hex | 828.29 | 20.062 | 1.8 |
| 51 | 3Hex1Pent | 636.23 | 20.258 | 0.81 |
| 52 | 5Hex | 828.29 | 20.313 | 1.44 |
| 53 | 4Hex1Pent | 798.28 | 20.328 | 1.41 |
| 54 | 4Hex | 666.24 | 20.691 | 0.36 |
| 55 | 4Hex1Pent | 798.28 | 21.012 | 0.36 |
| 56 | 6Hex | 990.34 | 21.075 | 0.83 |
| 57 | 6Hex | 990.34 | 21.86 | 0.73 |
| 58 | 5Hex | 828.29 | 21.885 | 1.43 |
| 59 | 4Hex1Pent | 798.28 | 21.923 | 0.44 |
| 60 | 7Hex | 1152.4 | 22.096 | 0.58 |
| 61 | 6Hex | 990.34 | 22.178 | 0.72 |
| 62 | 7Hex | 1152.39 | 22.626 | 0.44 |
| 63 | 4Hex1Pent | 798.28 | 22.714 | 0.55 |
| 64 | 6Hex | 990.34 | 22.854 | 2.01 |
| 65 | 7Hex | 1152.4 | 22.915 | 0.27 |
| 66 | 6Hex | 990.34 | 23.366 | 1.15 |
| 67 | 7Hex | 1152.39 | 23.686 | 0.42 |
| 68 | 6Hex | 990.34 | 24.012 | 1.16 |
| 69 | 4Hex | 666.24 | 24.147 | 1.15 |
| 70 | 7Hex | 1152.39 | 24.151 | 0.37 |
| 71 | 7Hex | 1152.39 | 24.537 | 0.74 |
| 72 | 8Hex | 1314.45 | 24.955 | 0.37 |
| 73 | 7Hex | 1152.39 | 25.769 | 0.59 |
| 74 | 5Hex | 828.29 | 25.896 | 3.46 |
| 75 | 6Hex | 990.34 | 25.898 | 0.92 |
| 76 | 6Hex | 990.34 | 26.344 | 0.71 |
| 77 | 4Hex1Pent | 798.28 | 26.723 | 0.35 |
| 78 | 7Hex | 1152.39 | 27.136 | 0.51 |
| 79 | 4Hex1Pent | 798.28 | 27.138 | 0.22 |
| 80 | 4Hex1Pent | 798.28 | 27.347 | 0.26 |
| 81 | 4Hex1Pent | 798.28 | 27.565 | 0.32 |
| 82 | 5Hex | 828.29 | 27.822 | 0.56 |
| 83 | 5Hex | 828.29 | 28.03 | 0.64 |
| 84 | 7Hex | 1152.39 | 28.252 | 0.34 |
| 85 | 7Hex | 1152.4 | 28.633 | 0.57 |
| 86 | 6Hex | 990.34 | 28.735 | 0.53 |
| 87 | 6Hex | 990.34 | 28.984 | 0.59 |

Locust bean gum refers to a polysaccharide with a 73% β-1,4 mannose backbone, with 23% decorated with β-1,4 galactose. The oligosaccharides we produced matched this composition very closely. The mannose composition being 72.91%, followed by galactose at 22.98% (Table 3). With the glycosidic linkage composition being 4 mannose, 4,6 mannose and terminal mannose at 62.02%, 8.95% and 6.82% respectively, and terminal-galactose being 19.58% (Table 4). 39 oligosaccharides were observed in the pool that ranged from 3 hexose to 7 hexoses in length. The most abundant structures represent 3Hex, 11.02 min; 4Hex 4.188 min; 4Hex1Pent, 9.688 min; 5Hex 7.755 min; 6Hex, 11.153 min; 7Hex, 13.293 min. The full list of oligosaccharide peaks and abundances are found in Table 18. The oligosaccharide pool can be further distinguished by its 1H-13C 2D-NMR (HSQC) fingerprint (FIG. 13). Prominent peaks include those described in Table 5.

TABLE 18

Oligosaccharides generated from the COG depolymerization of Locust bean gum. Hex refers to hexose sugars, Pent refers to pentose sugars, HexA refers to hexuronic acid sugars, and Deoxyhex refers to deoxyhexose sugars. Hexoses refer to galactose and mannose.

| Compound | Name | Mass | RT (min) | Volume (% counts) |
|---|---|---|---|---|
| 1 | 3Hex | 504.19 | 1.492 | 2.27 |
| 2 | 3Hex | 504.19 | 1.855 | 0.85 |
| 3 | 3Hex | 504.18 | 3.002 | 0.75 |
| 4 | 3Hex (nr) | 504.17 | 11.02 | 9.48 |
| 5 | 4Hex | 666.24 | 4.188 | 7.94 |
| 6 | 3Hex | 504.18 | 4.461 | 1.28 |
| 7 | 4Hex | 666.24 | 4.911 | 2.47 |
| 8 | 4Hex | 666.24 | 5.225 | 3.70 |
| 9 | 4Hex | 666.24 | 5.608 | 3.28 |
| 10 | 3Hex1Pent | 636.23 | 6.511 | 4.42 |
| 11 | 3Hex1Pent | 636.23 | 7.066 | 2.09 |
| 12 | 4Hex | 666.24 | 7.33 | 1.86 |
| 13 | 5Hex | 828.29 | 7.755 | 6.79 |
| 14 | 5Hex | 828.29 | 7.992 | 2.61 |
| 15 | 5Hex | 828.29 | 8.599 | 2.52 |
| 16 | 3Hex1Pent | 636.23 | 8.646 | 1.15 |
| 17 | 5Hex | 828.29 | 9.09 | 2.45 |
| 18 | 4Hex1Pent | 798.28 | 9.688 | 4.29 |
| 19 | 5Hex | 828.29 | 9.802 | 1.88 |
| 20 | 5Hex | 828.29 | 10.062 | 3.12 |
| 21 | 4Hex1HexA | 842.27 | 10.31 | 2.49 |
| 22 | 4Hex1Deoxyhex | 812.26 | 10.546 | 0.99 |
| 23 | 4Hex1Pent | 798.28 | 11.09 | 2.19 |
| 24 | 6Hex | 990.34 | 11.153 | 5.21 |
| 25 | 6Hex | 990.34 | 11.417 | 1.65 |
| 26 | 4Hex1Pent | 798.28 | 11.592 | 1.11 |
| 27 | 6Hex | 990.34 | 11.65 | 1.50 |
| 28 | 6Hex | 990.34 | 12.024 | 1.55 |
| 29 | 6Hex | 990.34 | 12.344 | 1.34 |
| 30 | 5Hex | 828.29 | 13.089 | 2.17 |
| 31 | 7Hex | 1152.39 | 13.293 | 3.21 |
| 32 | 6Hex | 990.34 | 13.877 | 2.18 |
| 33 | 7Hex | 1152.39 | 14.078 | 1.24 |
| 34 | 4Hex1Pent | 798.28 | 14.207 | 0.98 |
| 35 | 6Hex | 990.34 | 14.341 | 2.19 |
| 36 | 4Hex | 666.24 | 15.185 | 1.00 |
| 37 | 6Hex | 990.34 | 15.221 | 1.50 |
| 38 | 7Hex | 1152.39 | 15.273 | 1.03 |
| 39 | 7Hex | 1152.39 | 16.279 | 1.25 |

Corn fiber refers to a polysaccharide or mixture of polysaccharides derived from spent distillers' grain or other corn streams. In some aspects, corn fiber refers to the base-soluble material extracted from distillers' grain or other corn streams. In some aspects, corn fiber refers to the acid soluble material extracted from distillers' grain or other corn streams. In some aspects, corn fiber refers to the insoluble material from distillers' grain or other corn streams. The corn fiber oligosaccharides were comprised of 3.07% glucose, 6.78% galactose, 35.76% arabinose, and 48.68% xylose. (Table 3). The glycosidic linkage composition comprised 5.83% 4-glucose, 16.33% 4-xylose, 6.21% 3,4-xylose, 25.05% terminal xylose, 27.79% terminal arabinose (Table 4). 29 oligosaccharides were observed in the pool that ranged from 3 hexose to 12 hexoses in length. The most abundant structures represent 3Hex, 4.11 min; 4Hex 9.29 min; 5Hex 12.31 min; 6Hex, 14.058; 7Hex, 15.254 min; 8Hex, 16.394; 9Hex, 18.013 min; 10Hex, 21.99 min; 11Hex, 22.911; 12Hex, 24.55 min. The full list of oligosaccharide peaks and abundances are found in Table 19. The oligosaccharide pool can be further distinguished by its 1H-13C 2D-NMR (HSQC) fingerprint (FIG. 13), which showed similar cross section coordinates to arabinoxylan. Prominent peaks include those described in Table 5.

TABLE 19

Oligosaccharides generated from the COG depolymerization of Corn Fiber. Hex refers to hexose sugars, Pent refers to pentose sugars, HexA refers to hexuronic acid sugars, and Deoxyhex refers to deoxyhexose sugars. Pentoses refer to xylose and arabinose. Hexose refers to glucose and galactose.

| Compound | Name | Mass | RT (min) | Volume (% counts) |
|---|---|---|---|---|
| 1 | 2Pent | 282.11 | 1.479 | 4.73 |
| 2 | 2Pent | 282.11 | 2.064 | 3.14 |
| 3 | 2Pent | 282.11 | 2.448 | 3.78 |
| 4 | 2Pent | 282.11 | 2.957 | 4.32 |
| 5 | 2Pent | 282.11 | 3.206 | 3.8 |

TABLE 19-continued

Oligosaccharides generated from the COG depolymerization of Corn Fiber. Hex refers to hexose sugars, Pent refers to pentose sugars, HexA refers to hexuronic acid sugars, and Deoxyhex refers to deoxyhexose sugars. Pentoses refer to xylose and arabinose. Hexose refers to glucose and galactose.

| Compound | Name | Mass | RT (min) | Volume (% counts) |
|---|---|---|---|---|
| 6 | 1Hex2Pent | 444.16 | 5.025 | 10.3 |
| 7 | 2Pent | 282.11 | 6.244 | 3.24 |
| 8 | 4Pent | 546.2 | 7.243 | 3.43 |
| 9 | 3Pent | 414.15 | 7.353 | 11.34 |
| 10 | 3Pent | 414.15 | 8.303 | 13.75 |
| 11 | 3Pent | 414.15 | 8.594 | 4.01 |
| 12 | 4Pent | 546.2 | 9.733 | 2.24 |
| 13 | 3Pent | 414.15 | 11.783 | 7.23 |
| 14 | 3Pent | 414.15 | 12.195 | 9.68 |
| 15 | 3Pent | 414.15 | 13.961 | 4.86 |
| 16 | 4Pent | 546.2 | 15.637 | 6.88 |
| 17 | 3Pent | 414.15 | 16.586 | 3.28 |

Example 11

(Comparison of COG and FITDOG Products)

Oligosaccharides produced by COG were expected to differ from those produced by a similar method referred to as FITDOG in PCT Application No., PCT/US2018/038350, published as WO/2018/23691.7. Oligosaccharides were found to have some homogeneity between pools; however, substantial differences were also encountered. COG was applied to galactomannan, arabinoxylan, xyloglucan, glucomannan, lichenan, mannan, galactan, β-glucan, curdlan, and xylan. The results were analyzed via mass spectrometry and the peaks corresponding to oligosaccharides were compared with those described in PCT Application No. PCT/US2020/035748.

COG Oligosaccharide production: Galactomannan, arabinoxylan, xyloglucan, glucomannan, lichenan, mannan, galactan, β-glucan, curdlan, and xylan (550 mg) were dissolved in 20 ml of HPLC grade water in a capped reaction vessel and placed in a shaker-incubator for 20 min at 55° C. and 85 RPM. The pH of the solution was adjusted to 5.2. Hydrogen peroxide (5 ml) and iron (II) sulfate (2.75 mg in 50 μL water) were added to the reaction mixture and mixed thoroughly, except for curdlan where copper (II) sulfate was used. The reaction in the capped reaction vessel proceeded in the shaker-incubator at 55° C. and 65 RPM for two hours. The capped reaction cooled to 12° C. in a −20° C. freezer. Ammonium hydroxide (1 ml of 28% v/v to pH 10.2) was used to adjust pH and sample was reacted at 45° C. in a shaker-incubator for 1 hour at 20 RPM, the cap was left loose to allow oxygen, ammonia, and carbon dioxide gases to be released. The sample is then frozen and lyophilized, then stored at −80° C. The freeze-dried oligosaccharide mixture was rehydrated with the minimum amount of water required to allow for a free-flowing solution. This solution was then loaded onto a column containing 15 mL mixed bed ion exchange resin per gram (dry weight) of crude material, and the runoff was collected in a plastic freezer bag. Once the material was loaded onto the column, the column was then rinsed with 3 bed volumes of water. Finally, the runoff was sealed and frozen in the bag, then carefully shattered and subjected to lyophilization.

Data analysis of COG Products: Oligosaccharide analysis was performed in the manner of Amicucci, M. J., Nandita, E., et al. (2020). Nature Communications 11(1): 1-12. Oligosaccharide peak volumes were generated from Agilent Mass Hunter Qualitative Analysis B.10 by using their "find by molecular feature" function.

FITDOG Oligosaccharide production: A solution was prepared containing 95% (v/v) sodium acetate buffer adjusted to pH 5 with glacial acetic acid, 5% (v/v) hydrogen peroxide (30% w/w), and 65 nM of the metal complex under investigation. This mixture was vortexed and was added to Galactomannan, arabinoxylan, xyloglucan, glucomannan, lichenan, mannan, galactan, β-glucan, curdlan, and xylan to make a final solution of 1 mg/ml. The reaction was incubated at 100° C. for 60 minutes. After reacting, half of the reaction volume of cold 2 M NaOH was added and vortexed before adding 0.6% of the initial reaction volume of glacial acetic acid to neutralize.

Oligosaccharides were isolated using nonporous graphitized carbon cartridges (GCC-SPE). Cartridges were washed with 80% acetonitrile in 0.1% (v/v) trifluoroacetic acid (TFA) and nano-pure water. The oligosaccharides were loaded and washed with 5 column volumes of nano-pure water. The oligosaccharides were eluted with 40% acetonitrile with 0.05% (v/v) TFA.

Data analysis of FITDOG Products: Oligosaccharides from FITDOG were manually annotated from their parent mass as obtained through the Agilent MassHunter Qualitative Analysis. For this example, data were obtained directly from PCT Application No. PCT/US2020/035748.

Several trends were noticed when comparing the COG and FITDOG samples. The entirety of the data is presented in Table 20; unique oligosaccharides are marked for each process, while similar oligosaccharides can be deduced from the differences between Table 20 and Tables 7-10 and 12-18, Furthermore, the mass of the compounds in Table 20 can be referenced with Tables 7-10 and 12-18 for their compositional identities. For galactomannan COG produced many compounds comprising of 3-5 hexoses and a single pentose; whereas the FITDOG process included two differentiated 7Hex isomers. For arabinoxylan, COG produced several small DP3 and DP4 pentose oligosaccharides that were unique, while FITDOG produced several other isomers ranging from DP3-DP11 with a number of high DP isomers that were not produced by COG. For xyloglucan, FITDOG tended to produce more isomers of large DP, while COG produced shorter oligosaccharides. For glucomannan, COG produced a number of isomers that contained hexoses and a single pentose unit that were not produced by FITDOG. For galactan, COG produced a number of unique isomers that contained hexoses and a single pentose unit, while FITDOG produced several larger. DP8 and DP9 oligosaccharides that were not found in COG. For β-glucan, FITDOG produced more isomers of DP6 and DP7. For lichenan, COG produced a number of unique isomers that contained hexoses and a single pentose unit, while FITDOG produced many unique DP3-DP10 oligosaccharides that were not found in COG. For mannan, COG produced a number of unique isomers that contained hexoses and a single pentose unit, while FITDOG produced many unique DP4-DP9 oligosaccharides that were not found in COG. For xylan, the FITDOG process produced more unique oligosaccharides with methylated glucuronic acid residues. For curdlan, COG produced unique oligosaccharides with unique isomers that contained hexoses and a single pentose unit as well as one unique DP3 oligosaccharide.

Herein disclosed are synthetic oligosaccharides, including pools of oligosaccharides, which are produced by the COG process, comprising at least 1, 5, 10, 15, 20, 25, 30, 35, 40, 45, 50 or all of the oligosaccharides referenced in Table 20 as being unique to the COG process. Further disclosed herein are synthetic oligosaccharides, including pools of oligosaccharides, which are produced by the COG process, but wherein oligosaccharides referenced in Table 20 as being unique to the FITDOG process are not present at detectable levels in the COG produced oligosaccharides.

TABLE 20

| Mass | RT (min) | Unique to COG | Unique to FITDOG | Pool Identity | Mass | RT (min) | Unique to COG | Unique to FITDOG | Pool Identity |
|---|---|---|---|---|---|---|---|---|---|
| 636.230 | 6.404 | x | | GalMan | 414.150 | 11.556 | x | | ArabXyl |
| 636.230 | 6.968 | x | | GalMan | 414.150 | 21.696 | x | | ArabXyl |
| 636.230 | 8.198 | x | | GalMan | 678.240 | 25.947 | x | | ArabXyl |
| 636.230 | 8.566 | x | | GalMan | 414.140 | 2.000 | | x | ArabXyl |
| 768.270 | 10.827 | x | | GalMan | 546.180 | 11.200 | | x | ArabXyl |
| 768.270 | 12.342 | x | | GalMan | 546.180 | 11.580 | | x | ArabXyl |
| 768.270 | 13.372 | x | | GalMan | 546.180 | 12.160 | | x | ArabXyl |
| 812.260 | 10.495 | x | | GalMan | 678.220 | 15.820 | | x | ArabXyl |
| 812.260 | 14.627 | x | | GalMan | 678.220 | 17.150 | | x | ArabXyl |
| 842.270 | 9.515 | x | | GalMan | 678.220 | 18.790 | | x | ArabXyl |
| 842.270 | 10.301 | x | | GalMan | 810.260 | 14.030 | | x | ArabXyl |
| 842.270 | 11.020 | x | | GalMan | 942.310 | 16.610 | | x | ArabXyl |
| 842.270 | 11.725 | x | | GalMan | 942.310 | 18.290 | | x | ArabXyl |
| 842.270 | 12.330 | x | | GalMan | 942.310 | 22.540 | | x | ArabXyl |
| 842.270 | 14.866 | x | | GalMan | 1074.350 | 26.330 | | x | ArabXyl |
| 842.270 | 16.706 | x | | GalMan | 1074.350 | 26.830 | | x | ArabXyl |
| 798.280 | 9.614 | x | | GalMan | 1074.350 | 27.100 | | x | ArabXyl |
| 798.280 | 10.996 | x | | GalMan | 1074.350 | 27.490 | | x | ArabXyl |
| 798.280 | 11.525 | x | | GalMan | 1074.350 | 28.150 | | x | ArabXyl |
| 798.280 | 14.191 | x | | GalMan | 1206.390 | 26.370 | | x | ArabXyl |
| 1152.390 | 14.302 | x | | GalMan | 1206.390 | 27.100 | | x | ArabXyl |
| 1152.380 | 13.570 | | x | GalMan | 1338.430 | 27.100 | | x | ArabXyl |
| 1152.380 | 13.720 | | x | GalMan | 1470.480 | 28.630 | | x | ArabXyl |
| 606.220 | 14.055 | x | | XylGlc | 474.170 | 2.263 | x | | GlcMan |
| 768.270 | 22.600 | x | | XylGlc | 636.230 | 6.413 | x | | GlcMan |
| 930.320 | 24.564 | x | | XylGlc | 474.170 | 9.187 | x | | GlcMan |
| 1224.420 | 30.009 | x | | XylGlc | 798.280 | 9.604 | x | | GlcMan |
| 930.320 | 30.836 | x | | XylGlc | 474.170 | 10.653 | x | | GlcMan |
| 1224.420 | 31.349 | x | | XylGlc | 636.230 | 12.074 | x | | GlcMan |
| 1062.360 | 31.490 | x | | XylGlc | 474.170 | 12.713 | x | | GlcMan |
| 1092.360 | 18.980 | | x | XylGlc | 636.230 | 13.068 | x | | GlcMan |
| 1092.360 | 19.940 | | x | XylGlc | 798.280 | 15.280 | x | | GlcMan |
| 1092.360 | 23.140 | | x | XylGlc | 798.280 | 17.219 | x | | GlcMan |
| 1092.360 | 23.740 | | x | XylGlc | 798.280 | 18.793 | x | | GlcMan |
| 1092.360 | 24.780 | | x | XylGlc | 636.230 | 18.947 | x | | GlcMan |
| 1092.360 | 25.440 | | x | XylGlc | 636.230 | 19.573 | x | | GlcMan |
| 1224.400 | 21.270 | | x | XylGlc | 636.230 | 20.258 | x | | GlcMan |
| 1224.400 | 24.960 | | x | XylGlc | 798.280 | 20.328 | x | | GlcMan |
| 1224.400 | 25.810 | | x | XylGlc | 798.280 | 21.012 | x | | GlcMan |
| 1254.410 | 22.740 | | x | XylGlc | 798.280 | 21.923 | x | | GlcMan |
| 1386.450 | 26.470 | | x | XylGlc | 798.280 | 22.714 | x | | GlcMan |
| 1386.450 | 26.730 | | x | XylGlc | 798.280 | 26.723 | x | | GlcMan |
| 1386.450 | 27.330 | | x | XylGlc | 798.280 | 27.138 | x | | GlcMan |
| 474.180 | 2.658 | x | | Gal | 798.280 | 27.347 | x | | GlcMan |
| 474.170 | 3.038 | x | | Gal | 798.280 | 27.565 | x | | GlcMan |
| 636.230 | 6.014 | x | | Gal | 990.330 | 13.350 | | x | β-Glc |
| 636.230 | 7.292 | x | | Gal | 990.330 | 22.790 | | x | β-Glc |
| 680.220 | 8.937 | x | | Gal | 990.330 | 25.100 | | x | β-Glc |
| 798.280 | 9.508 | x | | Gal | 1152.380 | 26.050 | | x | β-Glc |
| 798.280 | 10.112 | x | | Gal | 1152.380 | 27.230 | | x | β-Glc |
| 842.270 | 11.857 | x | | Gal | 1152.380 | 27.470 | | x | β-Glc |
| 812.260 | 13.126 | x | | Gal | 1152.380 | 28.610 | | x | β-Glc |
| 1004.320 | 13.573 | x | | Gal | 312.120 | 1.583 | x | | Mann |
| 1166.370 | 14.673 | x | | Gal | 474.180 | 6.624 | x | | Mann |
| 974.310 | 14.753 | x | | Gal | 474.180 | 6.954 | x | | Mann |
| 1314.430 | 14.060 | | x | Gal | 444.170 | 7.463 | x | | Mann |
| 1476.490 | 14.750 | | x | Gal | 444.160 | 7.984 | x | | Mann |
| 504.190 | 1.488 | x | | Lich | 474.180 | 9.655 | x | | Mann |
| 474.180 | 2.211 | x | | Lich | 606.220 | 10.576 | x | | Mann |
| 342.130 | 2.925 | x | | Lich | 636.230 | 11.423 | x | | Mann |

TABLE 20-continued

| Mass | RT (min) | Unique to COG | Unique to FITDOG | Pool Identity | Mass | RT (min) | Unique to COG | Unique to FITDOG | Pool Identity |
|---|---|---|---|---|---|---|---|---|---|
| 444.170 | 2.988 | x | | Lich | 474.180 | 12.409 | x | | Mann |
| 666.240 | 4.016 | x | | Lich | 636.230 | 12.727 | x | | Mann |
| 666.240 | 4.726 | x | | Lich | 606.220 | 13.770 | x | | Mann |
| 650.240 | 5.754 | x | | Lich | 606.220 | 16.102 | x | | Mann |
| 680.220 | 5.977 | x | | Lich | 768.270 | 16.706 | x | | Mann |
| 636.230 | 6.275 | x | | Lich | 636.230 | 17.531 | x | | Mann |
| 636.230 | 6.830 | x | | Lich | 606.220 | 18.235 | x | | Mann |
| 636.230 | 8.396 | x | | Lich | 930.320 | 18.491 | x | | Mann |
| 606.220 | 8.398 | x | | Lich | 606.220 | 19.122 | x | | Mann |
| 798.280 | 9.459 | x | | Lich | 636.230 | 19.328 | x | | Mann |
| 842.270 | 9.907 | x | | Lich | 798.280 | 19.731 | x | | Mann |
| 812.260 | 10.220 | x | | Lich | 636.230 | 20.683 | x | | Mann |
| 842.270 | 10.504 | x | | Lich | 798.290 | 21.950 | x | | Mann |
| 768.270 | 10.680 | x | | Lich | 768.270 | 22.303 | x | | Mann |
| 960.340 | 12.139 | x | | Lich | 930.320 | 22.608 | x | | Mann |
| 1004.330 | 12.747 | x | | Lich | 768.270 | 23.412 | x | | Mann |
| 1004.320 | 13.358 | x | | Lich | 1092.380 | 24.100 | x | | Mann |
| 974.310 | 13.623 | x | | Lich | 930.320 | 24.422 | x | | Mann |
| 1122.390 | 14.439 | x | | Lich | 930.320 | 24.785 | x | | Mann |
| 1166.380 | 15.181 | x | | Lich | 768.270 | 24.786 | x | | Mann |
| 666.240 | 16.429 | x | | Lich | 1092.380 | 25.241 | x | | Mann |
| 504.170 | 11.580 | | x | Lich | 768.270 | 25.534 | x | | Mann |
| 504.170 | 13.730 | | x | Lich | 798.280 | 25.871 | x | | Mann |
| 504.170 | 15.240 | | x | Lich | 960.340 | 26.217 | x | | Mann |
| 828.270 | 26.590 | | x | Lich | 960.330 | 26.435 | x | | Mann |
| 1152.380 | 9.590 | | x | Lich | 798.280 | 26.802 | x | | Mann |
| 1152.380 | 9.990 | | x | Lich | 680.220 | 27.032 | x | | Mann |
| 1152.380 | 10.500 | | x | Lich | 930.320 | 27.594 | x | | Mann |
| 1152.380 | 11.190 | | x | Lich | 1092.380 | 27.782 | x | | Mann |
| 1152.380 | 11.970 | | x | Lich | 812.260 | 28.218 | x | | Mann |
| 1152.380 | 15.650 | | x | Lich | 1092.380 | 28.330 | x | | Mann |
| 1152.380 | 17.240 | | x | Lich | 930.320 | 28.643 | x | | Mann |
| 1152.380 | 17.580 | | x | Lich | 1092.380 | 29.139 | x | | Mann |
| 1314.430 | 11.160 | | x | Lich | 812.260 | 29.164 | x | | Mann |
| 1314.430 | 18.170 | | x | Lich | 680.220 | 29.171 | x | | Mann |
| 1314.430 | 20.180 | | x | Lich | 812.260 | 30.672 | x | | Mann |
| 1476.490 | 20.810 | | x | Lich | 930.320 | 30.759 | x | | Mann |
| 1638.540 | 23.510 | | x | Lich | 666.220 | 3.510 | | x | Mann |
| 1641.560 | 23.570 | | x | Lich | 828.270 | 9.150 | | x | Mann |
| 1314.430 | 18.170 | | x | Lich | 990.330 | 11.930 | | x | Mann |
| 1314.430 | 20.180 | | x | Lich | 1152.380 | 13.100 | | x | Mann |
| 1476.490 | 20.810 | | x | Lich | 1314.430 | 14.060 | | x | Mann |
| 1641.560 | 23.570 | | x | Lich | 1476.490 | 14.750 | | x | Mann |
| 282.110 | 6.692 | x | | Xyl | 342.130 | 1.456 | x | | Curd |
| 1092.420 | 8.109 | x | | Xyl | 312.120 | 1.663 | x | | Curd |
| 678.240 | 8.432 | x | | Xyl | 504.180 | 7.423 | x | | Curd |
| 1122.350 | 18.442 | x | | Xyl | 474.170 | 12.672 | x | | Curd |
| 736.240 | 26.435 | x | | Xyl | 474.170 | 13.644 | x | | Curd |
| 942.320 | 28.974 | x | | Xyl | 636.230 | 24.761 | x | | Curd |
| 604.190 | 14.000 | | x | Xyl | | | | | |
| 604.190 | 14.270 | | x | Xyl | | | | | |
| 810.260 | 21.920 | | x | Xyl | | | | | |
| 868.270 | 20.930 | | x | Xyl | | | | | |
| 868.270 | 22.820 | | x | Xyl | | | | | |
| 868.270 | 23.130 | | x | Xyl | | | | | |
| 868.270 | 23.460 | | x | Xyl | | | | | |
| 868.270 | 24.870 | | x | Xyl | | | | | |
| 1000.32 | 24.51 | | x | Xyl | | | | | |
| 1000.32 | 26.88 | | x | Xyl | | | | | |
| 1000.32 | 27.34 | | x | Xyl | | | | | |
| 1000.32 | 27.52 | | x | Xyl | | | | | |
| 1000.32 | 28.51 | | x | Xyl | | | | | |
| 1000.32 | 29.39 | | x | Xyl | | | | | |
| 1074.35 | 28.15 | | x | Xyl | | | | | |
| 1132.36 | 27.61 | | x | Xyl | | | | | |
| 1132.36 | 28.47 | | x | Xyl | | | | | |
| 1132.36 | 29.69 | | x | Xyl | | | | | |

GalMan = Galactomannan, ArabXyl = Arabinoxylan, XylGlc = Xyloglucan, GlcMan= Glucomannan, Lich= Lichenan, Man= Mannan, Gal= Galactan, β-Glc = Beta-Glucan, Curd = Curdlan, Xyl= Xylan References cited herein, the teachings of which are incorporated by reference herein in their entireties:

Amicucci, M. J., Galermo, A. G., et al. (2019). "A rapid-throughput adaptable method for determining the monosaccharide composition of polysaccharides." International Journal of Mass Spectrometry 438: 22-28.

Amicucci, M. J., et al. (2019). "Function without Structures: The Need for In-Depth Analysis of Dietary Carbohydrates." Journal of Agricultural and Food Chemistry 67(16): 4418-4424.

Amicucci, M. J., et al. (2018). Production of bioactive oligosaccharides, Google Patents.

Amicucci, M. J., Nandita, E., et al. (2020). "A nonenzymatic method for cleaving polysaccharides to yield oligosaccharides for structural analysis." Nature Communications 11(1): 1-12.

Bar-On, Y. M., et al. (2018). "The biomass distribution on Earth." Proceedings of the National Academy of Sciences 115(25): 6506-6511.

Bauer, S., et al. (2006). "Development and application of a suite of polysaccharide-degrading enzymes for analyzing plant cell walls." Proceedings of the National Academy of Sciences 103(30): 11417-11422.

Beckmann, L., et al. (2006). "Isolation and identification of mixed linked β-glucan degrading bacteria in the intestine of broiler chickens and partial characterization of respective 1, 3-1, 4-β-glucanase activities." Journal of Basic Microbiology 46(3): 175185.

Cancilla, M. T., et al. (1998). "Alkaline degradation of oligosaccharides coupled with matrix-assisted laser desorption/ionization Fourier transform mass spectrometry: a method for sequencing oligosaccharides." Analytical Chemistry 70(4): 663-672.

Desai, M. S., et al. (2016). "A dietary fiber-deprived gut microbiota degrades the colonic mucus barrier and enhances pathogen susceptibility." Cell 167(5): 1339-1353.

Dominguez, A. L., et al. (2014). "An overview of the recent developments on fructooligosaccharide production and applications." Food and Bioprocess Technology 7(2): 324-337.

Galermo, A. G., Nandita, E., et al. (2018). "Liquid chromatography-tandem mass spectrometry approach for determining glycosidic linkages." Analytical Chemistry 90(21): 13073-13080.

Galermo, A. G., Nandita, E., et al. (2019). "Development of an extensive linkage library for characterization of carbohydrates." Analytical Chemistry 91(20): 13022-13031.

Gosling, A., et al. (2010). "Recent advances refining galactooligosaccharide production from lactose." Food Chemistry 121(2): 307-318.

Guarner, F. and Malagelada, J. R. (2003). "Gut flora in health and disease." The Lancet 361(9356): 512-519.

Hamaker, B. R. and Tuncil, Y. E. (2014). "A perspective on the complexity of dietary fiber structures and their potential effect on the gut microbiota." Journal of Molecular Biology 426(23): 3838-3850.

Hinz, S., et al. (2005). "*Bifidobacterium longum* endogalactanase liberate galactotriose from Type galactans." Applied and Environmental Microbiology 71(9): 5501-5510.

Jaušovec, D., et al. (2015). "Introduction of aldehyde vs. carboxylic groups to cellulose nanofibers using laccase/TEMPO mediated oxidation." Carbohydrate Polymers 116: 74-85.

Kawaguchi, K., et al. (2014). "The mannobiose-forming exo-mannanase involved in a new mannan catabolic pathway in *Bacteroides fragilis*." Archives of Microbiology 196(1): 17-23.

Kulcinskaja, E., et al. (2013). "Expression and characterization of a *Bifidobacterium adolescentis* beta-mannanase carrying mannan-binding and cell association motifs." Applied and Environmental Microbiology 79(1): 133-140.

Lammerts van Bueren, A., et al. (2017). "Prebiotic galactoligosaccharides activate mucin and pectin galactan utilization pathways in the human gut symbiont *Bacteroides thetaiotaomicron*." Scientific Reports 7(1): 1-13.

Larsbrink, J., et al. (2014). "A discrete genetic locus confers xyloglucan metabolism in select human gut Bacteroidetes." Nature 506(7489): 498-502.

Leanti La Rosa, S., et al. (2019). "The human gut Firmicute *Roseburia intestinalis* is a primary degrader of dietary β-mannans." Nature Communication 10(1): 1-14.

LoCascio, R. G., et al. (2007). "Glycoprofiling of *bifidobacterial* consumption of human milk oligosaccharides demonstrates strain specific, preferential consumption of small chain glycans secreted in early human lactation." Journal of Agricultural and Food Chemistry 55(22): 8914-8919.

Luis, A. S., et al. (2018). "Dietary pectin glycans are degraded by coordinated enzyme pathways in human colonic *Bacteroides*." Nature Microbiology 3(2): 210-219.

Margolles, A. and De Los Reyes-Gavilán, C. G. (2003). "Purification and functional characterization of a novel alpha-L-arabinofuranosidase from *Bifidobacterium longum* B667." Applied and Environmental Microbiology 69(9): 5096-5103.

Martens, E. C., et al. (2011). "Recognition and Degradation of Plant Cell Wall Polysaccharides by Two Human Gut Symbionts." PLoS Biology 9(12), p.e1001221.

Merighi, M., et al. (2016). Biosynthesis of human milk oligosaccharides in engineered bacteria, Google Patents.

Morrow, A. L., et al. (2004). "Human milk oligosaccharides are associated with protection against diarrhea in breast-fed infants." The Journal of Pediatrics 145(3): 297-303.

Neyrinck, A. M., et al. (2012). "Wheat-derived arabinoxylan oligosaccharides with prebiotic effect increase satietogenic gut peptides and reduce metabolic endotoxemia in diet-induced obese mice." Nutrition & Diabetes 2(1): pp e28-e28.

Pauly, M., et al. (1999). "A xyloglucan-specific endo-β-1, 4-glucanase from *Aspergillus aculeatus*: expression cloning in yeast, purification and characterization of the recombinant enzyme." Glycobiology 9(1): 93-100.

Reddy, S. K., et al. (2016). "A β-mannan utilization locus in *Bacteroides ovatus* involves a GH36 α-galactosidase active on galactomannans." FEBS Lett 590(14): 2106-2118.

Ruiz-Moyano, S., et al. (2013). "Variation in consumption of human milk oligosaccharides by infant gut-associated strains of *Bifidobacterium breve*." Applied and Environmental Microbiology 79(19): 6040-6049.

Salyers, A. A., et al. (1977). "Fermentation of mucin and plant polysaccharides by strains of *Bacteroides* from the human colon." Applied and Environmental Microbiology 33(2): 319-322.

Sheridan, P. O., et al. (2016). "Polysaccharide utilization loci and nutrition specialization in a dominant group of butyrate-producing human colonic Firmicutes." Microbial Genomics 2(2).

Smilowitz, J. T., et al. (2014). "Breast milk oligosaccharides: structure-function relationships in the neonate." Annual Review of Nutrition 34: 143-169.

Stadtman, E. and B. Berlett (1991). "Fenton chemistry. Amino acid oxidation." Journal of Biological Chemistry 266(26): 17201-17211.

Sun, B., et al. (2015). "Sodium periodate oxidation of cellulose nanocrystal and its application as a paper wet strength additive." Cellulose 22(2): 1135-1146.

Tamura, K., et al. (2017). "Molecular Mechanism by which Prominent Human Gut Bacteroidetes Utilize Mixed-Linkage β-Glucans, Major Health-Promoting Cereal Polysaccharides." Cell Reports 21(2): 417-430.

Van Laere, K. M., et al. (1999). "Transglycosidase activity of *Bifidobacterium* adolescents DSM 20083 alpha-galactosidase." Applied Microbiology and Biotechnology 52(5): 681-688.

Wang, N., et al. (2016). "A review on Fenton-like processes for organic wastewater treatment." Journal of Environmental Chemical Engineering 4(1): 762-787.

Wardman, P. and Candeias, L. P. (1996). "Fenton chemistry: an introduction." Radiation Research 145(5): 523-531.

Yu, S., et al. (2018). "Production of a human milk oligosaccharide 2'-fucosyllactose by metabolically engineered *Saccharomyces cerevisiae*." Microbial Cell Factories 17(1): 101.

The invention claimed is:

1. A synthetic oligosaccharide composition comprising: one or more oligosaccharides, wherein each of the oligosaccharides independently comprises between 3 and 6 galactose monomers, wherein at least a portion of the oligosaccharides further comprises one or more arabinose monomers, wherein the synthetic oligosaccharide composition has a glycosidic linkage composition including terminal galactose, β-1,3 galactose, β-1,3,6 galactose, β-1,6 galactose, or terminal arabinose, and wherein the synthetic oligosaccharide composition is generated by reacting a polysaccharide having a β-1,3 galactose backbone in a reaction mixture with a Fenton's reagent comprising a peroxide agent and metal ions to provide a treated polysaccharide, and cleaving the treated polysaccharide with a nitrogen-based cleavage reagent to generate the oligosaccharides.

2. A method of modulating microbial growth and/or microbial or host metabolism, comprising contacting, in vitro or in vivo, microbes with a composition according to claim 1.

3. A synthetic oligosaccharide composition comprising oligosaccharides having a β-1,3 galactose backbone, wherein each of the oligosaccharides independently comprises 3 to 6 galactose monomers, wherein at least a portion of the oligosaccharides further comprises one or more arabinose monomers, and wherein the synthetic oligosaccharide composition has a glycosidic linkage composition consisting of terminal galactose, β-1,3 galactose, β-1,3,6 galactose, β-1,6 galactose, or terminal arabinose.

4. The synthetic oligosaccharide composition of claim 3, wherein the oligosaccharides are generated from an arabinogalactan II polysaccharide.

5. The synthetic oligosaccharide composition of claim 4, wherein the synthetic oligosaccharide composition comprises an α-1,6 arabinose branch, a β-1,6 galactose-β-1,6 galactose branch, a β-1,6 galactose-α-1,4 arabinose branch, a β-1,4 galactose-β-1,6 galactose branch, or any combination thereof.

6. The synthetic oligosaccharide composition of claim 3, wherein each of the oligosaccharides independently comprises a terminal arabinose cap and one or more branches selected from a β-1,6 galactose branch, a β-1,3 galactose branch, or a β-1,3,6 galactose branch, wherein each of the one or more branches has 1 to 4 monomers.

7. The synthetic oligosaccharide composition of claim 3, wherein the oligosaccharides of the composition comprise at least 80% terminal galactose, terminal arabinose, β-1,3 galactose, and β-1,3,6 galactose.

8. The synthetic oligosaccharide composition of claim 3, wherein the synthetic oligosaccharide composition comprises galactose monomers in an amount of about 80-92% and arabinose monomers in an amount of about 5-10%, based on total monosaccharide content.

9. The synthetic oligosaccharide composition of claim 3, wherein the glycosidic linkage composition, expressed as relative abundance by peak area, comprises:

(i) terminal galactose in an amount of about 40-60%;
(ii) β-1,3 galactose in an amount of about 10-25%;
(iii) β-1,3,6 galactose in an amount of about 8-20%;
(iv) β-1,6 galactose in an amount of about 7-18%; and
(v) terminal arabinose in an amount of about 1-8%.

10. A method of modulating microbial growth and/or microbial or host metabolism, comprising contacting, in vitro or in vivo, microbes with a composition according to claim 3.

11. A method for cleaving polysaccharides, comprising:

reacting polysaccharides in a reaction mixture with a Fenton's reagent, having a peroxide agent and metal ions, to provide treated polysaccharides; and cleaving the treated polysaccharides with a nitrogen-based cleavage reagent to generate a synthetic oligosaccharide composition of claim 3.

12. A synthetic oligosaccharide composition comprising oligosaccharides having a β-1,3 galactose backbone, wherein each of the oligosaccharides independently comprises 3 to 6 galactose monomers, and wherein at least a portion of the oligosaccharides further comprises one or more arabinose monomers, wherein the synthetic oligosaccharide composition has a glycosidic linkage composition including terminal galactose, β-1,3 galactose, β-1,3,6 galactose, β-1,6 galactose, or terminal arabinose, and wherein the oligosaccharides of the synthetic oligosaccharide composition exhibit the mass and retention time values in Table 11.

13. The synthetic oligosaccharide composition of claim 12, wherein the sum of compounds 7, 9, 11, 19, 25, 27, 30, 32, 36, 37, 41, 44, 47, 54, and 59 make up at least 35% of the peak volume found in Table 11.

14. The synthetic oligosaccharide composition of claim 12, wherein the sum of compounds 7, 9, 11, 19, 25, 27, 30, 32, 36, 37, 41, 44, 47, 54, and 59 make up 28-42% of the peak volume found in Table 11.

15. The synthetic oligosaccharide composition of claim 12, wherein the sum of compounds 5, 9, 10, 12, 14, 18, 25, 32, 37, and 53 make up at least 50% of the peak volume found in Table 11.

16. The synthetic oligosaccharide composition of claim 12, wherein the sum of compounds 5, 9, 10, 12, 14, 18, 25, 32, 37, and 53 make up 40-60% of the peak volume found in Table 11.

17. The synthetic oligosaccharide composition of claim 12, wherein the synthetic oligosaccharide composition comprises oligosaccharides exhibiting 1H-13C 2D-NMR (HSQC) peaks within 10% of those described in Table 5 as arabinogalactan-II.

18. The synthetic oligosaccharide composition of claim 12, wherein the oligosaccharides of the composition comprise at least 80% terminal galactose, terminal arabinose, β-1,3 galactose, and β-1,3,6 galactose.

19. A method of modulating microbial growth and/or microbial or host metabolism, comprising contacting, in vitro or in vivo, microbes with a composition according to claim 12.

20. A method for cleaving polysaccharides, comprising:

reacting polysaccharides in a reaction mixture with a Fenton's reagent, having a peroxide agent and metal ions, to provide treated polysaccharides; and cleaving the treated polysaccharides with a nitrogen-based cleavage reagent to generate a synthetic oligosaccharide composition of claim 12.

* * * * *